United States Patent
Takikawa et al.

(10) Patent No.: US 10,371,231 B2
(45) Date of Patent: *Aug. 6, 2019

(54) DAMPER DEVICE

(71) Applicant: AISIN AW CO., LTD., Anjo-shi, Aichi-ken (JP)

(72) Inventors: Yoshihiro Takikawa, Tsushima (JP); Hiroki Nagai, Anjo (JP); Masaki Wajima, Nagoya (JP); Takao Sakamoto, Anjo (JP); Kazuhiro Itou, Anjo (JP); Nobuo Suzuki, Toyohashi (JP)

(73) Assignee: AISIN AW CO., LTD., Anjo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/553,387

(22) PCT Filed: Mar. 31, 2016

(86) PCT No.: PCT/JP2016/060849
§ 371 (c)(1),
(2) Date: Aug. 24, 2017

(87) PCT Pub. No.: WO2016/159328
PCT Pub. Date: Oct. 6, 2016

(65) Prior Publication Data
US 2018/0073594 A1  Mar. 15, 2018

(30) Foreign Application Priority Data
Jun. 8, 2015  (JP) ................. 2015-115845

(51) Int. Cl.
*F16F 15/134* (2006.01)
*F16D 3/12* (2006.01)
(Continued)

(52) U.S. Cl.
CPC .......... *F16F 15/13484* (2013.01); *F16D 3/12* (2013.01); *F16F 15/12366* (2013.01);
(Continued)

(58) Field of Classification Search
None
See application file for complete search history.

(56) References Cited

U.S. PATENT DOCUMENTS

2010/0096788 A1   4/2010  Farahati et al.
2017/0227088 A1*  8/2017  Takikawa .......... F16F 15/13492
(Continued)

FOREIGN PATENT DOCUMENTS

DE  10 2009 013 965 A1   9/2010
JP     2010-230155 A    10/2010
(Continued)

OTHER PUBLICATIONS

May 17, 2016 International Search Report issued in Patent Application No. PCT/JP2016/060849.
(Continued)

*Primary Examiner* — Timothy Hannon
(74) *Attorney, Agent, or Firm* — Oliff PLC

(57) ABSTRACT

A damper device that includes an input element to which torque from an engine is transferred; an output element; a first intermediate element; a second intermediate element; a first elastic body that transfers torque between the input element and the first intermediate element; a second elastic body that transfers torque between the first intermediate element and the output element; a third elastic body that transfers torque between the input element and the second intermediate element; a fourth elastic body that transfers torque between the second intermediate element and the
(Continued)

output element; and a fifth elastic body that transfers torque between the first intermediate element and the second intermediate element.

20 Claims, 19 Drawing Sheets

(51) Int. Cl.
*F16F 15/123* (2006.01)
*F16H 45/02* (2006.01)

(52) U.S. Cl.
CPC ...... *F16F 15/12373* (2013.01); *F16F 15/134* (2013.01); *F16F 15/13407* (2013.01); *F16H 45/02* (2013.01); *F16H 2045/0231* (2013.01)

(56) References Cited

U.S. PATENT DOCUMENTS

2018/0073594 A1 3/2018 Takikawa et al.
2018/0080524 A1 3/2018 Takikawa et al.

FOREIGN PATENT DOCUMENTS

| JP | 2012-506006 A | 3/2012 |
|---|---|---|
| WO | 2013/161493 A1 | 10/2013 |

OTHER PUBLICATIONS

Nov. 26, 2018 Office Action issued in U.S. Appl. No. 15/562,761.
Jul. 27, 2018 Office Action issued in U.S. Appl. No. 15/501,663.
Aug. 9, 2016 International Search Report issued in International Patent Application No. PCT/JP2016/067038.
Oct. 27, 2015 International Search Report issued in International Patent Application No. PCT/JP2015/076065.
U.S. Appl. No. 15/562,761, filed Sep. 28, 2017 in the name of Takikawa et al.
U.S. Appl. No. 15/501,663, filed Feb. 3, 2017 in the name of Takikawa et al.

\* cited by examiner

FIG. 21
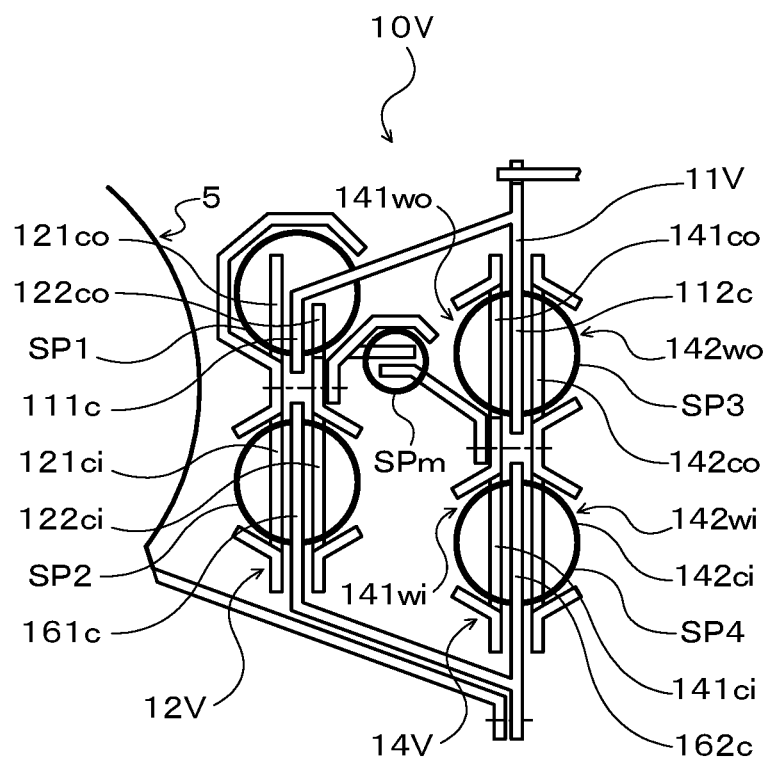
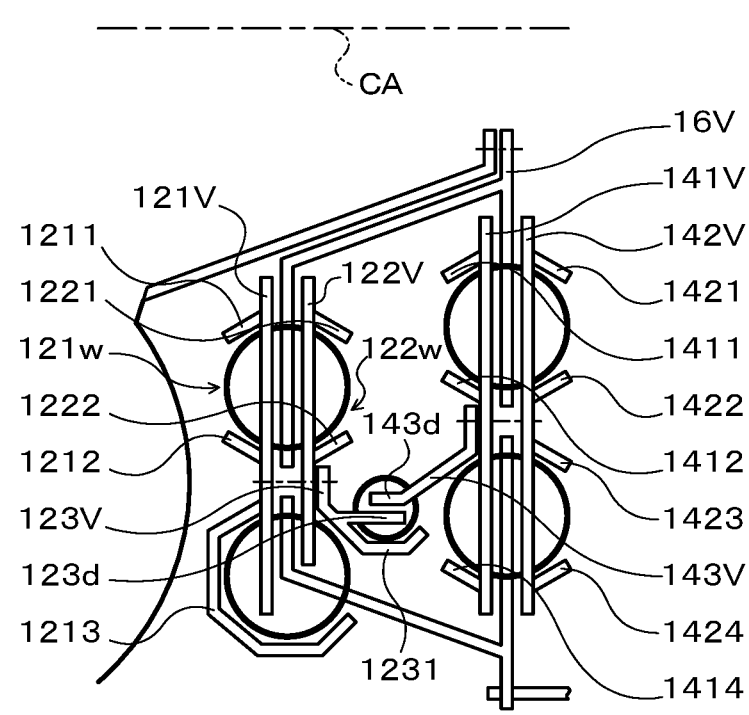

FIG. 22
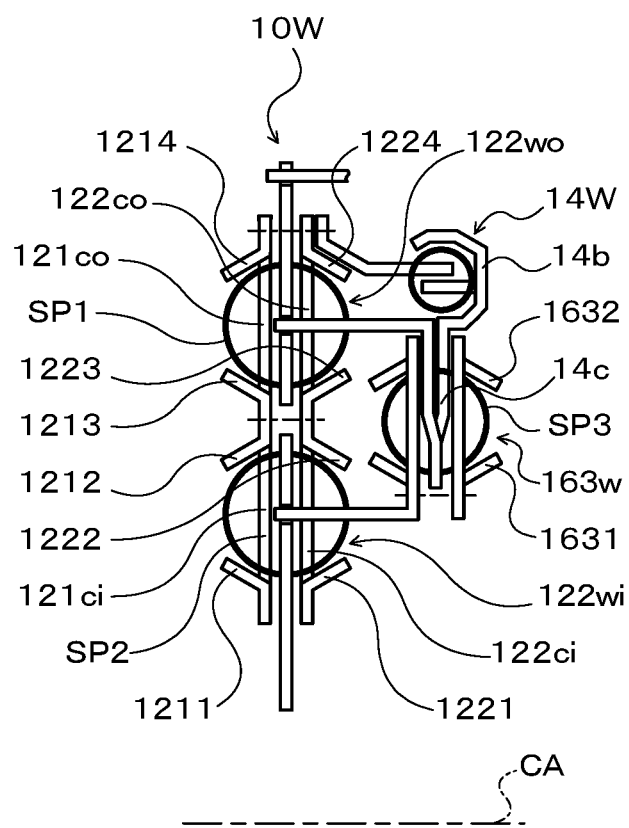
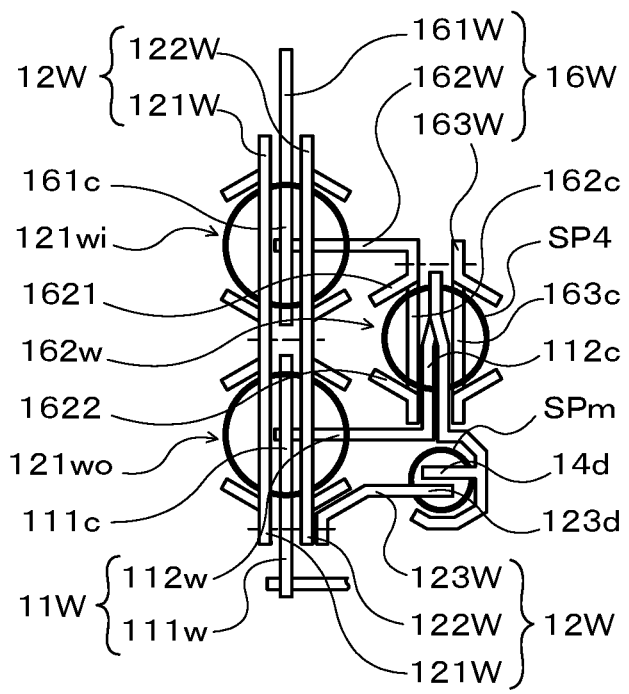

DAMPER DEVICE

BACKGROUND

The disclosure according to the present disclosure relates to a damper device that has an input element to which torque from an engine is transferred and an output element.

Hitherto, there has been known, as a damper device that is applicable to a starting device, a double-path damper used in association with a torque converter (see Published Japanese Translation of PCT Application No. 2012-506006, for example). In the damper device, a vibration path from an engine and a lock-up clutch (32) to an output hub (37) is divided into two parallel vibration paths B and C, and the two vibration paths B and C each have a pair of springs and a separate intermediate flange (36, 38) disposed between the pair of springs. In addition, a turbine (34) of the torque converter is coupled to the intermediate flange (36) of the vibration path B in order to make the natural frequencies of the two vibration paths different from each other, and the natural frequency of the intermediate flange (36) of the vibration path B is lower than the natural frequency of the intermediate flange (38) of the vibration path C. In such a damper device, in the case where the lock-up clutch (32) is engaged, vibration from the engine is input to the two vibration paths B and C of the damper device. When engine vibration at a certain frequency reaches the vibration path B which includes the intermediate flange (36) coupled to the turbine (34), the phase of vibration between the intermediate flange (36) of the vibration path B and the output hub (37) is shifted by 180 degrees with respect to the phase of input vibration. In this event, since the natural frequency of the intermediate flange (38) of the vibration path C is higher than the natural frequency of the intermediate flange (36) of the vibration path B, vibration which is input to the vibration path C is transferred to the output hub (37) without causing a shift (deviation) of the phase. In this way, vibration of the output hub (37) can be damped by shifting the phase of vibration transferred from the vibration path B to the output hub (37) and the phase of vibration transferred from the vibration path C to the output hub (37) by 180 degrees.

SUMMARY

In order to improve the vibration damping performance of the double-path damper described in Published Japanese Translation of PCT Application No. 2012-506006 mentioned above, it is necessary to appropriately set the natural frequencies of the vibration paths B and C by adjusting the spring constants of elastic bodies on both sides of the intermediate flanges and the weights of the intermediate flanges. If an attempt is made to make the natural frequencies of the vibration paths B and C appropriate by adjusting the spring constants of the elastic bodies, however, the rigidity of the entire double-path damper may be fluctuated significantly. If an attempt is made to make the two natural frequencies appropriate by adjusting the weights of the intermediate flanges and the turbine which is connected thereto, meanwhile, the weights of the flanges and the turbine, and hence the weight of the entire torque converter, may be increased. Thus, in the double-path damper described above, it is not easy to appropriately set the natural frequencies of the vibration paths B and C such that the vibration damping performance is improved, and vibration may not be damped well even by the damper device described in Published Japanese Translation of PCT Application No. 2012-506006 depending on the frequency of vibration to be damped.

An exemplary aspect of the disclosure provides a damper device which is capable of setting the natural frequency easily and appropriately and has an improved vibration damping performance.

The present disclosure provides a damper device that includes an input element to which torque from an engine is transferred; an output element; a first intermediate element; a second intermediate element; a first elastic body that transfers torque between the input element and the first intermediate element; a second elastic body that transfers torque between the first intermediate element and the output element; a third elastic body that transfers torque between the input element and the second intermediate element; a fourth elastic body that transfers torque between the second intermediate element and the output element; and a fifth elastic body that transfers torque between the first intermediate element and the second intermediate element, in which: a natural frequency of the first intermediate element at a time when torque is transferred from the input element to the output element via all of the first to fifth elastic bodies is lower than a natural frequency of the second intermediate element at a time when torque is transferred from the input element to the output element via all of the first to fifth elastic bodies; and at least one of the first and second elastic bodies is disposed on a radially outer side of the third and fourth elastic bodies.

In the damper device, two natural frequencies can be set for the entire device when deflection of all of the first to fifth elastic bodies is allowed. The studies and the analyses conducted by the inventors revealed that the natural frequency of the damper device which included the first to fifth elastic bodies became lower as the rigidity of the fifth elastic body was lowered, and that variations in equivalent rigidity of the damper device with respect to variations in rigidity of the fifth elastic body were significantly small compared to variations in equivalent rigidity of the damper device with respect to variations in rigidities of the first to fourth elastic bodies. Thus, with the damper device, by adjusting the rigidity of the fifth elastic body, it is possible to set the two natural frequencies of the entire damper device easily and appropriately while keeping the equivalent rigidity of the damper device appropriate and suppressing an increase in weights (moments of inertia) of the first and second intermediate elements. Furthermore, the natural frequency of the first intermediate element can be further reduced by increasing the moment of inertia of the first intermediate element by disposing at least one of the first and second elastic bodies corresponding to the first intermediate element, which has a natural frequency that is lower than that of the second intermediate element, on the radially outer side of the third and fourth elastic bodies. As a result, the vibration damping performance of the damper device can be improved well.

BRIEF DESCRIPTION OF THE DRAWINGS

FIG. 1 illustrates an example of the relationship between the rigidity of the third elastic body in the damper device according to the present disclosure and the natural frequency on the low-rotation side, the frequency of the antiresonance point, and the equivalent rigidity of the damper device.

FIG. 21 is a sectional view illustrating still another damper device according to the present disclosure.

FIG. 22 is a sectional view illustrating another damper device according to the present disclosure.

DETAILED DESCRIPTION OF EMBODIMENTS

Now, an embodiment of the disclosure according to the present disclosure will be described with reference to the drawings.

Figure 1:
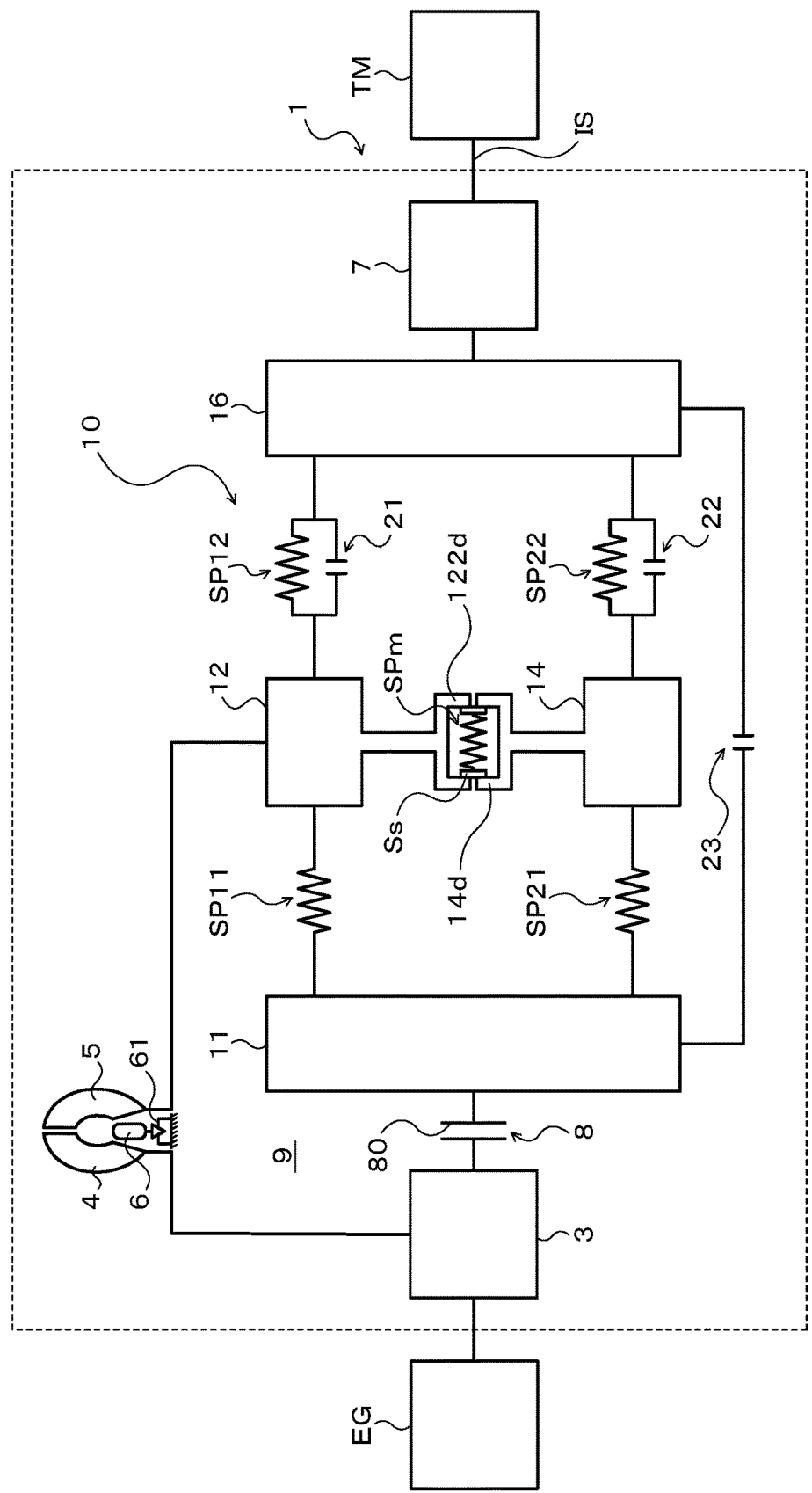
FIG. 1 is a schematic diagram illustrating a starting device that includes a damper device according to the present disclosure.
Figure 2:
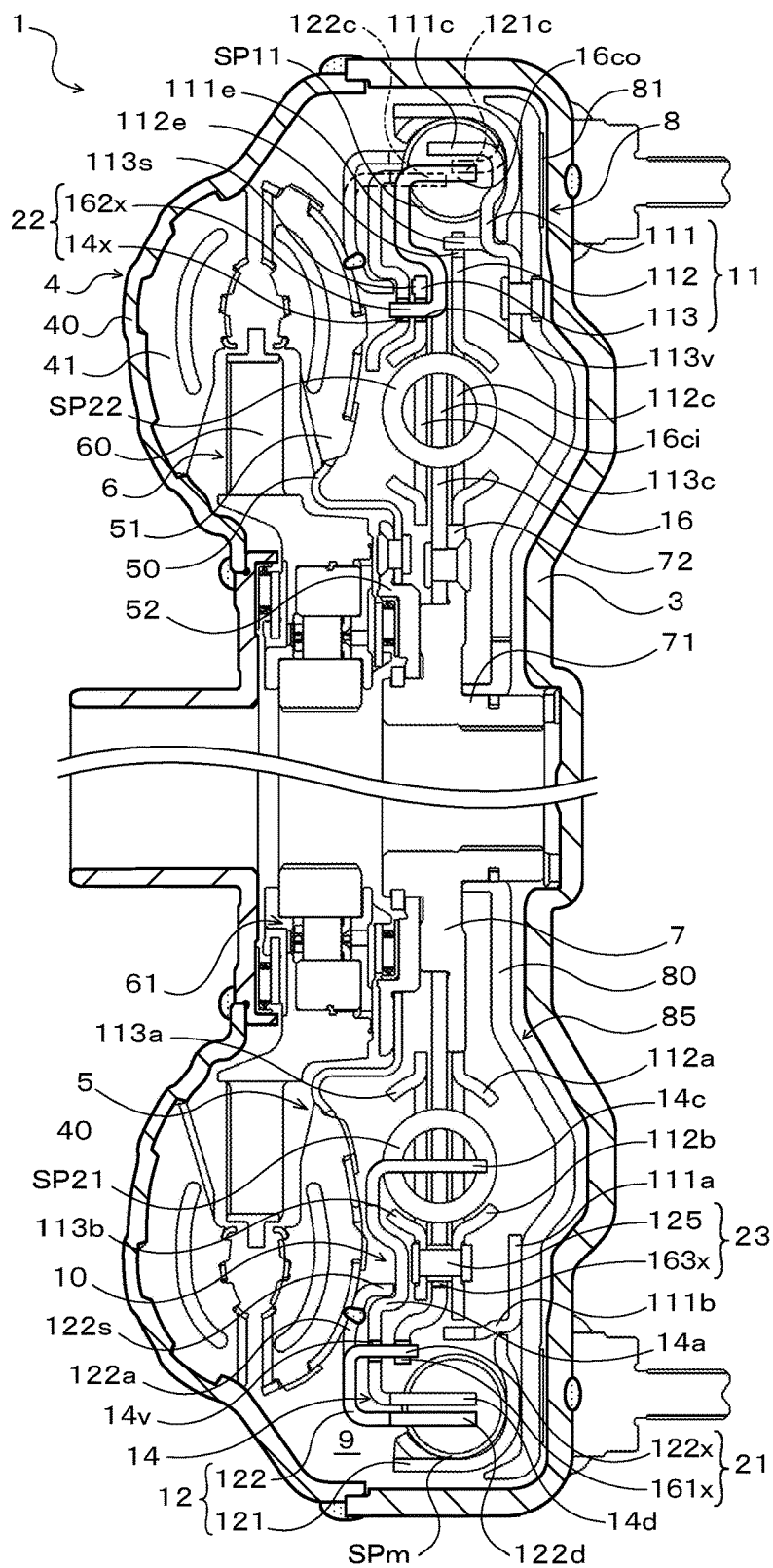
FIG. 2 is a sectional view illustrating the starting device of FIG. 1.

FIG. 1 is a schematic diagram illustrating a starting device 1 that includes a damper device 10 according to the present disclosure. FIG. 2 is a sectional view illustrating the starting device 1. The starting device 1 illustrated in the drawings is mounted on a vehicle that includes an engine (in the present embodiment, an internal combustion engine) EG that serves as a motor. In addition to the damper device 10, the starting device 1 includes: a front cover 3 coupled to a crankshaft of the engine EG; a pump impeller (input-side fluid transmission element) 4 fixed to the front cover 3; a turbine runner (output-side fluid transmission element) 5 that is coaxially rotatable with the pump impeller 4; a damper hub 7 that serves as a power output member coupled to the damper device 10 and fixed to an input shaft IS of a transmission (power transfer device) TM that is an automatic transmission (AT), a continuously variable transmission (CVT), a dual clutch transmission (DCT), a hybrid transmission, or a speed reducer; a lock-up clutch 8; and so forth.

In the following description, unless specifically stated, the term "axial direction" basically indicates the direction of extension of a center axis CA (axis; see FIG. 4) of the starting device 1 and the damper device 10. In addition, unless specifically stated, the term "radial direction" basically indicates the radial direction of a rotational element such as the starting device 1 or the damper device 10, that is, the direction of extension of a line that extends in directions (radial directions) that are orthogonal to the center axis CA from the center axis CA of the starting device 1 or the damper device 10. Furthermore, unless specifically stated, the term "circumferential direction" basically indicates the circumferential direction of a rotary element such as the starting device 1 or the damper device 10, that is, the direction along the rotational direction of such a rotary element.

As illustrated in FIG. 2, the pump impeller 4 has a pump shell 40 tightly fixed to the front cover 3 and a plurality of pump blades 41 disposed on the inner surface of the pump shell 40. As illustrated in FIG. 2, the turbine runner 5 has a turbine shell 50 and a plurality of turbine blades 51 disposed on the inner surface of the turbine shell 50. The inner peripheral portion of the turbine shell 50 is fixed to a turbine hub 52 via a plurality of rivets. The turbine hub 52 is rotatably supported by the damper hub 7. Movement of the turbine hub 52 (turbine runner 5) in the axial direction of the starting device 1 is restricted by the damper hub 7 and a snap ring mounted to the damper hub 7.

The pump impeller 4 and the turbine runner 5 face each other. A stator 6 is disposed between and coaxially with the pump impeller 4 and the turbine runner 5. The stator 6 adjusts a flow of working oil (working fluid) from the turbine runner 5 to the pump impeller 4. The stator 6 has a plurality of stator blades 60. The rotational direction of the stator 6 is set to only one direction by a one-way clutch 61. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 61 may be omitted from the starting device 1, and that the pump impeller 4 and the turbine runner 5 may function as a fluid coupling.

The lock-up clutch 8 can establish and release lock-up in which the front cover 3 and the damper hub 7 are coupled to each other via the damper device 10. In the present embodiment, the lock-up clutch 8 is constituted as a hydraulic single-plate clutch, and has a lock-up piston (power input member) 80 disposed inside the front cover 3 and in the vicinity of the inner wall surface of the front cover 3 on the engine EG side and fitted so as to be movable in the axial direction with respect to the damper hub 7. In addition, as illustrated in FIG. 2, a friction material 88 is affixed to a surface of the lock-up piston 80 on the outer peripheral side and on the front cover 3 side. Furthermore, a lock-up chamber (engagement oil chamber) 85 is defined between the lock-up piston 80 and the front cover 3. The lock-up chamber 85 is connected to a hydraulic control device (not illustrated) via a working oil supply passage and an oil passage formed in the input shaft IS.

Working oil from the hydraulic control device, which is supplied radially outward from a portion near the axis of the pump impeller 4 and the turbine runner 5 (the vicinity of the one-way clutch 61) to the pump impeller 4 and the turbine runner 5 (torus) via the oil passage which is formed in the input shaft IS, can flow into the lock-up chamber 85. Thus, if the pressure in a fluid transmission chamber 9 defined by the front cover 3 and the pump shell of the pump impeller 4 and the pressure in the lock-up chamber 85 are kept equal to each other, the lock-up piston 80 is not moved toward the front cover 3, and the lock-up piston 80 is not frictionally engaged with the front cover 3. If the hydraulic pressure in the fluid transmission chamber 9 is made higher than the hydraulic pressure in the lock-up chamber 89 by the hydraulic control device (not illustrated), in contrast, the lock-up piston 80 is moved toward the front cover 3 by a pressure difference to be frictionally engaged with the front cover 3. Consequently, the front cover 3 (engine EG) is coupled to the damper hub 7 via the lock-up piston 80 and the damper device 10. A hydraulic multi-plate clutch that includes at least one friction engagement plate (a plurality of friction materials) may be adopted as the lock-up clutch 8. In this case, a clutch drum or a clutch hub of the hydraulic multi-plate clutch functions as the power input member.

The damper device 10 damps vibration between the engine EG and the transmission TM. As illustrated in FIG. 1, the damper device 10 includes, as rotary elements (rotary members, i.e. rotary mass bodies) that rotate coaxially relative to each other, a drive member (input element) 11, a first intermediate member (first intermediate element) 12, a second intermediate member (second intermediate element) 14, and a driven member (output element) 16. The damper device 10 further includes, as torque transfer elements (torque transfer elastic bodies): a plurality of (e.g. two in the present embodiment) first outer springs (first elastic bodies) SP11 disposed between the drive member 11 and the first intermediate member 12 to transfer rotational torque (torque in the rotational direction); a plurality of (e.g. two in the present embodiment) second outer springs (second elastic bodies) SP12 disposed between the first intermediate member 12 and the driven member 16 to transfer rotational torque; a plurality of (e.g. three in the present embodiment) first inner springs (third elastic bodies) SP21 disposed between the drive member 11 and the second intermediate member 14 to transfer rotational torque; a plurality of (e.g. three in the present embodiment) second inner springs (fourth elastic bodies) SP22 disposed between the second intermediate member 14 and the driven member 16 to transfer rotational torque; and a plurality of (e.g. two in the present embodiment) intermediate springs (fifth elastic bodies) SPm disposed between the first intermediate member 12 and the second intermediate member 14 to transfer rotational torque.

In the present embodiment, linear coil springs made of a metal material spirally wound so as to have an axis that extends straight when no load is applied are adopted as the first and second outer springs SP11 and SP12, the first and second inner springs SP21 and SP22, and the intermediate springs SPm. Consequently, a hysteresis due to a friction force generated between the springs which transfer torque and the rotary elements, that is, the difference between torque output when torque input to the drive member 11 is increasing and torque output when torque input to the drive member 11 is decreasing, can be reduced by expanding and contracting the springs SP11 to SPm along the axes more appropriately than the case where arc coil springs are used. The hysteresis may be quantified by the difference between torque output from the driven member 16 when the torsional angle of the damper device 10 is brought to a predetermined angle with torque input to the drive member 11 increasing and torque output from the driven member 16 when the torsional angle of the damper device 10 is brought to the predetermined angle described above with torque input to the drive member 11 decreasing. At least one of the springs SP11 to SPm may be an arc coil spring. The term "axis of a spring" means the center of winding of a metal material wound spirally in a linear coil spring or an arc coil spring.

Figure 3:
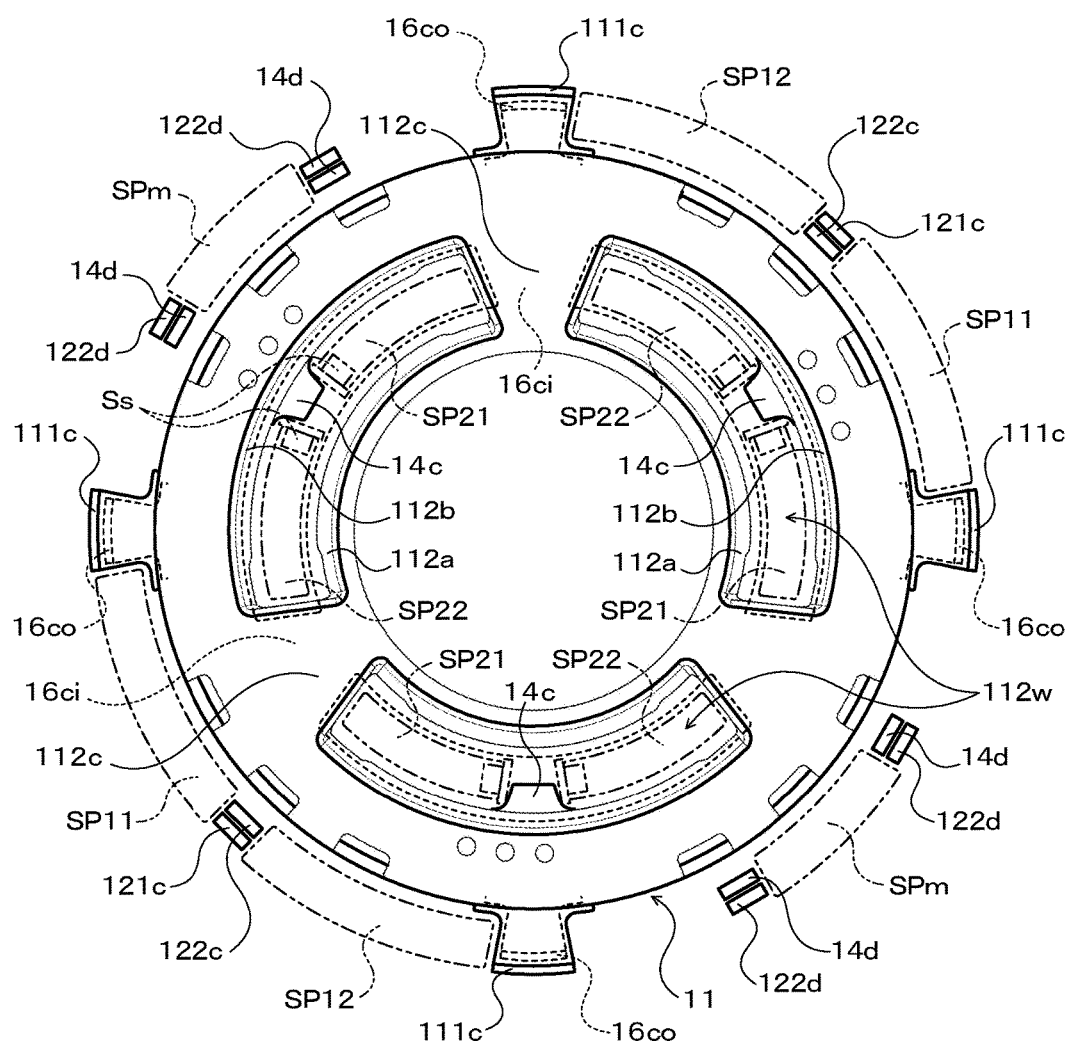
FIG. 3 is a front view illustrating the constituent elements of the damper device according to the present disclosure.

In the present embodiment, in addition, as illustrated in FIG. 3, the first outer springs SP11, the second outer springs SP12, and the intermediate springs SPm are arranged side by side in the order of SP11, SP12, SPm, SP11, SP12, and SPm, for example, along the circumferential direction of the damper device 10 (first intermediate member 12), and disposed in the outer peripheral region in the fluid transmission chamber 9 in proximity to the outer periphery of the starting device 1. In this way, by disposing the intermediate springs SPm side by side with the first and second outer springs SP11 and SP12 on the outer peripheral side along the circumferential direction, it is possible to secure the torsional angle (stroke) between the first and second outer springs SP11 and SP12 and the intermediate springs SPm well. In contrast, as illustrated in FIG. 3, the first and second inner springs SP21 and SP22 are disposed on the radially inner side of the first and second outer springs SP11 and SP12 and the intermediate springs SPm such that one first inner spring SP21 and one second inner spring SP22 are paired (act in series with each other), and such that the first and second inner springs SP21 and SP22 are arranged alternately along the circumferential direction of the damper device 10 (second intermediate member 14), and surrounded by the springs SP11, SP12, and SPm.

Figure 4:
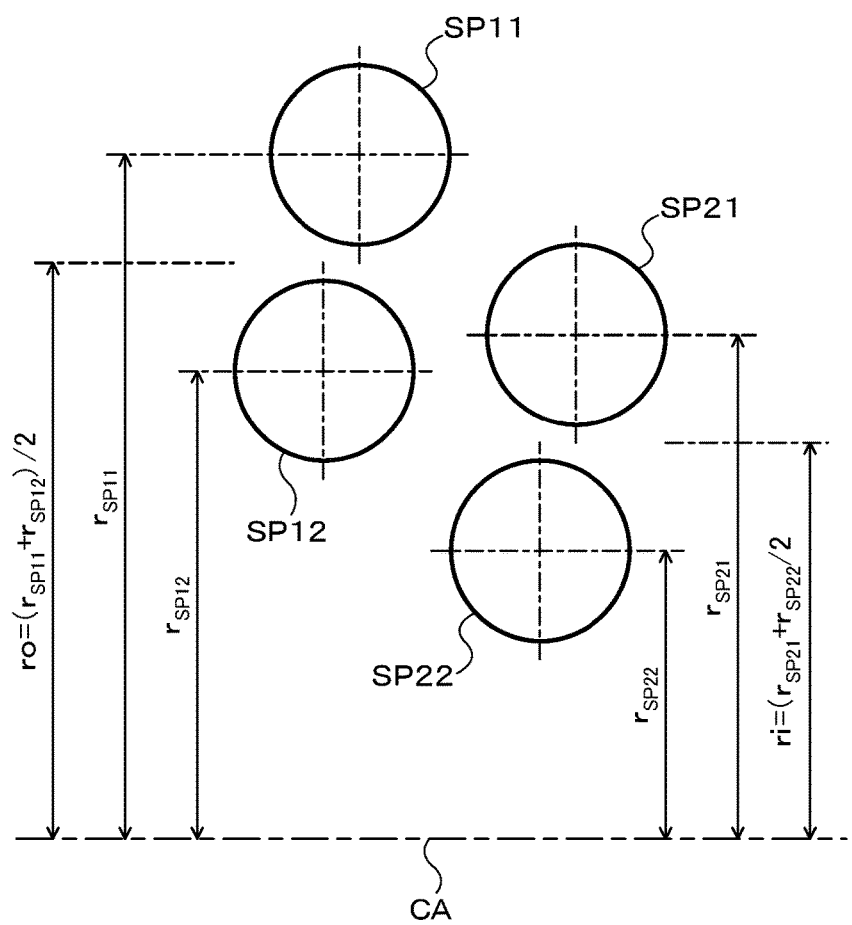
FIG. 4 is a diagram illustrating the average attachment radii of first to fourth elastic bodies in the damper device according to the present disclosure.

Consequently, in the damper device 10, an average attachment radius ro of the first and second outer springs SP11 and SP12 is larger than an average attachment radius ri of the first and second inner springs SP21 and SP22. As illustrated in FIG. 4, the average attachment radius ro of the first and second outer springs SP11 and SP12 is the average value ($=(r_{SP11}+r_{SP12})/2$) of an attachment radius $r_{SP11}$ of the first outer springs SP11, which is the distance from the center axis CA of the damper device 10 to the axis of the first outer springs (first elastic bodies) SP11, and an attachment radius $r_{SP12}$ of the second outer springs SP12, which is the distance from the center axis CA to the axis of the second outer springs (second elastic bodies) SP12. As illustrated in FIG.

4, the average attachment radius ri of the first and second inner springs SP21 and SP22 is the average value ($=(r_{SP21}+r_{SP22})/2$) of an attachment radius $r_{SP21}$ of the first inner springs SP21, which is the distance from the center axis CA to the axis of the first inner springs (third elastic bodies) SP21, and an attachment radius $r_{SP22}$ of the second inner springs SP22, which is the distance from the center axis CA to the axis of the second inner springs (fourth elastic bodies) SP22. The attachment radius $r_{SP11}$, $r_{SP12}$, $r_{SP21}$, or $r_{SP22}$ may be the distance between the center axis CA and a point (e.g. the center or an end portion in the axial direction) determined in advance on the axis of the springs SP11, SP12, SP21, or SP22.

In the present embodiment, in addition, the first and second outer springs SP11 and SP12 (and the intermediate springs SPm) are arranged on the same circumference so that the attachment radius $r_{SP11}$ and the attachment radius $r_{SP12}$ are equal to each other, and the axis of the first outer springs SP11 and the axis of the second outer springs SP12 are included in one plane that is orthogonal to the center axis CA. In the present embodiment, further, the first and second inner springs SP21 and SP22 are arranged on the same circumference so that the attachment radius $r_{SP21}$ and the attachment radius $r_{SP22}$ are equal to each other, and the axis of the first inner springs SP21 and the axis of the second inner springs SP22 are included in one plane that is orthogonal to the center axis CA. In the damper device 10, additionally, the first and second inner springs SP21 and SP22 are disposed on the radially inner side of the first and second outer springs SP11 and SP12 so as to overlap the first and second outer springs SP11 and SP12 in the axial direction as seen in the radial direction. Consequently, it is possible to make the damper device 10 compact in the radial direction, and to shorten the axial length of the damper device 10.

It should be noted, however, that as illustrated in FIG. 4, the attachment radius $r_{SP11}$ from the center axis CA to the axis of the first outer springs SP11 and the attachment radius $r_{SP12}$ from the center axis CA to the axis of the second outer springs SP12 may be different from each other. In addition, the attachment radius $r_{SP21}$ from the center axis CA to the axis of the first inner springs SP21 and the attachment radius $r_{SP22}$ from the center axis CA to the axis of the second inner springs SP22 may be different from each other. That is, the attachment radius $r_{SP11}$, $r_{SP12}$ of at least one of the first and second outer springs SP11 and SP12 may be larger than the attachment radius $r_{SP21}$, $r_{SP22}$ of at least one of the first and second inner springs SP21 and SP22. Furthermore, the axis of the first outer springs SP11 and the axis of the second outer springs SP12 may not be included in one plane that is orthogonal to the center axis CA. In addition, the axis of the first inner springs SP21 and the axis of the second inner springs SP22 may not be included in one plane that is orthogonal to the center axis CA. In addition, the axes of the springs SP11, SP12, SP21, and SP22 may be included in one plane that is orthogonal to the center axis CA, and at least one of the axes of the springs SP11, SP12, SP21, and SP22 may not be included in the one plane.

In the present embodiment, the rigidity, that is, the spring constant, of the first outer springs SP11 is defined as "$k_{11}$", the rigidity, that is, the spring constant, of the second outer springs SP12 is defined as "$k_{12}$", the rigidity, that is, the spring constant, of the first inner springs SP21 is defined as "$k_{21}$", and the rigidity, that is, the spring constant, of the second inner springs SP22 is defined as "$k_{22}$". The spring constants $k_{11}$, $k_{12}$, $k_{21}$, and $k_{22}$ are selected such that the relations $k_{11} \neq k_{21}$ and $k_{11}/k_{21} \neq k_{12}/k_{22}$ are met. More particularly, the spring constants $k_{11}$, $k_{12}$, $k_{21}$, and $k_{22}$ meet the relations $k_{11}/k_{21} < k_{12}/k_{22}$ and $k_{11} < k_{12} < k_{22} < k_{21}$. That is, the smaller one ($k_{11}$) of the spring constants $k_{11}$ and $k_{12}$ of the first and second outer springs SP11 and SP12 is smaller than the smaller one ($k_{22}$) of the spring constants $k_{21}$ and $k_{22}$ of the first and second inner springs SP21 and SP22. When the rigidity, that is, the spring constant, of the intermediate springs SPm is defined as "$k_m$", further, the spring constants $k_{11}$, $k_{12}$, $k_{21}$, $k_{22}$, and $k_m$ meet the relation $k_{11} < k_m < k_{12} < k_{22} < k_{21}$.

As illustrated in FIG. 2, the drive member 11 of the damper device 10 includes: an annular first plate member (first input member) 111 fixed to the lock-up piston 80 of the lock-up clutch 8; an annular second plate member (second input member) 112 rotatably supported (aligned) by the damper hub 7 and coupled so as to be rotatable together with the first plate member 111; and an annular third plate member (third input member) 113 disposed in more proximity to the turbine runner 5 than the second plate member 112 and coupled (fixed) to the second plate member 112 via a plurality of rivets (couplers) 125. Consequently, the drive member 11, that is, the first, second, and third plate members 111, 112, and 113, rotates together with the lock-up piston 80, and the front cover 3 (engine EG) and the drive member 11 of the damper device 10 are coupled to each other through engagement of the lock-up clutch 8.

Figure 5:
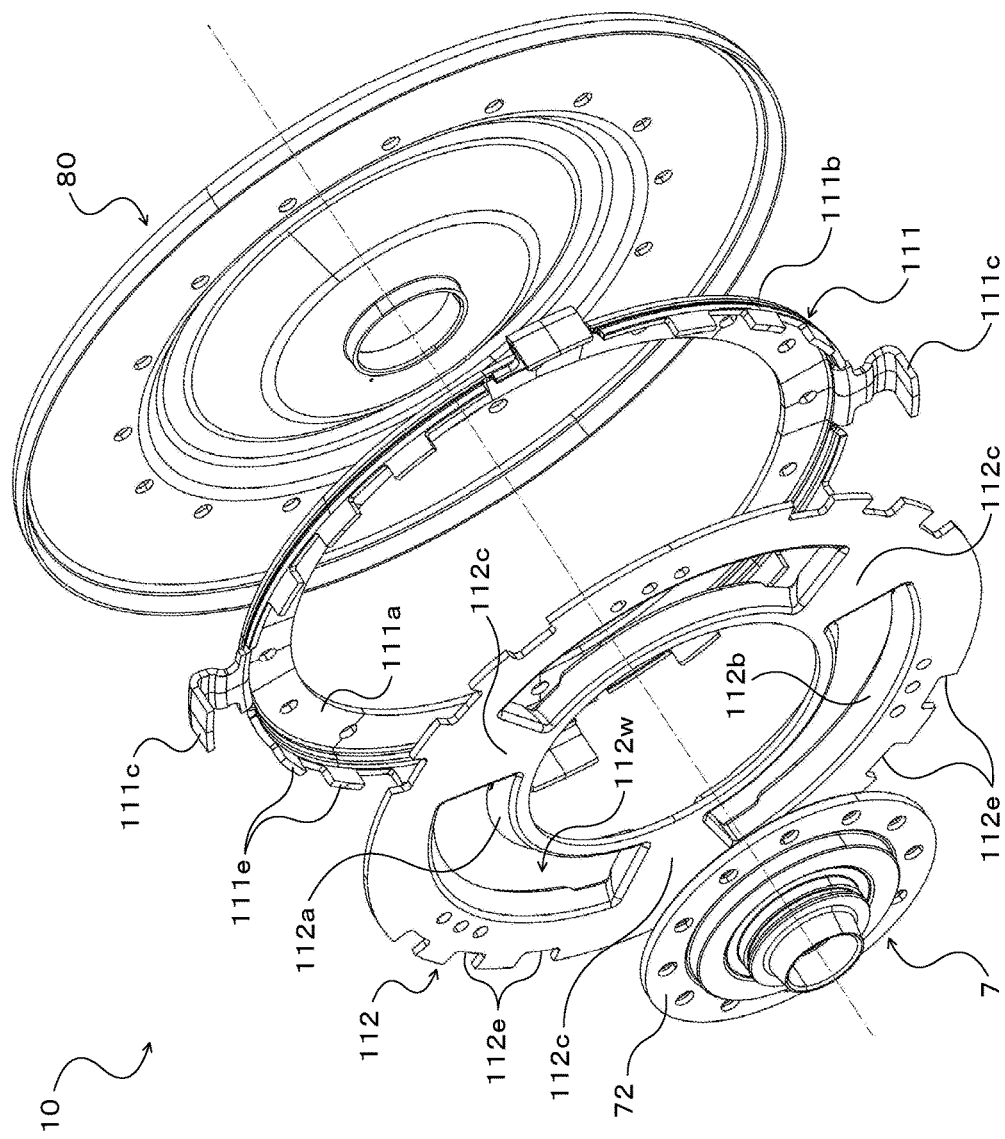
FIG. 5 is a perspective view illustrating the constituent elements of the damper device according to the present disclosure.

As illustrated in FIGS. 2 and 5, the first plate member 111 has: an annular fixed portion 111I a fixed to the inner surface (a surface to which the friction material 88 is not affixed) of the lock-up piston 80 on the outer peripheral side via a plurality of rivets; a short tubular portion 111b that extends in the axial direction from the outer peripheral portion of the fixed portion 111a; a plurality of (e.g. four in the present embodiment) spring abutment portions (first abutment portions) 111c that extend radially outward at intervals (equal intervals) in the circumferential direction from the free end portion of the tubular portion 111b and that extend in the axial direction away from the fixed portion 111a; and a plurality of (e.g. twelve in the present embodiment) engagement projecting portions 111e that extend in the axial direction from the free end portion of the tubular portion 111b at intervals in the circumferential direction. As illustrated in FIG. 2, the lock-up piston 80 to which the first plate member 111 is fixed is rotatably supported by a cylindrical first support portion 71 formed on the damper hub 7.

The second plate member 112 is constituted as an annular plate-like member, disposed in more proximity to the lock-up piston 80 than the third plate member 113, and rotatably supported by a cylindrical second support portion 72 formed on the damper hub 7. As illustrated in FIG. 2, the second support portion 72 of the damper hub 7 is formed as shifted in the axial direction of the damper device 10 from the first support portion 71 so as to be in more proximity to the turbine runner 5 than the first support portion 71. In addition, the second support portion 72 has an outside diameter that is larger than that of the first support portion 71, and is provided on the radially outer side of the first support portion 71.

In addition, the second plate member 112 has: a plurality of (e.g. three in the present embodiment) spring housing windows 112w (see FIGS. 3 and 5) that extend arcuately and that are disposed at intervals (at equal intervals) in the circumferential direction; a plurality of (e.g. three in the present embodiment) spring support portions 112a that extend along the inner peripheral edges of the respective spring housing windows 112w and that are arranged at intervals (equal intervals) in the circumferential direction; a plurality of (e.g. three in the present embodiment) spring support portions 112b that extend along the outer peripheral edges of the respective spring housing windows 112w and that are arranged at intervals (equal intervals) in the circumferential direction to face the respective spring support portions 112a in the radial direction of the second plate member 112; and a plurality of (e.g. three in the present embodiment) spring abutment portions (second abutment portions) 112c. The plurality of spring abutment portions 112c of the second plate member 112 are provided such that each spring abutment portion 112c is interposed between the spring housing windows 112w (spring support portions 112a and 112b) which are adjacent to each other along the circumferential direction. Furthermore, a plurality of (e.g. twelve in the present embodiment) engagement recessed portions 112e are formed at the outer peripheral portion of the second plate member 112 at intervals in the circumferential direction. The engagement recessed portions 112e are fitted with the respective engagement projecting portions I11e of the first plate member 111 with backlash in the radial direction. The first and second plate members 111 and 112 are relatively movable in the radial direction with the engagement projecting portions 111e fitted with the engagement recessed portions 112e.

The third plate member 113 is also constituted of an annular plate-like member. The third plate member 113 has: a plurality of (e.g. three in the present embodiment) spring housing windows that extend arcuately and that are disposed at intervals (at equal intervals) in the circumferential direction; a plurality of (e.g. three in the present embodiment) spring support portions 113a that extend along the inner peripheral edges of the respective spring housing windows and that are arranged at intervals (equal intervals) in the circumferential direction; a plurality of (e.g. three in the present embodiment) spring support portions 113b that extend along the outer peripheral edges of the respective spring housing windows and that are arranged at intervals (equal intervals) in the circumferential direction to face the respective spring support portions 113a in the radial direction of the third plate member 113; and a plurality of (e.g. three in the present embodiment) spring abutment portions (third abutment portions) 113c. The plurality of spring abutment portions 113c of the third plate member 113 are provided such that each spring abutment portion 113c is interposed between the spring support portions 113a and 113b (spring housing windows) which are adjacent to each other along the circumferential direction.

As illustrated in FIG. 2, the first intermediate member 12 includes an elastic body support member 121 and a coupling member 122. The elastic body support member 121 is formed in an annular shape so as to support (guide) the outer peripheral portions of the first and second outer springs SP11 and SP12, the side portions (right side portions in FIG. 2) of the first and second outer springs SP11 and SP12 on the lock-up piston 80 side (engine EG side), and the outer peripheral side of the side portions of the first and second outer springs SP11 and SP12 on the turbine runner 5 side (transmission TM side). The elastic body support member 121 is rotatably supported (aligned) in the radial direction by the tubular portion 111b of the first plate member 111 of the drive member 11, and disposed in the outer peripheral region in the fluid transmission chamber 9. By disposing the first intermediate member 12 in the outer peripheral region in the fluid transmission chamber 9 in this way, it is possible to make the moment of inertia (inertia) of the first intermediate member 12 larger. In addition, the elastic body support member 121 has a plurality of (e.g. two at intervals of 180° in the present embodiment) spring abutment portions 121c disposed at intervals in the circumferential direction. The spring abutment portions 121c extend in the axial direction from the side portion of the elastic body support member 121 on the lock-up piston 80 side toward the turbine runner 5.

The coupling member 122 which constitutes the first intermediate member 12 has: an annular fixed portion (annular portion) 122a fixed to the turbine shell 50 of the turbine runner 5 by welding, for example; a plurality of (e.g. two at intervals of 180° in the present embodiment) spring abutment portions (first spring abutment portions) 122c that extend in the axial direction from the outer peripheral portion of the fixed portion 122a at intervals in the circumferential direction; a plurality of (e.g. four in the present embodiment) second spring abutment portions 122d that extend in the axial direction from the outer peripheral portion of the fixed portion 122a between the spring abutment portions 122c; and a support portion 122s in a short cylindrical shape that extends in the axial direction from the inner peripheral portion of the fixed portion 122a toward the same side as the spring abutment portions 122c and 122d extend. The plurality of second spring abutment portions 122d of the coupling member 122 are formed symmetrically with respect to the axis of the coupling member 122 such that two (a pair of) second spring abutment portions 122d are proximate to each other (see FIG. 3). The two second spring abutment portions 122d which are paired with each other are arranged in the circumferential direction at an interval that matches the natural length of the intermediate springs SPm, for example.

The second intermediate member 14 has: an annular supported portion (annular portion) 14a; a plurality of (e.g. three at intervals of 120° in the present embodiment) spring abutment portions (first spring abutment portions) 14c that extend in the axial direction from the inner peripheral portion of the supported portion 14a at intervals in the circumferential direction; and a plurality of (e.g. four in the present embodiment) second spring abutment portions 14d that extend in the axial direction from the outer peripheral portion of the supported portion 14a toward the same side as the spring abutment portions 14c extend. The plurality of second spring abutment portions 14d of the second intermediate member 14 are formed symmetrically with respect to the axis of the second intermediate member 14 such that two (a pair of) second spring abutment portions 14d are proximate to each other (see FIG. 3). The two second spring abutment portions 14d which are paired with each other are arranged in the circumferential direction at an interval that matches the natural length of the intermediate springs SPm, for example.

As illustrated in FIG. 2, the second intermediate member 14 is rotatably supported by the coupling member 122 of the first intermediate member 12 which is fixed to the turbine runner 5, and the supported portion 14a of the second intermediate member 14 is positioned between the third plate member 113 of the drive member 11 and the turbine runner 5 in the axial direction. In the present embodiment, the supported portion 14a of the second intermediate member 14 is formed with a recessed portion with which the support portion 122s of the coupling member 122 is fitted, and the second intermediate member 14 is rotatably supported by the support portion 122s. In addition, movement of the second intermediate member 14 toward the turbine runner 5 is restricted with the supported portion 14a of the second intermediate member 14 abutting against the distal end of the support portion 122s. Furthermore, a plurality of movement restriction projecting portions 113s are formed at the outer peripheral portion of the third plate member 113 at intervals in the circumferential direction. The plurality of movement restriction projecting portions 113s project from the surface on the turbine runner 5 side toward the second intermediate member 14. Thus, movement of the second intermediate member 14 in the direction away from the turbine runner 5 (toward the lock-up piston 80) is restricted with the supported portion 14a of the second intermediate member 14 abutting against the movement restriction projecting portions 113s of the third plate member 113.

The driven member 16 is constituted as an annular plate-like member. As illustrated in FIG. 2, the driven member 16 is disposed between the second plate member 112 and the third plate member 113 of the drive member 11 in the axial direction, and fixed to the damper hub 7 (in the present embodiment, the second support portion 72) via rivets. Consequently, the driven member 16 is rotated together with the damper hub 7. The driven member 16 has: a plurality of (e.g. three in the present embodiment) spring housing windows that extend arcuately and that are disposed at intervals (equal intervals) in the circumferential direction; a plurality of (e.g. three in the present embodiment) inner spring abutment portions (inner abutment portions) 16ci formed at intervals in the circumferential direction in proximity to the inner peripheral edge of the driven member 16; and a plurality of (e.g. four in the present embodiment) outer spring abutment portions (outer abutment portions) 16co that are arranged at intervals (equal intervals) in the circumferential direction on the radially outer side with respect to the plurality of inner spring abutment portions 16ci and that extend in the axial direction from the turbine runner 5 side toward the lock-up piston 80. The plurality of inner spring abutment portions 16ci of the driven member 16 are provided such that each inner spring abutment portion 16ci is interposed between the spring housing windows which are adjacent to each other along the circumferential direction.

As illustrated in FIG. 2, the first and second outer springs SP11 and SP12 are supported by the elastic body support member 121 of the first intermediate member 12 such that one first outer spring SP11 and one second outer spring SP12 are paired (act in series with each other), and such that the first and second outer springs SP11 and SP12 are arranged alternately along the circumferential direction of the first intermediate member 12. In addition, with the damper device 10 in an attached state, the spring abutment portions 111c of the first plate member 111 of the drive member 11 each abut against the end portion (end portion in the deflection direction; the same applies hereinafter) of a corresponding one of the first and second outer springs SP11 and SP12 in the circumferential direction. Furthermore, as illustrated in FIG. 3, the spring abutment portions 121c of the elastic body support member 121 are each provided between the first and second outer springs SP11 and SP12, which are adjacent to and pared with each other (act in series with each other), so as to abut against the end portions of such first and second outer springs SP11 and SP12 in the circumferential direction. In addition, as illustrated in FIG. 3, the spring abutment portions 122c of the coupling member 122 are each also provided between the first and second outer springs SP11 and SP12, which are adjacent to and paired with each other, so as to abut against the end portions of such first and second outer springs SP11 and SP12 in the circumferential direction.

That is, with the damper device 10 in the attached state, a first end portion (end portion on the intermediate spring SPm side in FIG. 3) of each first outer spring SP11 abuts against a corresponding one of the spring abutment portions 111c of the drive member 11, and a second end portion (end portion on the second outer spring SP12 side in FIG. 3) of each first outer spring SP11 abuts against a corresponding one of the spring abutment portions 121c and a corresponding one of the spring abutment portions 122c of the first intermediate member 12. With the damper device 10 in the attached state, in addition, a first end portion (end portion on the first outer spring SP11 side in FIG. 3) of each second outer spring SP12 abuts against a corresponding one of the spring abutment portions 121c and a corresponding one of the spring abutment portions 122c of the first intermediate member 12, and a second end portion (end portion on the intermediate spring SPm side in FIG. 3) of each second outer spring SP12 abuts against a corresponding one of the spring abutment portions 111c of the drive member 11.

Furthermore, as with the spring abutment portions 111c of the drive member 11, the outer spring abutment portions 16co of the driven member 16 are each provided between the first and second outer springs SP11 and SP12, which are not paired (do not act in series with each other), so as to abut against the end portions of such first and second outer springs SP11 and SP12 in the circumferential direction. That is, with the damper device 10 in the attached state, the first end portion (end portion on the intermediate spring SPm side) of the first outer spring SP11 and the second end portion (end portion on the intermediate spring SPm side) of the second outer spring SP12 which is paired with the first outer spring SP11 abut against the respective outer spring abutment portions 16co of the driven member 16. As a result, the driven member 16 is coupled to the drive member 11 via the plurality of first outer springs SP11, the first intermediate member 12 (the elastic body support member 121 and the coupling member 122), and the plurality of second outer springs SP12.

In addition, the coupling member 122 of the first intermediate member 12 is fixed to the turbine runner 5. Thus, the first intermediate member 12 and the turbine runner 5 are coupled so as to rotate together with each other. In this way, by coupling the turbine runner 5 (and the turbine hub 52) to the first intermediate member 12, it is possible to further increase the substantial moment of inertia of the first intermediate member 12 (the total of the moments of inertia of the elastic body support member 121, the coupling member 122, the turbine runner 5, and so forth). In addition, by coupling the turbine runner 5 and the first intermediate member 12, which is disposed on the radially outer side of the first and second inner springs SP21 and SP22, that is, in the outer peripheral region in the fluid transmission chamber 9, to each other, it is possible to prevent the coupling member 122 from passing through a space between the third plate member 113 of the drive member 11 or the first and second inner springs SP21 and SP22 and the turbine runner 5 in the axial direction. Consequently, it is possible to suppress an increase in axial length of the damper device 10, and hence the starting device 1, better.

Meanwhile, as illustrated in FIGS. 2 and 3, the plurality of spring support portions 112a of the second plate member 112 support (guide) the side portions of the associated first and second inner springs SP21 and SP22 (one each) on the lock-up piston 80 side from the inner peripheral side. In addition, the plurality of spring support portions 112b support (guide) the side portions of the associated first and second inner springs SP21 and SP22 on the lock-up piston 80 side from the outer peripheral side. Furthermore, as illustrated in FIG. 2, the plurality of spring support portions 113a of the third plate member 113 support (guide) the side portions of the associated first and second inner springs SP21 and SP22 (one each) on the turbine runner 5 side from the inner peripheral side. In addition, the plurality of spring support portions 113b support (guide) the side portions of the associated first and second inner springs SP21 and SP22 on the turbine runner 5 side from the outer peripheral side. That is, the first and second inner springs SP21 and SP22 are supported by the spring support portions 112a and 112b of the second plate member 112 and the spring support portions 113a and 113b of the third plate member 113, which constitute the drive member 11, such that one first inner spring SP21 and one second inner spring SP22 are paired (act in series with each other) and such that the first and second inner springs SP21 and SP22 are arranged alternately in the circumferential direction (circumferential direction of the second intermediate member 14).

Furthermore, as illustrated in FIG. 3, with the damper device 10 in the attached state, the spring abutment portions 112c of the second plate member 112 are each provided between the first and second inner springs SP21 and SP22, which are supported by different spring housing windows 112w (spring support portions 112a, 112b, 113a, and 113b) and which are not paired (do not act in series with each other), so as to abut against the end portions of such first and second inner springs SP21 and SP22 in the circumferential direction. Similarly, with the damper device 10 in the attached state, the spring abutment portions 113c of the third plate member 113 are each provided between the first and second inner springs SP21 and SP22, which are supported by different spring support portions 112a, 112b, 113a, and 113b (spring housing windows) (which are not paired), so as to abut against the end portions of such first and second inner springs SP21 and SP22 in the circumferential direction. In addition, as illustrated in FIG. 3, the spring abutment portions 14c of the second intermediate member 14 are each provided between the first and second inner springs SP21 and SP22, which are paired with each other (act in series with each other), so as to abut against the end portions of such first and second inner springs SP21 and SP22 in the circumferential direction.

That is, with the damper device 10 in the attached state, a first end portion of each first inner spring SP21 abuts against a corresponding one of the spring abutment portions 112c and a corresponding one of the spring abutment portions 113c of the drive member 11, and a second end portion of each first inner spring SP21 abuts against a corresponding one of the spring abutment portions 14c of the second intermediate member 14. Furthermore, with the damper device 10 in the attached state, a first end portion of each second inner spring SP22 abuts against a corresponding one of the spring abutment portions 14c of the second intermediate member 14, and a second end portion of each second inner spring SP22 abuts against a corresponding one of the spring abutment portions 112c and a corresponding one of the spring abutment portions 113c of the drive member 11. As illustrated in FIG. 3, spring seats Ss may be disposed between each spring abutment portion 14c and the second end portion of the corresponding first inner spring SP21 and between the spring abutment portion 14c and the first end portion of the corresponding second inner spring SP22.

In addition, with the damper device 10 in the attached state, as with the spring abutment portions 112c and 113c of the drive member 11, the inner spring abutment portions 16ci of the driven member 16 are each provided between the first and second inner springs SP21 and SP22, which are not paired (do not act in series with each other), so as to abut against the end portions of such first and second inner springs SP21 and SP22 in the circumferential direction. Consequently, with the damper device 10 in the attached state, the first end portion of each first inner spring SP21 also abuts against the corresponding inner spring abutment portion 16ci of the driven member 16, and the second end portion of each second inner spring SP22 also abuts against the corresponding inner spring abutment portion 16ci of the driven member 16. As a result, the driven member 16 is coupled to the drive member 11 via the plurality of first inner springs SP21, the second intermediate member 14, and the plurality of second inner springs SP22.

Figure 6:
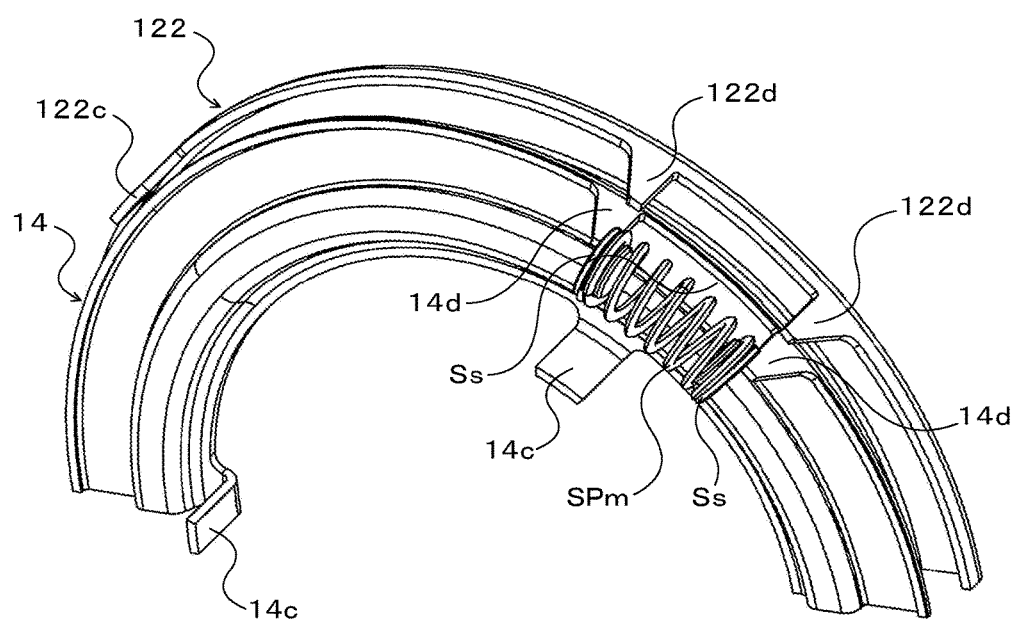
FIG. 6 is a perspective view illustrating the constituent elements of the damper device according to the present disclosure.

With the damper device 10 in the attached state, each intermediate spring SPm is supported from both sides by the pair of second spring abutment portions 122d of the first intermediate member 12 (coupling member 122), and supported from both sides by the pair of second spring abutment portions 14d of the second intermediate member 14. Consequently, the first intermediate member 12 and the second intermediate member 14 are coupled to each other via the plurality of intermediate springs SPm. In the present embodiment, as illustrated in FIGS. 1 and 6, spring seats Ss are disposed between the end portions of the intermediate springs SPm and the second spring abutment portions 14d and 122d.

Furthermore, as illustrated in FIG. 1, the damper device 10 includes: a first stopper 21 that restricts relative rotation between the first intermediate member 12 and the driven member 16 and deflection of the second outer springs SP12; a second stopper 22 that restricts relative rotation between the second intermediate member 14 and the driven member 16 and deflection of the second inner springs SP22; and a third stopper 23 that restricts relative rotation between the drive member 11 and the driven member 16. The first and second stoppers 21 and 22 are configured to restrict relative rotation between the associated rotary elements and deflection of the springs generally at the same time as input torque transferred from the engine EG to the drive member 11 has reached torque (a first threshold) T1 that is determined in advance and that is less than torque T2 (a second threshold) corresponding to a maximum torsional angle θmax of the damper device 10. In addition, the third stopper 23 is configured to restrict relative rotation between the drive member 11 and the driven member 16 when torque input to the drive member 11 has reached the torque T2 corresponding to the maximum torsional angle θmax. Consequently, the damper device 10 has damping characteristics in two stages.

In the present embodiment, as illustrated in FIG. 2, the first stopper 21 is constituted from: a plurality of stopper portions 122x that extend in the axial direction from the coupling member 122, which constitutes the first intermediate member 12, toward the lock-up piston 80 at intervals in the circumferential direction; and a plurality of notch portions 161x formed in the outer peripheral portion of the driven member 16 at intervals in the circumferential direction to extend arcuately. With the damper device 10 in the attached state, the stopper portions 122x of the first intermediate member 12 (coupling member 122) are inserted through any of a plurality of arcuate slits 14v formed in the outer peripheral portion of the supported portion 14a of the second intermediate member 14 at intervals in the circumferential direction, and disposed in the respective notch portions 161x of the driven member 16 so as not to abut against the wall surfaces of the driven member 16 which define the end portions of the notch portions 161x on both sides. Consequently, when each stopper portion 122x of the coupling member 122 and one of the wall surfaces which define the end portions of the notch portion 161x on both sides abut against each other along with relative rotation between the first intermediate member 12 and the driven member 16, relative rotation between the first intermediate member 12 and the driven member 16 and deflection of the second outer springs SP12 are restricted. In the present embodiment, the stopper portions 122x of the first intermediate member 12 and the wall surfaces of the second intermediate member 14 which define the end portions of the slits 14v on both sides do not abut against each other during a period before relative rotation between the drive member 11 and the driven member 16 is restricted by the third stopper 23.

In the present embodiment, in addition, as illustrated in FIG. 2, the second stopper 22 is constituted from: a plurality of slits 14x formed in the inner peripheral portion of the supported portion 14a of the second intermediate member 14 at intervals in the circumferential direction to extend arcuately; and a plurality of stopper portions 162x that extend in the axial direction from the driven member 16 toward the turbine runner 5 at intervals in the circumferential direction. With the damper device 10 in the attached state, the stopper portions 162x of the driven member 16 are inserted through any of a plurality of arcuate slits 113v formed in the outer peripheral portion of the third plate member 113 of the drive member 11 at intervals in the circumferential direction, and disposed in the respective slits 14x of the second intermediate member 14 so as not to abut against the wall surfaces of the second intermediate member 14 which define the end portions of the slits 14x on both sides. Consequently, when each stopper portion 162x of the driven member 16 and one of the wall surfaces of the second intermediate member 14 which define the end portions of the slit 14x on both sides abut against each other along with relative rotation between the second intermediate member 14 and the driven member 16, relative rotation between the second intermediate member 14 and the driven member 16 and deflection of the second inner springs SP22 are restricted. In the present embodiment, the stopper portions 162x of the driven member 16 and the wall surfaces of the third plate member 113 which define the end portions of the slits 113v on both sides do not abut against each other during a period before relative rotation between the drive member 11 and the driven member 16 is restricted by the third stopper 23.

In the present embodiment, further, as illustrated in FIG. 2, the third stopper 23 is constituted from: collars mounted to the plurality of rivets which couple the second and third plate members 112 and 113, which constitute the drive member 11, to each other; and a plurality of notch portions 163x formed in the driven member 16 at intervals in the circumferential direction to extend arcuately. With the damper device 10 in the attached state, the plurality of rivets 125 and the collars are disposed in the respective notch portions 163x of the driven member 16 so as not to abut against the wall surfaces of the driven member 16 which define the end portions of the notch portions 163x on both sides. Consequently, when each collar discussed above and one of the wall surfaces which define the end portions of the notch portions 163x on both sides abut against each other along with relative rotation between the drive member 11 and the driven member 16, relative rotation between the drive member 11 and the driven member 16 is restricted.

In the damper device 10, as discussed above, the average attachment radius ro of the first and second outer springs SP11 and SP12 corresponding to the first intermediate member 12 is determined to be larger than the average attachment radius ri of the first and second inner springs SP21 and SP22. That is, the axis of the first and second outer springs SP11 and SP12 which have a spring constant (rigidity) that is smaller than that of the first and second inner springs SP21 and SP22 is positioned on the outer side, in the radial direction of the damper device 10, with respect to the axis of the first and second inner springs SP21 and SP22. In the damper device 10, in addition, the first and second outer springs SP11 and SP12 are disposed such that the entire first and second outer springs SP11 and SP12 are positioned on the radially outer side with respect to the first and second inner springs SP21 and SP22.

Consequently, it is possible to increase the moment of inertia of the first intermediate member 12, and to lower the rigidities of the first and second outer springs SP11 and SP12. In addition, in the case where the average attachment radius ro of the first and second outer springs SP11 and SP12 is larger than the average attachment radius ri of the first and second inner springs SP21 and SP22, the first and second outer springs SP11 and SP12, which are low in rigidity and relatively light in weight, are disposed on the outer peripheral side of the damper device 10, and the first and second inner springs SP21 and SP22, which are high in rigidity and relatively heavy in weight, are disposed on the center axis CA side of the damper device 10. Consequently, it is possible to reduce the hysteresis of the entire damper device 10 by reducing a friction force generated between the springs SP11, SP12, SP21, and SP22 and the associated rotary elements because of a centrifugal force.

In addition, by causing the elastic body support member 121 (first intermediate member 12) to support the first and second outer springs SP11 and SP12, it is possible to reduce the relative speed between the first and second outer springs SP11 and SP12, which are deflected in accordance with the torsional angle of the elastic body support member 121 with respect to the drive member 11 or the driven member 16, and the elastic body support member 121. Thus, a friction force generated between the elastic body support member 121 and the first and second outer springs SP11 and SP12 can be reduced. Thus, it is possible to lower the hysteresis of the entire damper device 10.

The damper device 10 further includes the coupling member 122 which is fixed to the turbine runner 5 and has the spring abutment portions 122c which are each provided between the first and second outer springs SP11 and SP12, which are adjacent to each other, so as to abut against the end portions of such first and second outer springs SP11 and SP12 in the circumferential direction. Consequently, it is possible to couple the first intermediate member 12 to both the first and second outer springs SP11 and SP12, which are disposed on the radially outer side, and to couple the first intermediate member 12 to the turbine runner 5 while suppressing an increase in axial length of the damper device 10. By coupling the turbine runner 5 (and the turbine hub) to the first intermediate member 12, the substantial moment of inertia of the first intermediate member 12 (the total of the moments of inertia of the elastic body support member 121, the coupling member 122, the turbine runner 5, and so forth) can be further increased. In addition, by causing both the spring abutment portions 121c of the elastic body support member 121 and the spring abutment portions 122c of the coupling member 122 to abut against the end portions of the first and second outer springs SP11 and SP12, it is possible to smoothly expand and contract the first and second outer springs SP11 and SP12.

Next, operation of the damper device 10 will be described. In the starting device 1, when lock-up by the lock-up clutch 8 is released, for example, rotational torque (power) transferred from the engine EG to the front cover 3 is transferred to the input shaft IS of the transmission TM via a path that includes the pump impeller 4, the turbine runner 5, the first intermediate member 12, the second outer springs SP12, the driven member 16, and the damper hub 7 and a path that includes the pump impeller 4, the turbine runner 5, the first intermediate member 12, the intermediate springs SPm, the second intermediate member 14, the second inner springs SP22, the driven member 16, and the damper hub 7. When lock-up is established by the lock-up clutch 8 of the starting device 1, in contrast, rotational torque (input torque) transferred from the engine EG to the drive member 11 via the front cover 3 and the lock-up clutch 8 (lock-up piston 80) is transferred to the driven member 16 and the damper hub 7 via all the springs SP11 to SPm until torque input to the drive member 11 reaches the torque T1 described above, that is, while deflection of all of the first and second outer springs SP11 and SP12, the first and second inner springs SP21 and SP22, and the intermediate springs SPm is allowed.

Figure 7:
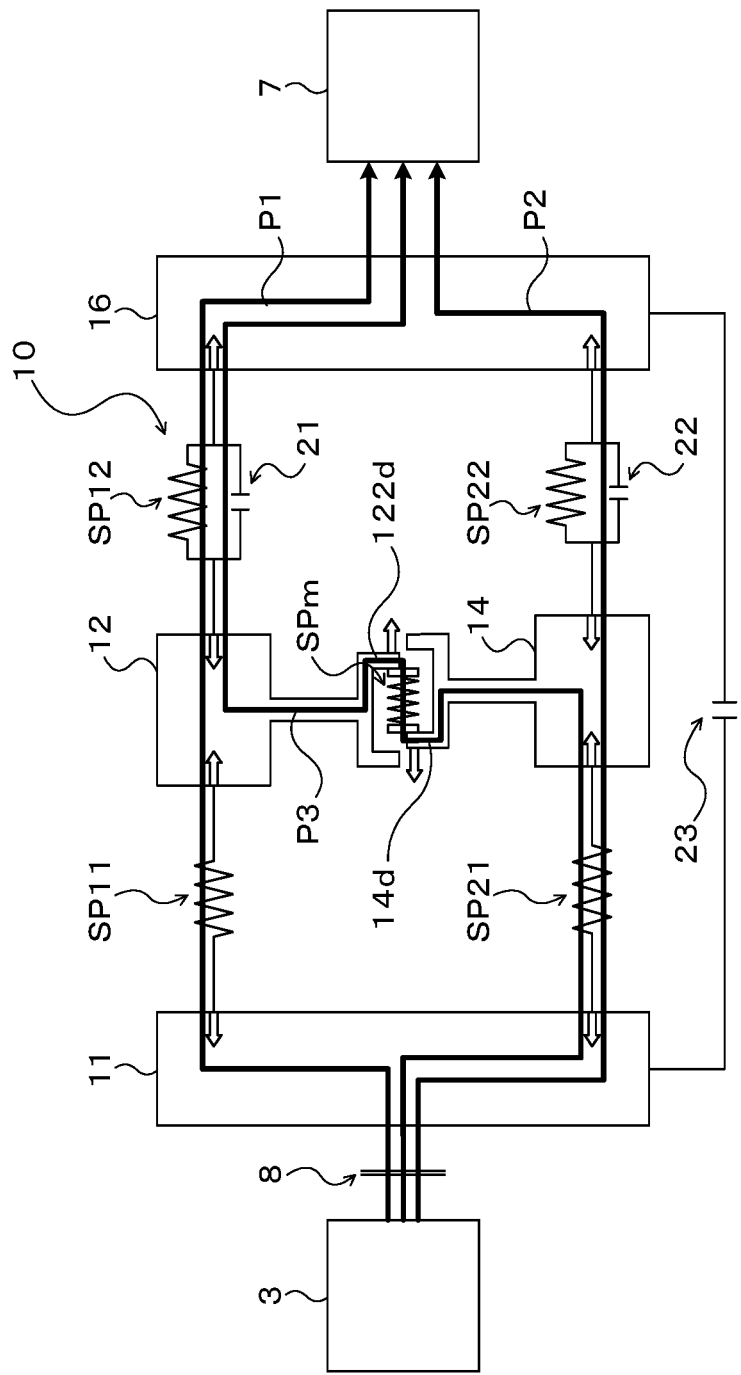
FIG. 7 is a diagram illustrating torque transfer paths in the damper device according to the present disclosure.

That is, during a period before input torque reaches the torque T1 during establishment of lock-up, the first outer springs (first elastic bodies) SP11 transfer rotational torque from the drive member 11 to the first intermediate member 12, and the second outer springs (second elastic bodies) SP12 transfer rotational torque from the first intermediate member 12 to the driven member 16. In addition, the first inner springs (third elastic bodies) SP21 transfer rotational torque from the drive member 11 to the second intermediate member 14, and the second inner springs (fourth elastic bodies) SP22 transfer rotational torque from the second intermediate member 14 to the driven member 16. Thus, as illustrated in FIG. 7, the damper device 10 has, as torque transfer paths between the drive member 11 and the driven member 16, the first torque transfer path P1 which includes the first outer springs SP11, the first intermediate member 12, and the second outer springs SP12 and the second torque transfer path P2 which includes the first inner springs SP21, the second intermediate member 14, and the second inner springs SP22.

In the damper device 10, in addition, as discussed above, the spring constants $k_{11}$, $k_{12}$, $k_{21}$, and $k_{22}$ of the first and second outer springs SP11 and SP12 and the first and second inner springs SP21 and SP22 meet the relation $k_{11} < k_{12} < k_{22} < k_{21}$. Therefore, when torque is transferred to the drive member 11 during a period before input torque reaches the torque T1 during establishment of lock-up, as illustrated in FIG. 7, the second intermediate member 14 is (slightly) twisted with respect to the first intermediate member 12 toward the advancing direction side (toward the downstream side) in the rotational direction (the rotational direction at the time when the vehicle travels forward). Consequently, the intermediate springs SPm are each pressed by one of the pair of second spring abutment portions 14d of the second intermediate member 14 on the side opposite to the advancing direction side in the rotational direction, toward one of the pair of second spring abutment portions 122d of the first intermediate member 12 on the advancing direction side in the rotational direction. That is, before input torque reaches the torque T1 during execution of lock-up, the intermediate springs SPm transfer a part of torque (a part of average torque) transferred from the drive member 11 to the second intermediate member 14 via the first inner springs SP21, to the first intermediate member 12. Thus, the damper device 10 has a third torque transfer path P3 that includes the first inner springs SP21, the second intermediate member 14, the intermediate springs SPm, the first intermediate member 12, and the second outer springs SP12.

As a result, during a period before torque input to the drive member 11 reaches the torque T1 described above during establishment of lock-up, torque is transferred from the drive member 11 to the driven member 16 via the first, second, and third torque transfer paths P1, P2, and P3. More particularly, while deflection of all of the first and second outer springs SP11 and SP12, the first and second inner springs SP21 and SP22, and the intermediate springs SPm is allowed, rotational torque from the first outer springs SP11 and rotational torque from the first inner springs SP21, the second intermediate member 14, and the intermediate springs SPm are transferred to the second outer springs SP12. In addition, rotational torque from the first inner springs SP21 is transferred to the second inner springs SP22. While deflection of all of the first and second outer springs SP11 and SP12, the first and second inner springs SP21 and SP22, and the intermediate springs SPm is allowed, fluctuations in torque transferred to the drive member 11 are damped (absorbed) by the springs SP11 to SPm. Consequently, it is possible to improve the vibration damping performance of the damper device 10 well when input torque transferred to the drive member 11 is relatively small and the rotational speed of the drive member 11 is low.

In addition, when the first and second stoppers 21 and 22 are caused to operate with torque input to the drive member 11 reaching the torque T1 described above, relative rotation between the first intermediate member 12 and the driven member 16 and deflection of the second outer springs SP12 are restricted by the first stopper 21, and relative rotation between the second intermediate member 14 and the driven member 16 and deflection of the second inner springs SP22 are restricted by the second stopper 22. Consequently, deflection of the intermediate springs SPm is also restricted as relative rotation of the first and second intermediate members 12 and 14 with respect to the driven member 16 is restricted. Thus, the first outer springs SP11 and the first inner springs SP21 act in parallel with each other to damp (absorb) fluctuations in torque transferred to the drive member 11 since torque input to the drive member 11 reaches the torque T1 described above until the input torque reaches the torque T2 described above to cause the third stopper 23 to operate.

Subsequently, the procedure for designing the damper device 10 will be described.

In the damper device 10, as discussed above, while deflection of all of the first and second outer springs SP11 and SP12, the first and second inner springs SP21 and SP22, and the intermediate springs SPm is allowed, torque (average torque) is transferred between the drive member 11 and the driven member 16 via all of the springs SP11 to SPm. The inventors diligently studied and analyzed the damper device 10 which had complicated torque transfer paths which were neither series nor parallel. As a result, the inventors found that such a damper device 10 had two natural frequencies for the entire device while deflection of all of the springs SP11 to SPm is allowed. According to the studies and the analyses conducted by the inventors, in the damper device 10, in addition, when resonance (in the present embodiment, resonance of the first intermediate member 12 at the time when the first and second intermediate members 12 and 14 are vibrated in phase with each other) at the lower one of the two natural frequencies (a natural frequency on the low-rotation side (low-frequency side) is generated in accordance with the frequency of vibration transferred to the drive member 11, the phase of vibration transferred from the second outer springs SP12 to the driven member 16 and the phase of vibration transferred from the second inner springs SP22 to the driven member 16 are shifted from each other. Therefore, as the rotational speed of the drive member 11 becomes higher after resonance at the lower one of the two natural frequencies is generated, one of vibration transferred from the second outer springs SP12 to the driven member 16 and vibration transferred from the second inner springs SP22 to the driven member 16 cancels out at least a part of the other.

With such findings, the inventors formulated an equation of motion indicated by the following formula (1) for a vibration system that included the damper device 10 in which torque was transferred from the engine (internal combustion engine) EG to the drive member 11 through establishment of lock-up. In the formula (1), "$J_1$" is the moment of inertia of the drive member 11, "$J_{21}$" is the moment of inertia of the first intermediate member 12, "$J_{22}$" is the moment of inertia of the second intermediate member 14, and "$J_3$" is the moment of inertia of the driven member 16. In addition, "$\theta_1$" is the torsional angle of the drive member 11, "$\theta_{21}$" is the torsional angle of the first intermediate member 12, "$\theta_{22}$" is the torsional angle of the second intermediate member 14, and "$\theta_3$" is the torsional angle of the driven member 16. Furthermore, "$k_1$" is the synthetic spring constant of the plurality of first outer springs SP11 which are provided between the drive member 11 and the first intermediate member 12 to act in parallel with each other, "$k_2$" is the synthetic spring constant of the plurality of second outer springs SP12 which are provided between the first intermediate member 12 and the driven member 16 to act in parallel with each other, "$k_3$" is the synthetic spring constant of the plurality of first inner springs SP21 which are provided between the drive member 11 and the second intermediate member 14 to act in parallel with each other, "$k_4$" is the synthetic spring constant of the plurality of second inner springs SP22 which are provided between the second intermediate member 14 and the driven member 16 to act in parallel with each other, "$k_5$" is the synthetic spring constant (rigidity) of the plurality of intermediate springs SPm which are provided between the first intermediate member 12 and the second intermediate member 14 to act in parallel with each other, "$k_R$" is the rigidity, that is, the spring constant, of the transmission TM, a drive shaft, etc. which are disposed between the driven member 16 and the wheels of the vehicle, and "T" is input torque transferred from the engine EG to the drive member 11.

[Expression 1]

$$\begin{pmatrix} J_1 & 0 & 0 & 0 \\ 0 & J_{21} & 0 & 0 \\ 0 & 0 & J_{22} & 0 \\ 0 & 0 & 0 & J_3 \end{pmatrix} \begin{pmatrix} \ddot{\theta}_1 \\ \ddot{\theta}_{21} \\ \ddot{\theta}_{22} \\ \ddot{\theta}_3 \end{pmatrix} + \begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \theta_1 \\ \theta_{21} \\ \theta_{22} \\ \theta_3 \end{pmatrix} = \begin{pmatrix} T \\ 0 \\ 0 \\ 0 \end{pmatrix} \quad (1)$$

Furthermore, the inventors assumed that the input torque T was vibrated periodically as indicated by the following formula (2), and assumed that the torsional angle $\theta_1$ of the drive member 11, the torsional angle $\theta_{21}$ of the first intermediate member 12, the torsional angle $\theta_{22}$ of the second intermediate member 14, and the torsional angle $\theta_3$ of the driven member 16 responded (were vibrated) periodically as indicated by the following formula (3). In the formulas (2) and (3), "$\omega$" is the angular frequency of periodic fluctuations (vibration) of the input torque T. In the formula (3), "$\Theta_1$" is the amplitude (vibration amplitude, i.e. maximum torsional angle) of vibration of the drive member 11 caused along with transfer of torque from the engine EG, "$\Theta_{21}$" is the amplitude (vibration amplitude) of vibration of the first intermediate member 12 caused as torque from the engine EG is transferred to the drive member 11, "$\Theta_{22}$" is the amplitude (vibration amplitude) of vibration of the second intermediate member 14 caused as torque from the engine EG is transferred to the drive member 11, and "$\Theta_3$" is the amplitude (vibration amplitude) of vibration of the driven member 16 caused as torque from the engine EG is transferred to the drive member 11. Under such assumptions, an identity of the following formula (4) can be obtained by substituting the formulas (2) and (3) into the formula (1) and dividing both sides by "sin $\omega t$".

[Expression 2]

$$T = T_0 \sin\omega t \quad (2)$$

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \sin\omega t \quad (3)$$

$$\begin{pmatrix} -\omega^2 J_1 + k_1+k_3 & -k_1 & -k_3 & 0 \\ -k_1 & -\omega^2 J_{21}+k_1+k_2+k_5 & -k_5 & -k_2 \\ -k_3 & -k_5 & -\omega^2 J_{22}+k_3+k_4+k_5 & -k_4 \\ 0 & -k_2 & -k_4 & -\omega^2 J_3+k_2+k_4+k_R \end{pmatrix} \begin{bmatrix} \Theta_1 \\ \Theta_{21} \\ \Theta_{22} \\ \Theta_3 \end{bmatrix} = \begin{pmatrix} T_0 \\ 0 \\ 0 \\ 0 \end{pmatrix} \quad (4)$$

The inventors then focused on the fact that, if the vibration amplitude $\Theta_3$ of the driven member 16 in the formula (4) became zero, no vibration was transferred in theory to the transmission TM, the drive shaft, etc. in a stage subsequent to the driven member 16 as vibration from the engine EG is damped by the damper device 10. Thus, from such a viewpoint, the inventors obtained a conditional expression indicated by the following formula (5) by solving the identity of the formula (4) for the vibration amplitude $\Theta_3$ and setting $\Theta_3$ to zero. In the case where the relationship of the formula (5) is met, vibrations from the engine EG transferred from the drive member 11 to the driven member 16 via the first, second, and third torque transfer paths P1, P2, and P3 cancel out each other, and the vibration amplitude $\Theta_3$ of the driven member 16 becomes zero in theory.

[Expression 3]

$$\omega^2 = \frac{k_5 \cdot (k_1 + k_2) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2} \quad (5)$$

Figure 8:
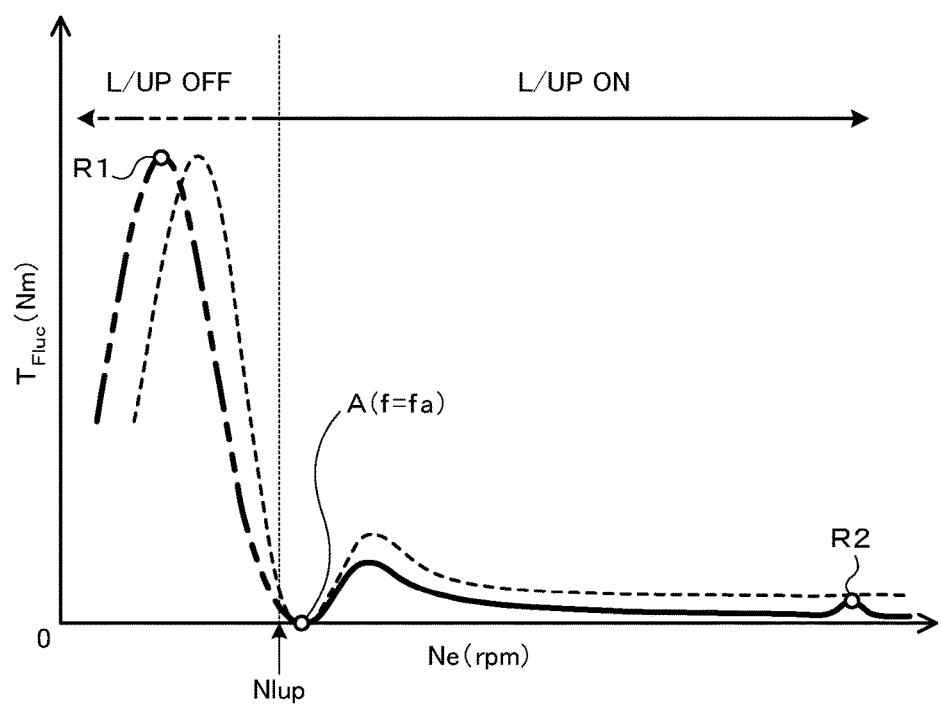
FIG. 8 illustrates an example of the relationship between the rotational speed of an engine and theoretical torque fluctuations of output elements of damper devices.

From such analysis results, it is understood that, with the damper device 10 configured as discussed above, an antiresonance point A at which the vibration amplitude $\Theta_3$ (torque fluctuations) of the driven member 16 becomes zero in theory as indicated in FIG. 8 may be set because the phase of vibration transferred from the second outer springs SP12 to the driven member 16 and the phase of vibration transferred from the second inner springs SP22 to the driven member 16 are shifted by 180 degrees (inverted) from each other through generation of resonance at the lower one of the two natural frequencies so that the vibrations cancel out each other. In addition, by defining the frequency of the antiresonance point A as "fa" and substituting "$\omega = 2\pi fa$" into the formula (5) given above, the frequency fa of the antiresonance point A is represented by the following formula (6). FIG. 8 indicates an example of the relationship between the rotational speed of the engine EG and the vibration amplitude (torque fluctuations) in theory (under the assumption that no hysteresis is provided) of the driven members of the damper device according to the present disclosure and a damper device from which the intermediate springs SPm have been omitted (the damper device described in Published Japanese Translation of PCT Application No. 2012-506006; hereinafter referred to as a "damper device according to a comparative example").

[Expression 4]

$$fa = \frac{1}{2\pi} \sqrt{\frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2}} \quad (6)$$

If it is assumed that the torsional angle $\theta_1$ of the drive member 11 and the torsional angle $\theta_2$ of the driven member 16 are zero and both displacements of the drive member 11 and the driven member 16 are zero, meanwhile, the formula (1) can be transformed into the following formula (7). Furthermore, if it is assumed that the first and second intermediate members 12 and 14 are vibrated in harmony with each other as indicated by the following formula (8), an identity of the following formula (9) can be obtained by substituting the formula (8) into the formula (7) and dividing both sides by "$\sin \omega t$".

[Expression 5]

$$\begin{pmatrix} J_{21} & 0 \\ 0 & J_{22} \end{pmatrix} \begin{pmatrix} \ddot{\theta}_{21} \\ \ddot{\theta}_{22} \end{pmatrix} + \begin{pmatrix} k_1 + k_2 + k_5 & -k_5 \\ -k_5 & k_3 + k_4 + k_5 \end{pmatrix} \begin{pmatrix} \theta_{21} \\ \theta_{22} \end{pmatrix} = \begin{pmatrix} 0 \\ 0 \end{pmatrix} \quad (7)$$

$$\begin{pmatrix} \theta_{21} \\ \theta_{22} \end{pmatrix} = \begin{pmatrix} \Theta_{21} \\ \Theta_{22} \end{pmatrix} \sin \omega t \quad (8)$$

$$\begin{pmatrix} -\omega^2 J_{21} + k_1 + k_2 + k_5 & -k_5 \\ -k_5 & -\omega^2 J_{22} + k_3 + k_4 + k_5 \end{pmatrix} \begin{pmatrix} \Theta_{21} \\ \Theta_{22} \end{pmatrix} = \begin{pmatrix} 0 \\ 0 \end{pmatrix} \quad (9)$$

In the case where the first and second intermediate members 12 and 14 are vibrated in harmony with each other, both the amplitudes $\Theta_{21}$ and $\Theta_{22}$ are not zero. Thus, the determinant of the square matrix on the left side of the formula (9) is zero, and a conditional expression of the following formula (10) must be met. Such a formula (10) is a quadratic equation for the square value $\omega^2$ of two natural angular frequencies of the damper device 10. Thus, the two natural angular frequencies $\omega_1$ and $\omega_2$ of the damper device 10 are represented by the following formulas (11) and (12), and $\omega_1 < \omega_2$ is met. As a result, if the frequency of resonance (resonance point R1) that causes the resonance point A, that is, the natural frequency of the first intermediate member 12, is defined as "$f_{21}$", and if the frequency of resonance (resonance point R2) generated on the high-rotation side with respect to the antiresonance point A, that is, the natural frequency of the second intermediate member 14, is defined as "$f_{22}$", the natural frequency $f_{21}$ on the low-rotation side (low-frequency side) is represented by the following formula (13), and the natural frequency $f_{22}$ ($f_{22} > f_{21}$) on the high-rotation side (high-frequency side) is represented by the following formula (14).

[Expression 6]

$$(-\omega^2 J_{21} + k_1 + k_2 + k_5)(-\omega^2 J_{22} + k_3 + k_4 + k_5) - k_5^2 = 0 \quad (10)$$

$$\omega_1 = \sqrt{\frac{1}{2} \left\{ \frac{k_1 + k_2 + k_5}{J_{21}} + \frac{k_3 + k_4 + k_5}{J_{22}} - \sqrt{\left( \frac{k_3 + k_4 + k_5}{J_{22}} - \frac{k_1 + k_2 + k_5}{J_{21}} \right)^2 + \frac{4 k_5^2}{J_{21} J_{22}}} \right\}} \quad (11)$$

$$\omega_2 = \sqrt{\frac{1}{2} \left\{ \frac{k_1 + k_2 + k_5}{J_{21}} + \frac{k_3 + k_4 + k_5}{J_{22}} + \sqrt{\left( \frac{k_3 + k_4 + k_5}{J_{22}} - \frac{k_1 + k_2 + k_5}{J_{21}} \right)^2 + \frac{4 k_5^2}{J_{21} J_{22}}} \right\}} \quad (12)$$

$$f_{21} = \frac{1}{2\pi} \sqrt{\frac{k_1 + k_2 + k_5}{2 J_{21}} + \frac{k_3 + k_4 + k_5}{2 J_{22}} - \sqrt{\left( \frac{k_3 + k_4 + k_5}{2 J_{22}} - \frac{k_1 + k_2 + k_5}{2 J_{21}} \right)^2 + \frac{k_5^2}{J_{21} J_{22}}}} \quad (13)$$

$$f_{22} = \frac{1}{2\pi} \sqrt{\frac{k_1 + k_2 + k_5}{2 J_{21}} + \frac{k_3 + k_4 + k_5}{2 J_{22}} + \sqrt{\left( \frac{k_3 + k_4 + k_5}{2 J_{22}} - \frac{k_1 + k_2 + k_5}{2 J_{21}} \right)^2 + \frac{k_5^2}{J_{21} J_{22}}}} \quad (14)$$

In addition, an equivalent rigidity $k_{eq}$ of the damper device 10 at the time when deflection of all of the first and second outer springs SP11 and SP12, the first and second inner springs SP21 and SP22, and the intermediate springs SPm is allowed can be obtained as follows. That is, if it is assumed that constant input torque $T = T_0$ (static external force) is transferred to the drive member 11, and if it is assumed that the balanced relationship indicated by the following formula (15) is met, an identity of the following formula (16) can be obtained by substituting $T = T_0$ and the formula (15) into the formula (1).

[Expression 7]

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \quad (15)$$

-continued $$\begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (16)$$

Furthermore, a relation $T_0=k_{eq}\cdot(\Theta_1-\Theta_3)$ is met among the torque $T_0$, the equivalent rigidity $k_{eq}$ of the damper device 10, the vibration amplitude (torsional angle) $\Theta_1$ of the drive member 11, and the vibration amplitude (torsional angle) $\Theta_3$ of the driven member 16. Furthermore, when the identity of the formula (16) is solved for the vibration amplitudes (torsional angles) $\Theta_1$ and $\Theta_3$, "$\Theta_1-\Theta_3$" is represented by the following formula (17). Thus, the equivalent rigidity $k_{eq}$ of the damper device 10 is represented by the following formula (18) using $T_0=k_{eq}\cdot(\Theta_1-\Theta_3)$ and the formula (17).

[Expression 8]

$$\Theta_1 - \Theta_3 = \frac{\{k_5 \cdot (k_1+k_2+k_3+k_4) + (k_1+k_2)(k_3+k_4)\}T_0}{k_5(k_1+k_3)(k_2+k_4) + (k_1k_2k_3+k_1k_2k_4+k_1k_3k_4+k_2k_3k_4)} \quad (17)$$

$$K_{eq} = \frac{k_5(k_1+k_3)(k_2+k_4) + (k_1k_2k_3+k_1k_3k_4+k_1k_2k_4+k_2k_3k_4)}{k_5(k_1+k_2+k_3+k_4) + (k_1+k_2)(k_3+k_4)} \quad (18)$$

The results of analysis conducted by the inventors on the natural frequency $f_{21}$ on the low-rotation side, the frequency fa of the antiresonance point A, and the equivalent rigidity $k_{eq}$ of the damper device 10 obtained as discussed above are indicated in FIGS. 9 to 14. FIGS. 9 to 14 indicate the mode of variations in the natural frequency $f_{21}$, the frequency fa of the antiresonance point A, and the equivalent rigidity $k_{eq}$ at the time when only one of the synthetic spring constants $k_1$, $k_2$, $k_3$, $k_4$, and $k_5$ and the moments of inertia $J_{21}$ and $J_{22}$ of the first and second intermediate members 12 and 14 is varied while keeping the others of the parameters at constant values (fixed values).

Figure 9:
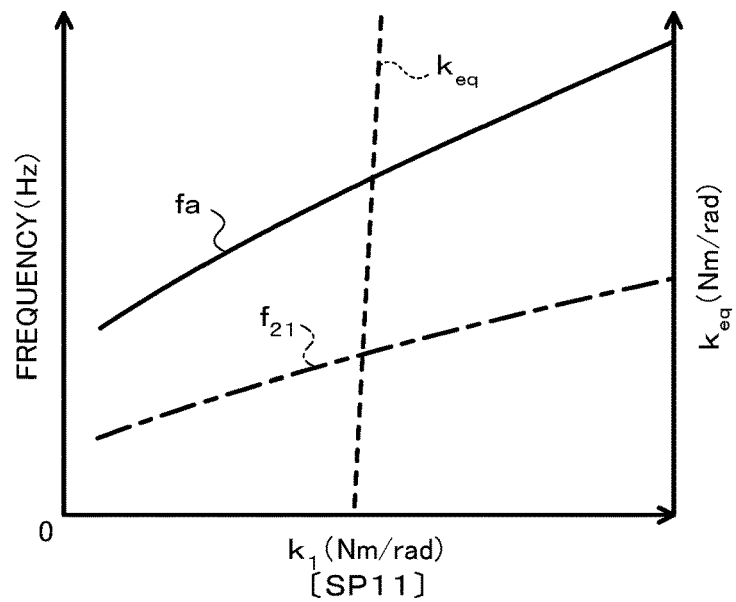
FIG. 9 illustrates an example of the relationship between the rigidity of the first elastic body in the damper device according to the present disclosure and the natural frequency on the low-rotation side, the frequency of the antiresonance point, and the equivalent rigidity of the damper device.

In the case where only the synthetic spring constant (rigidity) $k_1$ of the first outer springs (first elastic bodies) SP11 is varied while keeping the synthetic spring constants $k_2$, $k_3$, $k_4$, and $k_5$ and the moments of inertia $J_{21}$ and $J_{22}$ in the damper device 10 at constant values, as indicated in FIG. 9, the natural frequency $f_{21}$ and the frequency fa of the antiresonance point A become higher as the synthetic spring constant $k_1$ is larger, and become gradually lower as the synthetic spring constant $k_1$ becomes smaller. In contrast, as illustrated in FIG. 9, the equivalent rigidity $k_{eq}$ is increased steeply when the synthetic spring constant $k_1$ is increased slightly from a value adapted in advance, and decreased steeply when the synthetic spring constant $k_1$ is decreased slightly from the adapted value. That is, variations (variation gradient) in the equivalent rigidity $k_{eq}$ are very large with respect to variations in the synthetic spring constant $k_1$ of the first outer springs SP11.

Figure 10:
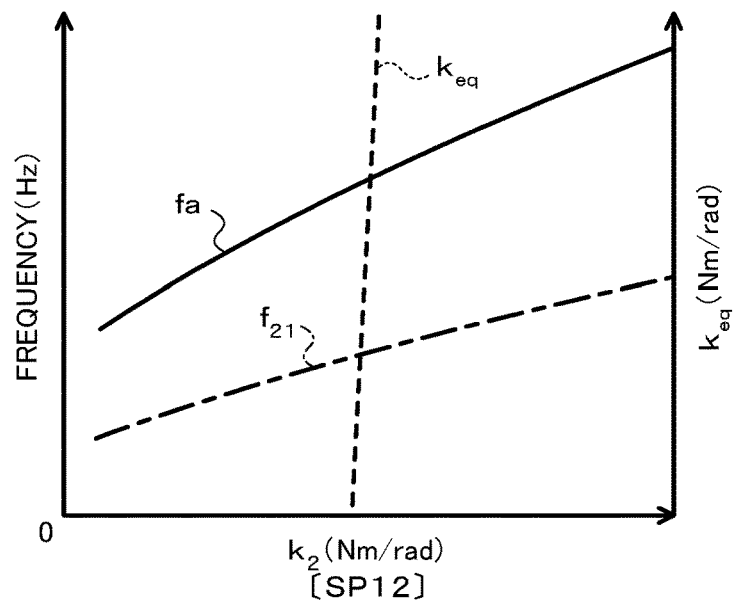
FIG. 10 illustrates an example of the relationship between the rigidity of the second elastic body in the damper device according to the present disclosure and the natural frequency on the low-rotation side, the frequency of the antiresonance point, and the equivalent rigidity of the damper device.

Meanwhile, in the case where only the synthetic spring constant (rigidity) $k_2$ of the second outer springs (second elastic bodies) SP12 is varied while keeping the synthetic spring constants $k_1$, $k_3$, $k_4$, and $k_5$ and the moments of inertia $J_{21}$ and $J_{22}$ in the damper device 10 at constant values, as indicated in FIG. 10, the natural frequency $f_{21}$ and the frequency fa of the antiresonance point A become higher as the synthetic spring constant $k_2$ is larger, and become gradually lower as the synthetic spring constant $k_2$ becomes smaller. Furthermore, as illustrated in FIG. 10, the equivalent rigidity $k_{eq}$ is increased steeply when the synthetic spring constant $k_2$ is increased slightly from a value adapted in advance, and decreased steeply when the synthetic spring constant $k_2$ is decreased slightly from the adapted value. That is, variations (variation gradient) in the equivalent rigidity $k_{eq}$ are also very large with respect to variations in the synthetic spring constant $k_2$ of the second outer springs SP12.

Figure 11:
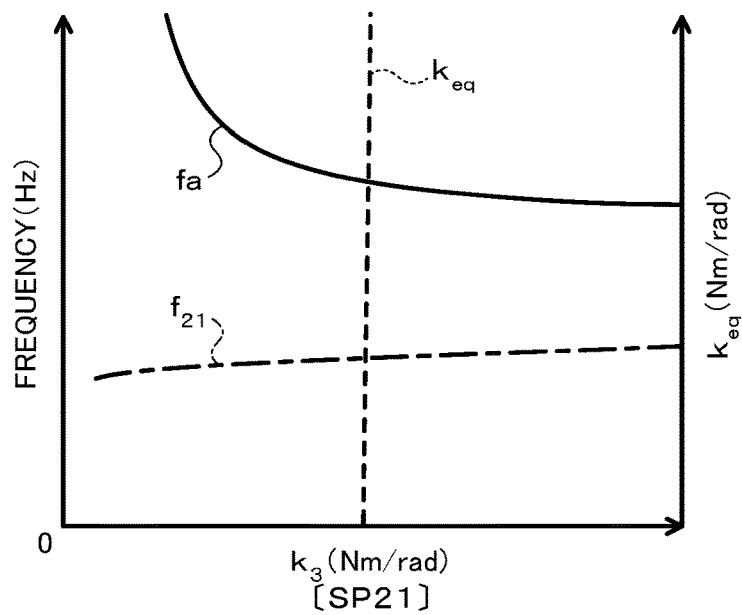

On the other hand, in the case where only the synthetic spring constant (rigidity) $k_3$ of the first inner springs (third elastic bodies) SP21 is varied while keeping the synthetic spring constants $k_1$, $k_2$, $k_4$, and $k_5$ and the moments of inertia $J_{21}$ and $J_{22}$ in the damper device 10 at constant values, as indicated in FIG. 11, the natural frequency $f_{21}$ becomes slightly higher (is kept generally constant) as the synthetic spring constant $k_3$ becomes larger, and the frequency fa of the antiresonance point A becomes higher as the synthetic spring constant $k_3$ is smaller, and becomes gradually lower as the synthetic spring constant $k_3$ becomes larger. In addition, as illustrated in FIG. 11, the equivalent rigidity $k_{eq}$ is decreased steeply when the synthetic spring constant $k_3$ is decreased slightly from a value adapted in advance, and increased steeply when the synthetic spring constant $k_3$ is increased slightly from the adapted value. That is, variations (variation gradient) in the equivalent rigidity $k_{eq}$ are also very large with respect to variations in the synthetic spring constant $k_3$ of the first inner springs SP21.

Figure 12:
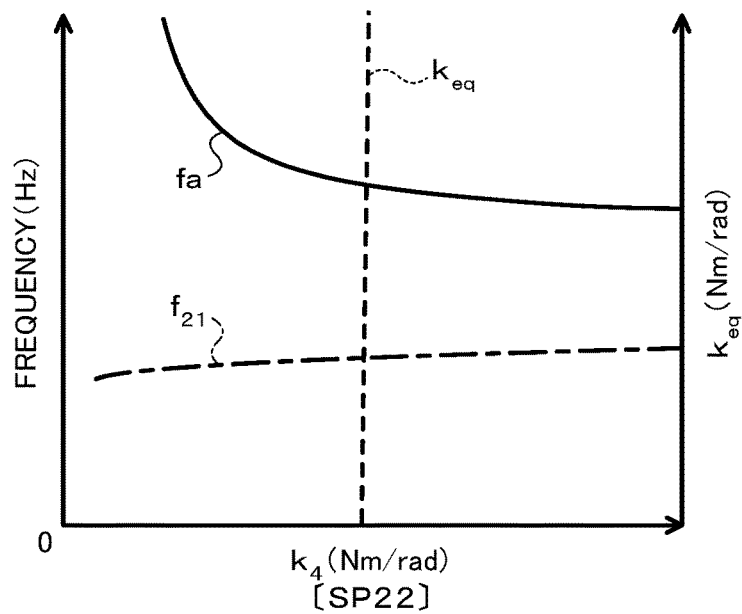
FIG. 12 illustrates an example of the relationship between the rigidity of the fourth elastic body in the damper device according to the present disclosure and the natural frequency on the low-rotation side, the frequency of the antiresonance point, and the equivalent rigidity of the damper device.

Furthermore, also in the case where only the synthetic spring constant (rigidity) $k_4$ of the second inner springs (fourth elastic bodies) SP22 is varied while keeping the synthetic spring constants $k_1$, $k_2$, $k_3$, and $k_5$ and the moments of inertia $J_{21}$ and $J_{22}$ in the damper device 10 at constant values, as indicated in FIG. 12, the natural frequency $f_{21}$ becomes slightly higher (is kept generally constant) as the synthetic spring constant $k_4$ becomes larger, and the frequency fa of the antiresonance point A becomes higher as the synthetic spring constant $k_4$ is smaller, and becomes gradually lower as the synthetic spring constant $k_4$ becomes larger. In addition, as illustrated in FIG. 12, the equivalent rigidity $k_{eq}$ is decreased steeply when the synthetic spring constant $k_4$ is decreased slightly from a value adapted in advance, and increased steeply when the synthetic spring constant $k_4$ is increased slightly from the adapted value. That is, variations (variation gradient) in the equivalent rigidity $k_{eq}$ are also very large with respect to variations in the synthetic spring constant $k_4$ of the second inner springs SP22.

Figure 13:
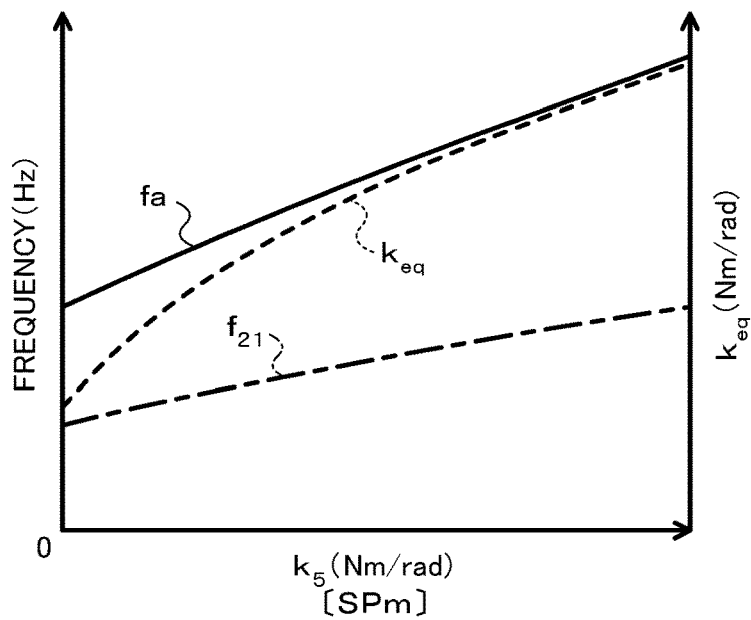
FIG. 13 illustrates an example of the relationship between the rigidity of a fifth elastic body in the damper device according to the present disclosure and the natural frequency on the low-rotation side, the frequency of the antiresonance point, and the equivalent rigidity of the damper device.

In the case where only the synthetic spring constant (rigidity) $k_5$ of the intermediate springs (fifth elastic bodies) SPm is varied while keeping the synthetic spring constants $k_1$, $k_2$, $k_3$, and $k_4$ and the moments of inertia $J_{21}$ and $J_{22}$ in the damper device 10 at constant values, as indicated in FIG. 13, the natural frequency $f_{21}$ and the frequency fa of the antiresonance point A become higher as the synthetic spring constant $k_5$ is larger, and become gradually lower as the synthetic spring constant $k_5$ becomes smaller. In addition, as illustrated in FIG. 13, the difference ($fa-f_{21}$) between the natural frequency $f_{21}$ and the frequency fa of the antiresonance point A corresponding to a certain synthetic spring constant $k_5$ becomes gradually larger as the synthetic spring constant $k_5$ becomes larger. Furthermore, in the case where only the synthetic spring constant $k_5$ of the intermediate springs SPm is varied, as illustrated in FIG. 13, the equivalent rigidity $k_{eq}$ becomes higher as the synthetic spring constant $k_5$ is larger, and becomes gradually lower as the synthetic spring constant $k_5$ becomes smaller. That is, variations (variation gradient) in the equivalent rigidity k with respect to variations in the synthetic spring constant (rigidity) $k_5$ of the intermediate springs SPm are significantly small compared to variations (variation gradient) in the equivalent rigidity $k_{eq}$ with respect to variations in the synthetic spring constants (rigidities) $k_1$, $k_2$, $k_3$, and $k_4$.

Figure 14:
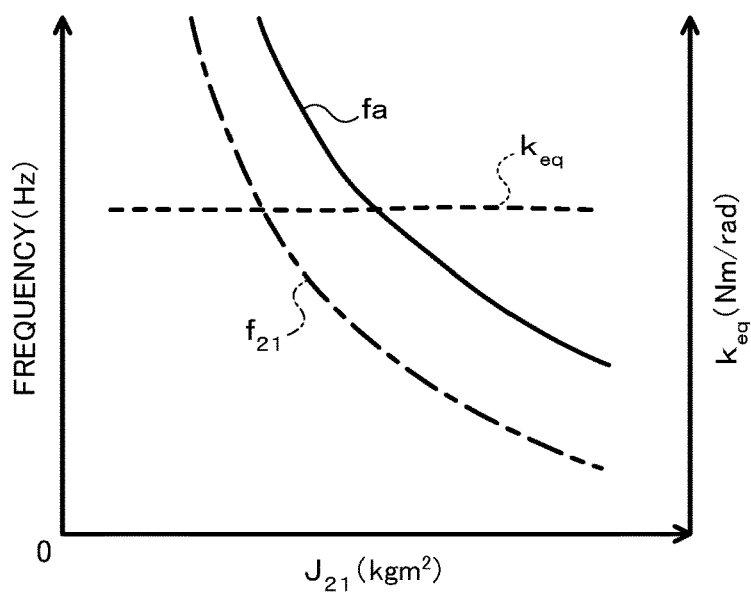
FIG. 14 illustrates an example of the relationship between the moment of inertia of a first intermediate element in the damper device according to the present disclosure and the natural frequency on the low-rotation side, the frequency of the antiresonance point, and the equivalent rigidity of the damper device.

Meanwhile, in the case where only the moment of inertia $J_{21}$ of the first intermediate member 12 is varied while keeping the synthetic spring constants $k_1$, $k_2$, $k_3$, $k_4$, and $k_5$ and the moment of inertia $J_{22}$ of the second intermediate member 14 in the damper device 10 at constant values, as indicated in FIG. 14, the natural frequency $f_{21}$ and the frequency fa of the antiresonance point A become higher as the moment of inertia $J_{21}$ is smaller, and become gradually lower as the moment of inertia $J_{21}$ becomes larger. Furthermore, if only the moment of inertia $J_{21}$ of the first intermediate member 12 is varied, as illustrated in FIG. 14, the equivalent rigidity $k_{eq}$ is kept generally constant. Moreover in the case where only the moment of inertia $J_{22}$ of the second intermediate member 14 is varied while keeping the synthetic spring constants $k_1$, $k_2$, $k_3$, $k_4$, and $k_5$ and the moment of inertia $J_{21}$ of the first intermediate member 12 in the damper device 10 at constant values, although not indicated in the drawings, results similar to those obtained in the case where only the moment of inertia $J_{21}$ of the first intermediate member 12 is varied are obtained.

As seen from the analysis results discussed above, by lowering the rigidity of the intermediate springs SPm (reducing the spring constant $k_m$ and the synthetic spring constant $K_5$), it is possible to reduce the natural frequency $f_{21}$ on the low-rotation side (see the formula (13)) and the frequency fa of the antiresonance point A (see the formula (6)). By enhancing the rigidity of the intermediate springs SPm (increasing the spring constant $k_m$ and the synthetic spring constant $K_5$), conversely, it is possible to increase the difference between the natural frequency $f_{21}$ on the low-rotation side and the frequency fa of the antiresonance point A. Furthermore, the equivalent rigidity $k_{eq}$ is not lowered significantly even if the rigidity of the intermediate springs SPm is lowered (even if the spring constant $k_m$ and the synthetic spring constant $K_5$ are reduced). Thus, in the damper device 10, by adjusting the rigidity (the spring constant $k_m$ and the synthetic spring constant $K_5$) of the intermediate springs SPm, it is possible to appropriately set the natural frequency $f_{21}$ on the low-rotation side and the frequency fa of the antiresonance point A while keeping the equivalent rigidity $k_{eq}$ appropriate in accordance with the maximum torque input to the drive member 11 and suppressing an increase in weights of the first and second intermediate members 12 and 14, that is, the moments of inertia $J_{21}$ and $J_{22}$. By lowering the rigidities of the first and second outer springs SP11 and SP12 (reducing the spring constants $k_{11}$ and $k_{12}$ and the synthetic spring constants $K_1$ and $K_2$), in addition, it is possible to reduce the natural frequency $f_2$, on the low-rotation side and the frequency fa of the antiresonance point A. By enhancing the rigidities of the first and second inner springs SP21 and SP22 (increasing the spring constants $k_{21}$ and $k_{22}$ and the synthetic spring constants $K_3$ and $K_4$), further, it is possible to reduce the frequency fa of the antiresonance point A.

In the vehicle on which the engine (internal combustion engine) EG is mounted as a source that generates power for travel, the efficiency of power transfer between the engine EG and the transmission TM can be improved, and the fuel efficiency of the engine EG can be improved, by lowering a lock-up rotational speed Nlup so that torque from the engine EG is mechanically transferred to the transmission TM early. It should be noted, however, that in a low-rotational speed range of about 500 rpm to 1500 rpm, in which the lock-up rotational speed Nlup may be set, vibration transferred from the engine EG to the drive member 11 via a lock-up clutch is increased, and that the vibration level is increased remarkably in vehicles on which an engine with a reduced number of cylinders such as a three-cylinder or four-cylinder engine, in particular, is mounted. Thus, in order that large vibration is not transferred to the transmission TM etc. during or immediately after establishment of lock-up, it is necessary to lower the vibration level in a rotational speed range around the lock-up rotational speed Nlup of the entire damper device 10 (driven member 16) which transfers torque (vibration) from the engine EG to the transmission TM when lock-up is established.

In the light of this, the inventors configured the damper device 10 such that the antiresonance point A discussed above was formed when the rotational speed of the engine EG was in the range of 500 rpm to 1500 rpm (the assumed setting range of the lock-up rotational speed Nlup) on the basis of the lock-up rotational speed Nlup which was determined for the lock-up clutch 8. If the number of cylinders of the engine (internal combustion engine) EG is defined as "n", a rotational speed Nea of the engine EG corresponding to the frequency fa of the antiresonance point A is represented as Nea=(120/n)·fa. Thus, in the damper device 10, the synthetic spring constant $k_1$ of the plurality of first outer springs SP11, the synthetic spring constant $k_2$ of the plurality of second outer springs SP12, the synthetic spring constant $k_3$ of the plurality of first inner springs SP21, the synthetic spring constant $k_4$ of the plurality of second inner springs SP22, the synthetic spring constant $k_5$ of the plurality of intermediate springs SPm, the moment of inertia $J_{21}$ of the first intermediate member 12 (with the moment of inertia of the turbine runner 5 etc., which is coupled so as to rotate therewith, taken into consideration (added); the same applies hereinafter), and the moment of inertia $J_{22}$ of the second intermediate member 14 are selected and set so as to meet the following formula (19). That is, in the damper device 10, the spring constants $k_{11}$, $k_{12}$, $k_{21}$, $k_{22}$, and $k_m$ of the springs SP11 to SPm and the moments of inertia $J_{21}$ and $J_{22}$ of the first and second intermediate members 12 and 14 are selected and set on the basis of the frequency fa of the antiresonance point A (and the lock-up rotational speed Nlup).

[Expression 9]

$$500 \text{ rpm} \leq \frac{120}{n} fa \leq 1500 \text{ rpm} \quad (19)$$

In this way, by setting the antiresonance point A which may bring the vibration amplitude $\Theta_3$ of the driven member 16 to zero in theory (which may lower vibration) within the low-rotational speed range from 500 rpm to 1500 rpm (the assumed setting range of the lock-up rotational speed Nlup), as indicated in FIG. 8, resonance that causes the antiresonance point A (resonance unavoidably caused in order to form the antiresonance point A; in the present embodiment, resonance of the first intermediate member 12; see the resonance point R1 in FIG. 8) can be shifted to the lower-rotation side (lower-frequency side) so as to be included in a non-lock-up region of the lock-up clutch 8 (see the dash-double-dot line in FIG. 8). That is, in the present embodiment, resonance of the first intermediate member 12 (resonance at the lower one of the two natural frequencies) is virtual and not generated in a rotational speed range in which the damper device 10 is used. In addition, as indicated in FIG. 8, a rotational speed corresponding to the lower one of the two natural frequencies of the damper device 10 (the natural frequency of the first intermediate member 12) is lower than the lock-up rotational speed Nlup of the lock-up clutch 8, and a rotational speed corresponding to the higher one of the two natural frequencies of the damper device 10 (the natural frequency of the second intermediate member 14) is higher than the lock-up rotational speed Nlup. Consequently, one of vibration transferred from the second outer springs SP12 to the driven member 16 and vibration transferred from the second inner springs SP22 to the driven member 16 can be used to cancel out at least a part of the other since the time when lock-up is established by the lock-up clutch 8.

To configure the damper device 10 so as to meet the formula (19) given above, the spring constants $k_{11}$, $k_{12}$, $k_{21}$, $k_{22}$, and $k_m$ and the moments of inertia $J_{21}$ and $J_{22}$ are preferably selected and set such that the frequency of resonance that causes the antiresonance point A (see the resonance point R1 in FIG. 8) is lower than the frequency fa of the antiresonance point A and is as small a value as possible. Therefore, in the damper device 10 according to the present embodiment, the values of the spring constants $k_{11}$, $k_{12}$, $k_{21}$, $k_{22}$, and $k_m$ are determined so as to meet the relation $k_{11} < k_m < k_{12} < k_{22} < k_{21}$ discussed above.

That is, in the damper device 10, the spring constant $k_m$ of the intermediate springs SPm and the spring constants $k_{11}$ and $k_{12}$ of the first and second outer springs SP11 and SP12 are determined to be small such that the natural frequency $f21$ on the low-rotation side and the frequency fa of the antiresonance point A is reduced more. Furthermore, the spring constants $k_{21}$ and $k_{22}$ of the first and second inner springs SP21 and SP22 are determined to be large such that the natural frequency $f_{21}$ on the low-rotation side is reduced more. Consequently, it is possible to set the start point of a rotational speed band (frequency band) in which one of vibration transferred from the second outer springs SP12 to the driven member 16 and vibration transferred from the second inner springs SP22 to the driven member 16 is used to cancel out at least a part of the other on the lower-rotation side (lower-frequency side) by reducing the natural frequency $f_{21}$ on the low-rotation side and the frequency fa of the antiresonance point A. By setting the start point of such a rotational speed band on the low-rotation side, further, the rotational speed (frequency) at which the phase of vibration transferred from the second outer springs SP12 to the driven member 16 and the phase of vibration transferred from the second inner springs SP22 to the driven member 16 are shifted by 180 degrees from each other can also be set to the low-rotation side. As a result, it is possible to allow lock-up at a still lower rotational speed, and to further improve the vibration damping performance in the low-speed range.

In addition, in the damper device 10, as indicated in FIG. 8, when the rotational speed of the engine EG is further enhanced after damping of vibration of the driven member 16 peaks around the antiresonance point A, resonance (in the present embodiment, resonance of the second intermediate member 14; see the resonance point R2 in FIG. 8) at the higher one of the two natural frequencies is generated, and vibration transferred from the second outer springs SP12 to the driven member 16 and vibration transferred to from the second inner springs SP22 to the driven member 16 are brought into phase with each other. That is, in the damper device 10 according to the present embodiment, one of vibration transferred from the second outer springs SP12 to the driven member 16 and vibration transferred from the second inner springs SP22 to the driven member 16 cancels out at least a part of the other during a period since resonance (resonance of the first intermediate member 12) at the lower one of the two natural frequencies described above is generated until resonance (resonance of the second intermediate member 14) at the higher one of the two natural frequencies is generated. Thus, the spring constants (synthetic spring constants) $k_1$, $k_2$, $k_3$, $k_4$, and $k_5$ and the moments of inertia $J_{21}$ and $J_{22}$ are preferably selected and set such that the frequency of resonance generated on the high-rotation side (high-frequency side) with respect to the antiresonance point A is higher. Consequently, it is possible to generate such resonance (resonance point R2) in the high-rotational speed range in which vibration does not easily become manifest, which further improves the vibration damping performance of the damper device 10 in the low-rotational speed range.

Furthermore, in the damper device 10, in order to improve the vibration damping performance around the lock-up rotational speed Nlup, it is necessary to separate the lock-up rotational speed Nlup and the rotational speed of the engine EG corresponding to the resonance point R2 from each other as much as possible. Thus, in configuring the damper device 10 so as to meet the formula (19), the spring constants $k_1$, $k_2$, $k_3$, $k_4$, and $k_5$ and the moments of inertia $J_{21}$ and $J_{22}$ are preferably selected and set so as to meet $Nlup \leq (120/n) \cdot fa$ (=Nea). Consequently, it is possible for the lock-up clutch 8 to establish lock-up while suppressing transfer of vibration to the input shaft IS of the transmission TM well, and for the damper device 10 to damp vibration from the engine EG extremely well immediately after the establishment of lock-up.

As discussed above, by designing the damper device 10 on the basis of the frequency fa of the antiresonance point A, it is possible to improve the vibration damping performance of the damper device 10 extremely well. The studies and the analyses conducted by the inventors confirmed that, in the case where the lock-up rotational speed Nlup is determined as a value around 1000 rpm, for example, extremely good results in practice were obtained by configuring the damper device 10 so as to meet 900 rpm $\leq (120/n) \cdot fa \leq 1200$ rpm, for example.

In addition, as seen from the formulas (13) and (14), the two natural frequencies $f_{21}$ and $f_{22}$ of the damper device 10 are affected by both the moments of inertia $J_{21}$ and $J_{22}$ of the first and second intermediate members 12 and 14. That is, in the damper device 10, the first intermediate member 12 and the second intermediate member 14 are coupled to each other via the intermediate springs SPm. Thus, vibration of the first intermediate member 12 and vibration of the second intermediate member 14 are coupled to each other (vibrations of the first and second intermediate members 12 and 14 affect each other) with a force from the intermediate springs SPm (see the white arrows in FIG. 7) acting on both the first and second intermediate members 12 and 14. In this way, with vibration of the first intermediate member 12 and vibration of the second intermediate member 14 coupled to each other, the natural frequencies $f_{21}$ and $f_{22}$ are affected by both the moments of inertia $J_{21}$ and $J_{22}$ of the first and second intermediate members 12 and 14. Thus, in the damper device 10, it is possible to easily shift resonance at the lower one of the two natural frequencies $f_{21}$ and $f_{22}$ to the low-rotation side, that is, the non-lock-up region, while suppressing an increase in weights of the first and second intermediate members 12 and 14, that is, the moments of inertia $J_{21}$ and $J_{22}$, and to set the natural frequencies $f_{21}$ and $f_{22}$ and the frequency fa of the antiresonance point A easily and appropriately such that the vibrations cancel out each other at the driven member 16 better when the rotational speed of the drive member 11 is lower.

Furthermore, in the damper device 10, the two natural frequencies $f_{21}$ and $f_{22}$ are affected by both the moments of inertia $J_{21}$ and $J_{22}$ of the first and second intermediate members 12 and 14. Thus, by adjusting the moments of inertia $J_{21}$ and $J_{22}$ of the first and second intermediate members 12 and 14, as indicated in FIG. 8, the natural frequency $f_{21}$ (resonance point R1) on the low-rotation side can be easily shifted to the lower-rotation side of the non-lock-up region compared to the damper device according to the comparative example described above while determining the frequency fa of the antiresonance point A as a value about a frequency fa' of the antiresonance point of the damper device according to the comparative example. Consequently, with the damper device 10, it is possible to lower the vibration level around the antiresonance point A compared to the damper device according to the comparative example (see the broken line in FIG. 8). In this way, by lowering the vibration level around the antiresonance point A by reducing the natural frequency $f_{21}$ on the low-rotation side, it is possible to keep the lock-up rotational speed Nlup lower even in the case where the order of vibration from the engine EG is lowered along with execution of reduced cylinder operation of the engine EG which has a cylinder stop function.

In addition, the analysis conducted by the inventors has revealed that, by coupling vibrations of the first and second intermediate members 12 and 14 to each other by coupling the first and second intermediate members 12 and 14 to each other using the intermediate springs SPm, vibrations transferred from the first, second, and third torque transfer paths P1, P2, and P3 described above to the driven member 16 tend to cancel out each other, which may reduce the actual vibration amplitude of the driven member 16 around the antiresonance point A and decrease the difference in torque amplitude (torque fluctuations) between the second outer springs SP12 and the second inner springs SP22 (bring the torque amplitudes of the second outer springs SP12 and the second inner springs SP22 closer to each other). Thus, with the damper device 10, it is possible to allow lock-up (coupling between the engine EG and the drive member 11) at lower rotational speeds, and to improve the vibration damping performance in the low-rotational speed range in which vibration from the engine EG tends to become large.

Here, assuming $k_5=0$ in the formula (13) given above, a natural frequency $f_{21}'$ of the first intermediate member in the damper device according to the comparative example from which the intermediate springs SPm have been omitted is represented by the following formula (20). Assuming $k_5=0$ in the formula (14) given above, a natural frequency $f_{21}'$ of the second intermediate member in the damper device according to the comparative example is represented by the following formula (21). In the damper device according to the comparative example, as seen from the formulas (20) and (21), the natural frequency $f_{21}'$ of the first intermediate member is not affected by the moment of inertia $J_{22}$ of the second intermediate member, and the natural frequency $f_{22}$ of the second intermediate member is not affected by the moment of inertia $J_{21}$ of the first intermediate member. From this respect, it is understood that, with the damper device 10, the degree of freedom in design of the natural frequencies $f_{21}$ and $f_{22}$ of the first and second intermediate members 12 and 14 may be improved compared to the damper device according to the comparative example.

[Expression 10]

$$f_{21}' = \frac{1}{2\pi}\sqrt{\frac{k_1+k_2}{J_{21}}} \qquad (20)$$

$$f_{22}' = \frac{1}{2\pi}\sqrt{\frac{k_3+k_4}{J_{22}}} \qquad (21)$$

In addition, assuming $k_5=0$ in the formula (6) given above, the frequency fa' of the antiresonance point in the damper device according to the comparative example is represented by the following formula (22). When the formula (6) and the formula (22) are compared with each other, in the case where the spring constants $k_1$, $k_2$, $k_3$, and $k_4$ and the moments of inertia $J_{21}$ and $J_{22}$ are the same, the vibration amplitude fa' of the antiresonance point in the damper device according to the comparative example is smaller than the frequency fa of the antiresonance point A in the damper device 10. It should be noted, however, that with the damper device 10, the value of the frequency fa of the antiresonance point A can be easily set to a value about the frequency fa' of the antiresonance point of the damper device according to the comparative example (see the broken line in FIG. 8) by mainly selecting the moments of inertia $J_{21}$ and $J_{22}$ of the first and second intermediate members 12 and 14 as appropriate.

[Expression 11]

$$fa' = \frac{1}{2\pi}\sqrt{\frac{k_1k_2k_3 + k_1k_2k_4 + k_1k_3k_4 + k_2k_3k_4}{J_{21}k_3k_4 + J_{22}k_1k_2}} \qquad (22)$$

In the damper device 10 discussed above, the first and second outer springs SP11 and SP12 which have a spring constant (rigidity) that is smaller than that of the first and second inner springs SP21 and SP22 are disposed on the outer side of the first and second inner springs SP21 and SP22 in the radial direction of the damper device 10. Consequently, it is possible to increase the moment of inertia $J_{21}$ of the first intermediate member 12 and to lower the rigidity of the first and second outer springs SP11 and SP12, so that the natural frequency ($f_{21}$) of the first intermediate member 12 can be further lowered. In the damper device 10, in addition, the first and second outer springs SP11 and SP12 which have a low rigidity and a relatively light weight are disposed on the outer peripheral side of the damper device 10, and the first and second inner springs SP21 and SP22 which have a high rigidity and a relatively heavy weight are disposed on the center axis CA side of the damper device 10. Consequently, the hystereses of the first and second outer springs SP11 and SP12 on the outer peripheral side can be reduced by the weight reduction of the first and second outer springs SP11 and SP12 due to the low rigidity, and the hystereses of the first and second inner springs SP21 and SP22 on the inner peripheral side can be reduced by lowering a centrifugal force that acts on the first and second inner springs SP21 and SP22. Thus, with the damper device 10, it is possible to reduce the hysteresis of the entire device by reducing a friction force generated between the springs SP11, SP12, SP21, and SP22 and the associated rotary elements because of a centrifugal force. As a result, the vibration damping performance of the damper device 10 can be improved extremely well by bringing the antiresonance point A described above closer to the frequency of vibration (resonance) to be damped.

Furthermore, in the damper device 10 according to the present embodiment, the first intermediate member 12 is configured such that the moment of inertia $J_{21}$ is larger than the moment of inertia $J_{22}$ of the second intermediate member 14, and further the first intermediate member 12 is coupled to the turbine runner 5 so as to rotate therewith. Consequently, it is possible to further lower the vibration level around the antiresonance point A by further reducing the natural frequency $f_{21}$ on the low-frequency side. In addition, by coupling the first intermediate member 12 so as to rotate together with the turbine runner 5, the substantial moment of inertia $J_{21}$ of the first intermediate member 12 (the total of the moments of inertia of the first intermediate member 12, the turbine runner 5, etc.) can be increased. Consequently, it is possible to set the resonance point of the first intermediate member 12 on the lower-rotation side (lower-frequency side) by further reducing the natural frequency $f_{21}$ on the low-frequency side.

The basic procedure for designing the damper device 10 under the assumption that no hysteresis is provided has been described so far. However, it is practically extremely difficult to eliminate the hysteresis in the damper device 10 which includes the plurality of springs SP11, SP12, SP21, SP22, and SPm. In the damper device 10 which includes the first and second torque transfer paths P1 and P2, in addition, the frequency at which the phase of vibration transferred from the second outer springs SP12 to the driven member 16 is shifted by 180 degrees with respect to the phase of vibration transferred from the second inner springs SP22 to the driven member 16 may be shifted to the high-frequency side (high-rotation side) from the theoretical value because of the hysteresis. When such a shift of the phase inversion to the high-frequency side is caused, the frequency at which the vibration amplitude of the driven member 16 is minimized because vibration from the second outer springs SP12 and vibration from the second inner springs SP22 cancel out each other may also be shifted to the high-frequency side (high-rotation side). In the light of this, the inventors closely investigated the effect of the hysteresis on the phase inversion of vibration due to resonance at the natural frequency on the low-frequency side in the damper device 10 and the damper device according to the comparative example.

Figure 15:
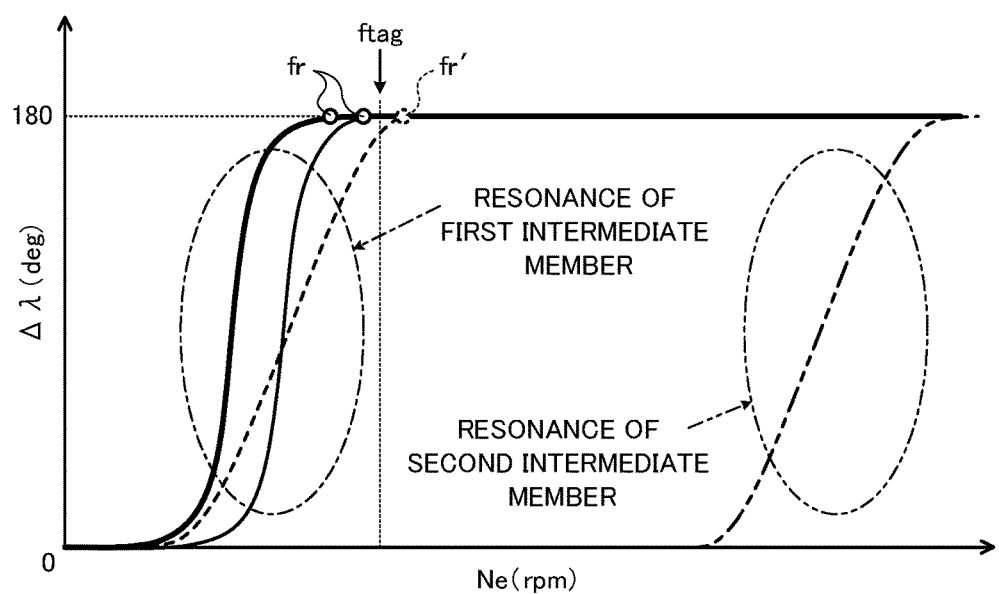
FIG. 15 illustrates an example of the relationship between the rotational speed of the engine and a phase difference Δλ between vibration transferred from the second elastic body to the output element and vibration transferred from the fourth elastic body to the output element.

The inventors first performed a simulation for a model of the damper device according to the comparative example in which the theoretical frequency fa' (see the formula (18) given above) of the antiresonance point is caused to generally coincide with a frequency ftag of resonance due to vibration of the entire damper device and the drive shaft of the vehicle (resonance due to vibration generated between the drive member and the drive shaft) to verify variations in phase of vibration due to resonance at the natural frequency $f_{21}'$ on the low-frequency side. In FIG. 15, the simulation result for the damper device according to the comparative example is indicated by the broken line. It was revealed that, in the damper device according to the comparative example, as indicated in FIG. 15, a frequency fr' at which the phases of vibrations in the two torque transfer paths were shifted by 180 degrees from each other was shifted to the high-frequency side (high-rotation side) with respect to the frequency ftag (an engine rotational speed corresponding thereto) of vibration to be damped as indicated by the broken line in the drawing. Thus, it is considered that the damper device according to the comparative example may not damp resonance due to vibration of the entire damper device and the drive shaft of the vehicle well.

The inventors further performed a simulation for a model of the damper device 10 in which the theoretical frequency fa (see the formula (6) given above) of the antiresonance point A is caused to generally coincide with the frequency ftag (the same value as with the comparative example) of resonance due to vibration of the entire damper device 10 and the drive shaft of the vehicle to verify variations in phase of vibration due to resonance at the natural frequency $f_{21}$ on the low-frequency side in the damper device 10. In FIG. 15, the simulation result for the damper device 10 is indicated by the solid line. As seen from the simulation results in FIG. 15, with the damper device 10 configured as discussed above, it is possible to reduce the effect of the hysteresis on the phase inversion of vibration due to resonance at the natural frequency $f_{21}$ on the low-frequency side well compared to the damper device according to the comparative example.

That is, with the damper device 10 which includes the intermediate springs SPm, as discussed above, resonance at the natural frequency $f_{21}$ on the low-frequency side, that is, resonance of the first intermediate member 12, can be easily shifted to the low-frequency side by adjusting the moments of inertia $J_{21}$ and $J_{22}$ of the first and second intermediate members 12 and 14. In the damper device 10, in addition, the spring constants $k_{11}$, $k_{12}$, $k_{21}$, and $k_{22}$ of the first and second outer springs SP11 and SP12 and the first and second inner springs SP21 and SP22 meet the relations $k_{11} < k_{21}$ and $k_{11}/k_{21} \neq k_{12}/k_{22}$. Consequently, it is possible to transfer torque (a part of average torque) from the second intermediate member 14 to the first intermediate member 12 via the third torque transfer path P3 which includes the intermediate springs SPm. This reduces torque distribution to the first outer springs SP11 to reduce the spring constant $k_{11}$ (rigidity reduction), and allows a friction force generated between the first outer springs SP11 and the rotary elements to be reduced because of a reduction in weight of the first outer springs SP11 due to the rigidity reduction. Thus, it is possible to reduce the hysteresis of the first outer springs SP11, and to immediately complete the phase inversion of vibration (make the gradient of phase variations steep) transferred from the second outer springs SP12 to the driven member 16 (vibration through the first torque transfer path P1) due to resonance at the natural frequency $f_{21}$, that is, resonance of the first intermediate member 12, as indicated by the thin solid line in FIG. 15. As a result, with the damper device 10, the effect of the hysteresis on the phase inversion can be reduced and, as indicated by the solid line in FIG. 15, the frequency fr at which the phase of vibration transferred from the second outer springs SP12 to the driven member 16 is shifted by 180 degrees with respect to the phase of vibration transferred from the second inner springs SP22 to the driven member 16 can be shifted to the low-frequency side (low-rotation side) with respect to the frequency ftag of vibration to be damped.

In the damper device 10, further, the spring constants $k_{11}$, $k_{12}$, $k_{21}$, and $k_{22}$ of the first and second outer springs SP11 and SP12 and the first and second inner springs SP21 and SP22 meet the relations $k_{11}/k_{21} < k_{12}/k_{22}$ and $k_{11} < k_{12} < k_{22} < k_{21}$. In the case where such relations are met, torque (a part of average torque) is transferred from the second intermediate member 14 to the first intermediate member 12 via the third torque transfer path P3 which includes the intermediate springs SPm, which increases torque transferred by the second outer springs SP12 which are provided between the first intermediate member 12 and the driven member 16. Meanwhile, in theory, the torque T which is input to the drive member 11 (sum of transfer torque of the first outer springs SP11 and transfer torque of the first inner springs SP21) and the sum of transfer torque of the second outer springs SP12 and transfer torque of the second inner springs SP22 are equal to each other. Thus, in the case where the relations $k_{11}/k_{21} < k_{12}/k_{22}$ and $k_{11} < k_{12} < k_{22} < k_{21}$ are met, the spring constant $k_{11}$ of the first outer springs SP11 can be reduced (rigidity reduction) by further reducing torque distribution to the first outer springs SP11 and, further, the spring constant $k_{12}$ of the second outer spring SP12 can also be reduced (rigidity reduction). Thus, with the damper device 10, it is possible to further reduce a friction force generated between the first and second outer springs SP11 and SP12 and the rotary elements, that is, the hysteresis, because of a weight reduction of the first and second outer springs SP11 and SP12 due to the rigidity reduction, and to shift resonance at the natural frequency $f_{21}$, that is, resonance of the first intermediate member 12, to the low-frequency side. As a result, as indicated by the thick solid line in FIG. 15, a shift of the frequency fr described above to the high-frequency side due to the hysteresis can be reduced well.

Figure 16:
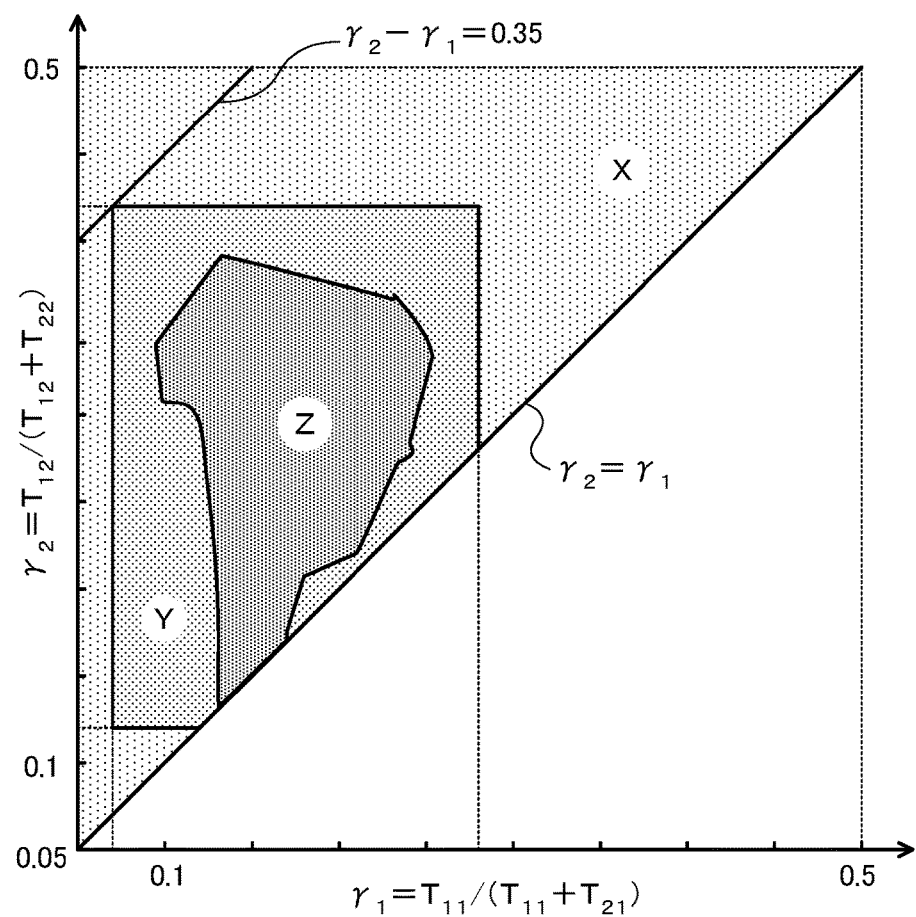
FIG. 16 illustrates the relationship between the torque distribution ratios of the elastic bodies in the damper device according to the present disclosure and the vibration damping performances.

FIG. 16 illustrates the relationship among a torque distribution ratio $\gamma_1$ of the first outer springs SP11 and the first inner springs SP21 to which torque is transferred from the drive member 11, a torque distribution ratio $\gamma_2$ of the second outer springs SP12 and the second inner springs SP22 which transfer torque to the driven member 16, and the vibration damping performance of the damper device 10. The inventors also analyzed the relationship between the torque distribution ratios $\gamma_1$ and $\gamma_2$ and the vibration damping performance of the damper device 10 at the time when the torque T which was input to the drive member 11 was a predetermined value that is less than the torque T1 described above (when deflection of all of the springs SP11, SP12, SP21, SP22, and SPm was allowed). When torque that the first outer springs SP11 transfer from the drive member 11 to the first intermediate member 12 is defined as "$T_{11}$" and torque that the first inner springs SP21 transfer from the drive member 11 to the second intermediate member 14 is defined as "$T_{21}$", the torque distribution ratio $\gamma_1$ is represented as $\gamma_1 = T_{11}/(T_{11}+T_{21})$. When torque that the second outer springs SP12 transfer from the first intermediate member 12 to the driven member 16 is defined as "$T_{12}$" and torque that the second inner springs SP22 transfer from the second intermediate member 14 to the driven member 16 is defined as "$T_{22}$", the torque distribution ratio $\gamma_2$ is represented as $\gamma_2 = T_{12}/(T_{12}+T_{22})$. In addition, as discussed above, the relation $T = T_{11}+T_{21} = T_{12}+T_{22}$ is met in theory between the input torque T and the torques $T_{11}$, $T_{21}$, $T_{12}$, and $T_{21}$. In this analysis as well, as in FIG. 8 etc., the vibration damping performance of the damper device 10 was evaluated on the basis of the vibration amplitude (torque fluctuations) of the driven member 16.

As with the damper device 10, in the case where torque (a part of average torque) is transferred from the second intermediate member 14 to the first intermediate member 12 via the third torque transfer path P3 which includes the intermediate springs SPm, the torque distribution ratios $\gamma_1$ and $\gamma_2$ are included in a region X positioned on the upper side of a line segment that indicates $\gamma_1 = \gamma_2$ in FIG. 16 (excluding points on the line segment which indicates $\gamma_1 = \gamma_2$). Such a region X is a region in which the relation $\gamma_1 < \gamma_2$, that is, $T_{11}/(T_{11}+T_{21}) < T_{12}/(T_{12}+T_{22})$, is met. The inventors obtained through analysis a range in the region X in which the vibration damping performance was secured well while suppressing an increase in coil diameter or axial length of the springs SP11, SP12, SP21, SP22, and SPm, that is, an increase in size of the damper device 10.

As a result of the analysis, it was revealed that the vibration damping performance was secured well while suppressing an increase in size of the damper device 10 in the case where the torque distribution ratios $\gamma_1$ and $\gamma_2$ were included in a region Y indicated in FIG. 16. The region Y is a region that meets $\gamma_1 < \gamma_2$, $0.07 \leq \gamma_1 = T_{11}/(T+T_{21}) \leq 0.28$, and $0.12 \leq \gamma_2 = T_{12}/(T_{12}+T_{22}) \leq 0.42$. Furthermore, the analysis conducted by the inventors has revealed that the vibration damping performance of the damper device 10 may be further improved in the case where the torque distribution ratios $\gamma_1$ and $\gamma_2$ are included in a region Z in the region Y indicated in FIG. 16. The region Z is a region that generally meets $\gamma_1 < \gamma_2$, $0.1 \leq \gamma_7 = T_1/(T_{11}+T_{21}) \leq 0.25$, and $0.13 \leq \gamma_2 = T_{12}/(T_{12}+T_{22}) \leq 0.39$. Thus, the damper device 10 is preferably configured to meet $\gamma_1 < \gamma_2$, $0.07 \leq \gamma_1 = T_{11}/(T_{11}+T_{21}) \leq 0.28$, and $0.12 \leq \gamma_2 = T_{12}/(T_{12}+T_{22}) \leq 0.42$, more preferably $\gamma_1 < \gamma_2$, $0.1 \leq \gamma_1 = T_{11}/(T_{11}+T_{21}) \leq 0.25$, and $0.13 \leq \gamma_2 = T_{12}/(T_{12}+T_{22}) \leq 0.39$.

In addition, when torque that the intermediate springs SPm transfer between the first and second intermediate members 12 and 14 is defined as "$T_m$", $\gamma_2 - \gamma_1$ $T_m/(T_{11}+T_{21}) = T_m/(T_{12}+T_{22})$ is met. Such a value ($\gamma_2 - \gamma_1$) indicates the proportion of transfer torque of the intermediate springs SPm to the input torque T (torque output from the driven member 16). The analysis conducted by the inventors has revealed that the vibration damping performance may be secured well while suppressing an increase in size of the damper device 10 when $0 < \gamma_2 - \gamma_1 \leq 0.35$ is met. Since it is also considered that the relation $T_{11}+T_{21} = T_{12}+T_{22}$ is not met to be exact because of a loss or the like, the damper device 10 may be configured to meet one of $0 < \gamma_2 - \gamma_1 \leq 0.35$ and $0 < T_m/(T_{12}+T_{22}) \leq 0.35$.

Figure 17:
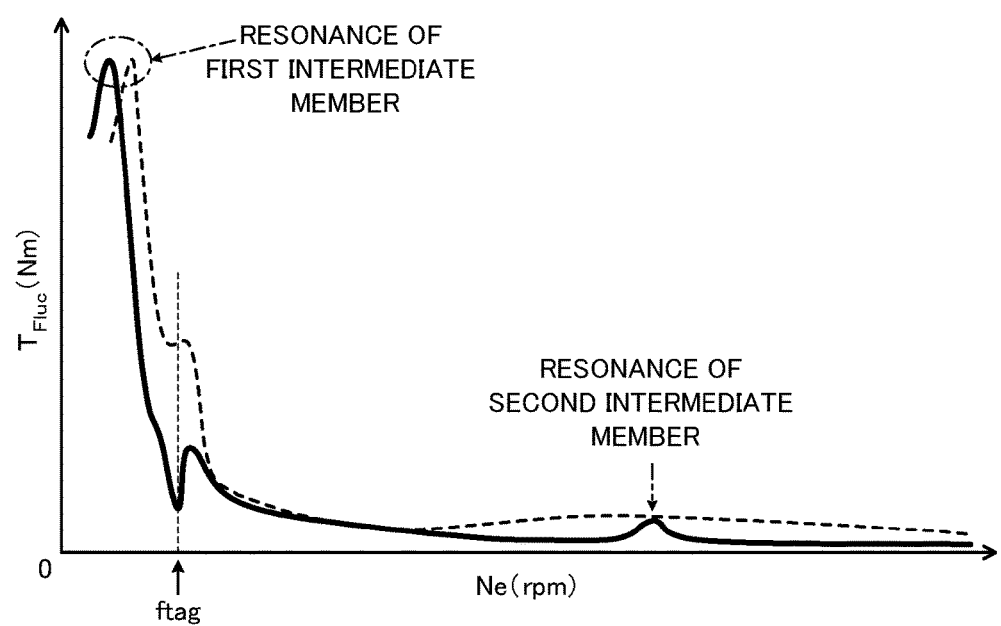
FIG. 17 illustrates an example of the relationship between the rotational speed of the engine and torque fluctuations of the output element of the damper device with a hysteresis taken into consideration.

FIG. 17 illustrates an example of the relationship between the rotational speed of the engine EG and the vibration amplitude (torque fluctuations) of the driven member of the damper device 10 and the damper device according to the comparative example, from which the intermediate springs SPm have been omitted, with the hysteresis taken into consideration. In FIG. 17, the solid line indicates the simulation result for the vibration amplitude (torque fluctuations) of the driven member of the damper device 10 with the hysteresis taken into consideration, and the broken line indicates the simulation result for the vibration amplitude (torque fluctuations) of the driven member of the damper device according to the comparative example with the hysteresis taken into consideration. A model of the damper device 10 used in such simulation was built by determining various specifications so as to meet the relation $k_{11} < k_m < k_{12} < k_{22} < k_{21}$ and the relations $\gamma_1 < \gamma_2$, $0.07 \leq \gamma_1 = T_{11}/(T_{11}+T_{21}) \leq 0.28$, and $0.12 \leq \gamma_2 = T_{12}/(T_{12}+T_{22}) \leq 0.42$, and such that the theoretical frequency fa of the antiresonance point A generally coincided with the frequency flag of resonance due to vibration of the entire damper device 10 and the drive shaft of the vehicle discussed above. Meanwhile, a model of the damper device according to the comparative example used in the simulation was built by determining various specifications such that the theoretical frequency fa' of the antiresonance point generally coincided with the frequency flag (the same value as with the damper device 10) of resonance due to vibration of the entire damper device and the drive shaft of the vehicle.

As indicated in FIG. 17, with the damper device 10, resonance at the natural frequency $f_{21}$ on the low-frequency side which causes the antiresonance point A, that is, resonance of the first intermediate member 12, can be shifted to the lower-frequency side to be moved away from the antiresonance point A, compared to the damper device according to the comparative example. Thus, it is understood that the vibration damping performance of the damper device 10 can be improved extremely well, compared to the damper device according to the comparative example, by bringing the frequency fa of the antiresonance point A closer to the frequency flag of vibration (resonance) to be damped. As a result, with the starting device 1 which includes the damper device 10, it is possible to set the lock-up rotational speed Nlup of the lock-up clutch 8 to the lower-rotation side (e.g. a rotational speed that is lower than the rotational speed of the engine EG corresponding to the frequency flag), compared to the damper device according to the comparative example. That is, by selecting the spring constants $k_{11}$, $k_{12}$, $k_{21}$, $k_{22}$, and $k_m$ so as to meet $k_{11} < k_m < k_{12} < k_{22} < k_{21}$, it is possible to improve the vibration damping performance of the damper device 10 extremely well by appropriately transferring torque from the second intermediate member 14 to the first intermediate member 12 via the intermediate springs SPm.

In the damper device 10 described above, the spring constant $K_{21}$ of the first inner springs SP21 is larger than the spring constant $K_{22}$ of the second inner springs SP22 ($k_{22} < k_{21}$). However, the disclosure is not limited thereto. That is, in order to make it easy to design the damper device 10, the specifications such as the spring constant $K_{21}$, the coil diameter, and the axial length of the first inner springs SP21 may be the same as the specifications such as the spring constant $K_{22}$, the coil diameter, and the axial length of the second inner springs SP22 ($k_{22} = k_{21}$).

In the damper device 10, further, the spring constant $k_m$ of the intermediate springs SPm may be determined to be smaller than the spring constants $k_{11}$, $k_{12}$, $k_{21}$, and $k_{22}$ of the first and second outer springs SP11 and SP12 and the first and second inner springs SP21 and SP22. That is, as discussed above, the natural frequency $f_{21}$ on the low-rotation side (low-frequency side) and the frequency fa of the antiresonance point A are lower as the synthetic spring constant $k_5$ of the intermediate springs SPm is smaller (see FIG. 13). Thus, by making the spring constant (rigidity) $k_m$ of the intermediate springs SPm smaller than the spring constants $k_{11}$, $k_{12}$, $k_{21}$, and $k_{22}$, the natural frequency $f_{21}$ and the frequency fa can be made much smaller. Adopting such a configuration also makes it possible to set the start point of a rotational speed band in which one of vibration transferred from the second outer springs SP12 to the driven member 16 and vibration transferred from the second inner springs SP22 to the driven member 16 is used to cancel out at least a part of the other on the lower-rotation side. By setting the start point of such a rotational speed band on the low-rotation side, additionally, the rotational speed (frequency) at which the phase of vibration transferred from the second outer springs SP12 to the driven member 16 and the phase of vibration transferred from the second inner springs SP22 to the driven member 16 are shifted by 180 degrees from each other can also be set to the low-rotation side (low-frequency side). In this case, the spring constants $k_{11}$, $k_{12}$, $k_{21}$, and $k_{22}$ of the first and second outer springs SP11 and SP12 and the first and second inner springs SP21 and SP22 preferably meet at least the relations $k_{11} \neq k_{21}$ and $k_{11}/k_{21} \neq k_{12}/k_{22}$.

In the damper device 10, in addition, the spring constant $k_m$ of the intermediate springs SPm may be determined to be larger than the spring constants $k_{11}$, $k_{12}$, $k_{21}$, and $k_{22}$ of the first and second outer springs SP11 and SP12 and the first and second inner springs SP21 and SP22. That is, as discussed above, the difference (fa−$f_{21}$) between the natural frequency $f_{21}$ on the low-rotation side (low-frequency side) and the frequency fa of the antiresonance point A is larger as the synthetic spring constant $k_5$ of the intermediate springs SPm is larger (see FIG. 13). Thus, by making the spring constant (rigidity) $k_m$ of the intermediate springs SPm larger than the spring constants $k_{11}$, $k_{12}$, $k_{21}$, and $k_{22}$, it is possible to widen the rotational speed band in which one of vibration transferred from the second outer springs SP12 to the driven member 16 and vibration transferred from the second inner springs SP22 to the driven member 16 is used to cancel out at least a part of the other, that is, a range in which the vibration level of the driven member 16 may be lowered well, by increasing the difference from the difference (fa−$f_{21}$) between the natural frequency $f_{21}$ and the frequency fa.

In this case, the spring constants $k_{11}$, $k_{12}$, $k_{21}$, and $k_{22}$ of the first and second outer springs SP11 and SP12 and the first and second inner springs SP21 and SP22 are preferably adjusted such that the natural frequency $f_{21}$ and the frequency fa of the antiresonance point A are further reduced and the difference (fa−$f_{21}$) therebetween is more increased. From the viewpoint of ease of setting the values of the spring constants $k_{11}$, $k_{12}$, $k_{21}$, and $k_{22}$ for further reducing the natural frequency $f_{21}$ and the frequency fa of the antiresonance point A, such a configuration is advantageously applied to a damper device for which maximum torque input to the drive member 11 is relatively small and the required equivalent rigidity keq is relatively low. In this case as well, the spring constants $k_{11}$, $k_{12}$, $k_{21}$, and $k_{22}$ of the first and second outer springs SP11 and SP12 and the first and second inner springs SP21 and SP22 preferably meet the relations $k_{11} \neq k_{21}$ and $k_{11}/k_{21} \neq k_{12}/k_{22}$.

Furthermore, the damper device 10 may further include at least one torque transfer path provided in parallel with the first and second torque transfer paths P1 and P2, for example, in addition to the first, second, and third torque transfer paths P1, P2, and P3. Moreover, at least one of the first and second torque transfer paths P1 and P2, for example, of the damper device 10 may be additionally provided with at least one set of an intermediate member and springs (elastic bodies).

In the starting device 1, in addition, in the case where slip control in which the actual slip speed (actual rotational speed difference) between the engine EG and the input shaft (drive member 11) of the transmission TM is caused to coincide with a target slip speed, the frequency fa of the antiresonance point A described above may be caused to coincide with a frequency fs of shudder generated when the slip control is executed, or may be set to a value that is close to the frequency fs of the shudder. Consequently, it is possible to reduce shudder generated when the slip control is executed. If the moment of inertia of the lock-up piston 80 and the drive member 11 which rotate together with each other is defined as "$J_{pd}$", the frequency fs of the shudder can be represented as $fs = 1/2\pi \cdot (k_{eq}/J_{pd})$ using the moment of inertia $J_{pd}$ and the equivalent rigidity $k_{eq}$ of the damper device 10.

Figure 18:
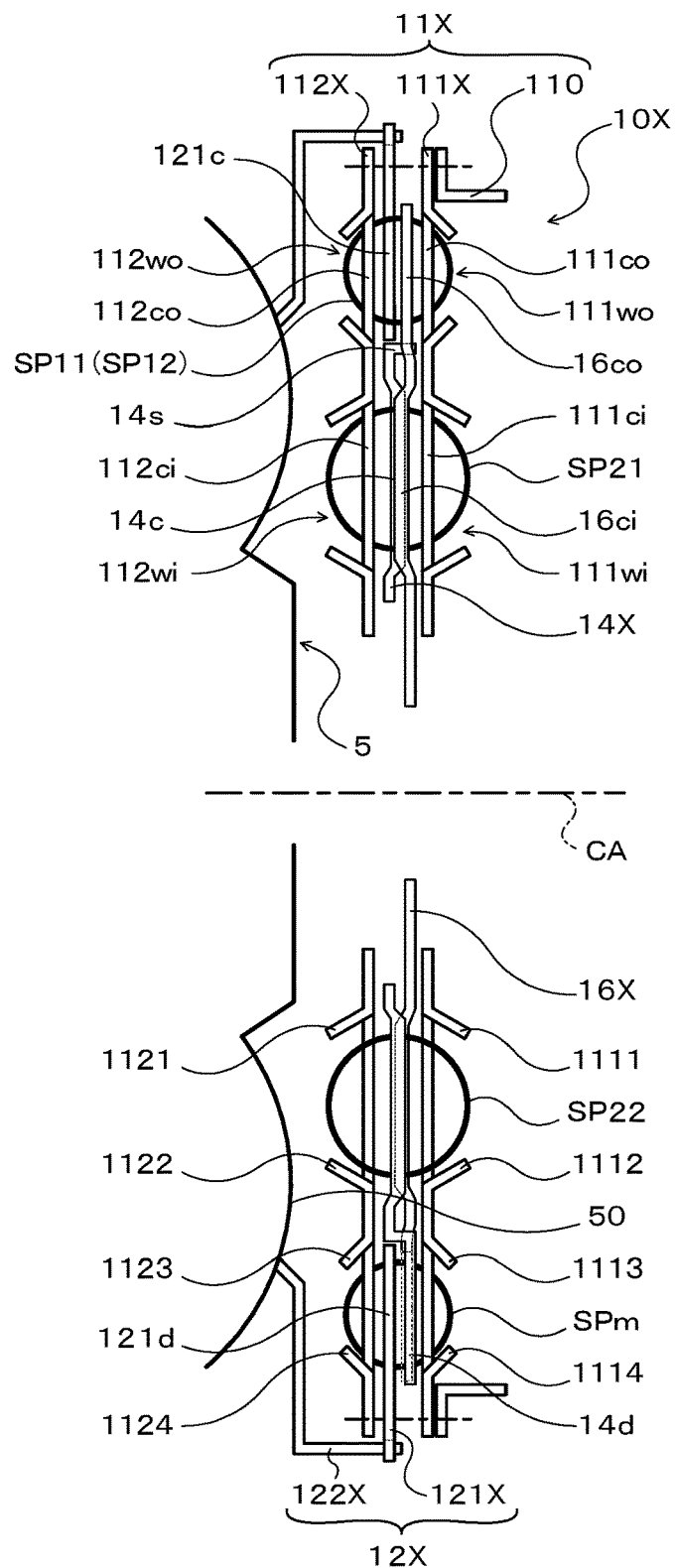
FIG. 18 is a sectional view illustrating another damper device according to the present disclosure.

FIG. 18 is a sectional view illustrating another damper device 10X according to the present disclosure. Constituent elements of the damper device 10X that are identical to the elements of the damper device 10 discussed above are given the same numerals to omit redundant descriptions.

A drive member 11X of the damper device 10X illustrated in FIG. 18 includes: an annular coupling member 110 fixed to the lock-up piston of the lock-up clutch; an annular first plate member (first input member) 111X rotatably supported (aligned) by the damper hub, for example, and coupled so as to rotate together with the coupling member 110; and an annular second plate member (second input member) 112X disposed in more proximity to the turbine runner 5 than the first plate member 111X and coupled (fixed) to the first plate member 111X via a plurality of rivets. Consequently, the drive member 11X, that is, the first and second plate members 111X and 112X, rotates together with the lock-up piston, and the front cover (engine EG) and the drive member 11X of the damper device 10 are coupled to each other through engagement of the lock-up clutch. In the case where the lock-up clutch is a hydraulic multi-plate clutch, the coupling member 110 may be constituted as a clutch drum of the lock-up clutch.

The first plate member 111X is constituted as an annular plate-like member, and disposed in more proximity to the lock-up piston 80 than the second plate member 112X. The first plate member 111X has a plurality of (e.g. three) inner spring housing windows 111wi, a plurality of (e.g. four) outer spring housing windows 111wo, a plurality of (e.g. three) spring support portions 1111, a plurality of (e.g. three) spring support portions 1112, a plurality of (e.g. four) spring support portions 1113, a plurality of (e.g. four) spring support portions 1114, a plurality of (e.g. three) inner spring abutment portions 111ci, and a plurality of (e.g. four) outer spring abutment portions 111co.

The plurality of inner spring housing windows 111wi extend arcuately, and are disposed at intervals (equal intervals) in the circumferential direction in the inner peripheral portion of the first plate member 111X. The plurality of spring support portions 1111 extend along the inner peripheral edges of the respective inner spring housing windows 111wi, and are arranged at intervals (equal intervals) in the circumferential direction. The plurality of spring support portions 1112 extend along the outer peripheral edges of the respective inner spring housing windows 111wi, and are arranged at intervals (equal intervals) in the circumferential direction to face the respective spring support portions 1111 in the radial direction of the first plate member 111X. In addition, the inner spring abutment portions 111ci are provided such that each inner spring abutment portion 111ci is interposed between the inner spring housing windows 111wi (spring support portions 1111 and 1112) which are adjacent to each other along the circumferential direction.

The plurality of outer spring housing windows 111wo extend arcuately, and are disposed at intervals in the circumferential direction in the outer peripheral portion of the first plate member 111X so as to be positioned on the radially outer side with respect to the inner spring housing windows 111wi. The plurality of spring support portions 1113 extend along the inner peripheral edges of the respective outer spring housing windows 111wo, and are arranged at intervals (equal intervals) in the circumferential direction. The plurality of spring support portions 1114 extend along the outer peripheral edges of the respective outer spring housing windows 111wo, and are arranged at intervals (equal intervals) in the circumferential direction to face the respective spring support portions 1113 in the radial direction of the first plate member 111X. In addition, the outer spring abutment portions 111co are provided such that each outer spring abutment portion 111co is interposed between the outer spring housing windows 111wo (spring support portions 1113 and 1114) which are adjacent to each other along the circumferential direction.

The second plate member 112X is constituted as an annular plate-like member, and disposed in more proximity to the turbine runner 5 than the first plate member 111X. The second plate member 112X has a plurality of (e.g. three) inner spring housing windows 112wi, a plurality of (e.g. four) outer spring housing windows 112wo, a plurality of (e.g. three) spring support portions 1121, a plurality of (e.g. three) spring support portions 1122, a plurality of (e.g. four) spring support portions 1123, a plurality of (e.g. four) spring support portions 1124, a plurality of (e.g. three) inner spring abutment portions 112ci, and a plurality of (e.g. four) outer spring abutment portions 112co.

The plurality of inner spring housing windows 112wi extend arcuately, and are disposed at intervals (equal intervals) in the circumferential direction in the inner peripheral portion of the second plate member 112X. The plurality of spring support portions 1121 extend along the inner peripheral edges of the respective inner spring housing windows 112wi, and are arranged at intervals (equal intervals) in the circumferential direction. The plurality of spring support portions 1122 extend along the outer peripheral edges of the respective inner spring housing windows 112wi, and are arranged at intervals (equal intervals) in the circumferential direction to face the respective spring support portions 1121 in the radial direction of the second plate member 112X. In addition, the inner spring abutment portions 112ci are provided such that each inner spring abutment portion 112ci is interposed between the inner spring housing windows 112wi (spring support portions 1121 and 1122) which are adjacent to each other along the circumferential direction.

The plurality of outer spring housing windows 112wo extend arcuately, and are disposed at intervals in the circumferential direction in the outer peripheral portion of the second plate member 112X so as to be positioned on the radially outer side with respect to the inner spring housing windows 112wi. The plurality of spring support portions 1123 extend along the inner peripheral edges of the respective outer spring housing windows 112wo, and are arranged at intervals (equal intervals) in the circumferential direction. The plurality of spring support portions 1124 extend along the outer peripheral edges of the respective outer spring housing windows 12wo, and are arranged at intervals (equal intervals) in the circumferential direction to face the respective spring support portions 1123 in the radial direction of the second plate member 112X. In addition, the outer spring abutment portions 112co are provided such that each outer spring abutment portion 112co is interposed between the outer spring housing windows 112wo (spring support portions 1123 and 1124) which are adjacent to each other along the circumferential direction.

As illustrated in FIG. 18, a first intermediate member 12X of the damper device 10X includes: a plate-like annular member 121X disposed between the first and second plate members 111X and 112X of the drive member 11X in the axial direction; and a coupling member 122X fixed to the turbine runner 5. The annular member 121X has: a plurality of (e.g. two at intervals of 180° in the present embodiment) spring abutment portions 121c that extend radially inward from an annular outer peripheral portion at intervals in the circumferential direction; and a plurality of (e.g. four) second spring abutment portions 121d that extend radially inward from portions of the annular outer peripheral portion located between the spring abutment portions 121c which are adjacent to each other in the circumferential direction. The plurality of second spring abutment portions 121d are formed symmetrically with respect to the axis of the annular member 121X such that two (a pair of) second spring abutment portions 121d are proximate to each other. The two second spring abutment portions 121d which are paired with each other are arranged in the circumferential direction at an interval that matches the natural length of the intermediate springs SPm, for example.

The coupling member 122X of the first intermediate member 12X has: an annular fixed portion fixed by welding, for example, to the turbine shell 50 of the turbine runner 5; and a plurality of projecting portions that extend in the axial direction from the outer peripheral portion of the fixed portion at intervals in the circumferential direction. As illustrated in FIG. 18, the projecting portions of the coupling member 122X are fitted with respective recessed portions formed in the outer periphery of the annular member 121X from the turbine runner 5 side. Consequently, the outer peripheral portion of the annular member 121X and the coupling member 122X which is fixed to the turbine runner 5 are coupled so as to rotate together with each other.

A second intermediate member 14X of the damper device 10X is an annular plate-like member rotatably supported (aligned) by the damper hub 7, for example, and has a natural frequency that is higher than that of the first intermediate member 12X and a moment of inertia that is smaller than that of the first intermediate member 12X. The second intermediate member 14X has: a plurality of (e.g. three) spring housing windows; a plurality of (e.g. three) spring abutment portions 14c disposed at intervals in the circumferential direction; a support portion 14s in a short tube shape that extends in the axial direction on the radially outer side with respect to the spring abutment portions 14c; and a plurality of (e.g. four) second spring abutment portions 14d that extend radially outward from the distal end of the support portion 14s away from the spring abutment portions 14c in the axial direction.

As illustrated in FIG. 18, the outer peripheral surface of the support portion 14s supports the inner peripheral surface of the annular member 121X (the spring abutment portions 14c and the second spring abutment portions 14d) of the first intermediate member 12X in the radial direction. Consequently, the annular member 121X (first intermediate member 12X) is rotatably supported (aligned) by the second intermediate member 14X. The plurality of spring abutment portions 14c are provided such that each spring abutment portion 14c is interposed between the spring housing windows which are adjacent to each other along the circumferential direction. The second spring abutment portions 14d are formed symmetrically with respect to the axis of the second intermediate member 14X such that two (a pair of) second spring abutment portions 14d are proximate to each other. The two second spring abutment portions 14d which are paired with each other are arranged in the circumferential direction at an interval that matches the natural length of the intermediate springs SPm, for example.

A driven member 16X of the damper device 10X is constituted as an annular plate-like member. As illustrated in FIG. 18, the driven member 16X is disposed between the first plate member 111X and the second plate member 112X of the drive member 11X in the axial direction, and fixed to the damper hub via a plurality of rivets. Consequently, the driven member 16X is rotated together with the damper hub. The driven member 16X has: a plurality of (e.g. three) spring housing windows that extend arcuately along the inner peripheral edge of the driven member 16X and that are disposed at intervals (equal intervals) in the circumferential direction; a plurality of (e.g. three) inner spring abutment portions (inner abutment portions) 16ci disposed at intervals (equal intervals) in the circumferential direction; and a plurality of (e.g. four) outer spring abutment portions (outer abutment portions) 16co. The plurality of inner spring abutment portions 16ci are provided such that each inner spring abutment portion 16ci is interposed between the spring housing windows which are adjacent to each other along the circumferential direction. The plurality of outer spring abutment portions 16co are arranged at intervals in the circumferential direction on the radially outer side with respect to the plurality of inner spring abutment portions 16ci, and extend in the radial direction.

The first and second outer springs SP11 and SP12 are supported by the associated spring support portions 1113, 1114, 1123, and 1124 of the drive member 11X, that is, the first and second plate members 111X and 112X, such that one first outer spring SP11 and one second outer spring SP12 are paired (act in series with each other) and such that the first and second outer springs SP11 and SP12 are arranged alternately in the circumferential direction (circumferential direction of the annular member 121X). Furthermore, with the damper device 10X in the attached state, the outer spring abutment portions 111co of the first plate member 111X are each provided between the first and second outer springs SP11 and SP12, which are disposed in the inner spring housing windows 111wi that are different from each other and which are not paired (do not act in series with each other), so as to abut against the end portions of such first and second outer springs SP11 and SP12 in the circumferential direction. Similarly, with the damper device 10X in the attached state, the outer spring abutment portions 112co of the second plate member 112X are each also provided between the first and second outer springs SP11 and SP12, which are disposed in the inner spring housing windows 112wi that are different from each other (not paired), so as to abut against the end portions of such first and second outer springs SP11 and SP12 in the circumferential direction. In addition, the spring abutment portions 121c of the first intermediate member 12X (annular member 121X) are each provided between the first and second outer springs SP11 and SP12, which are paired with each other (act in series with each other), so as to abut against the end portions of such first and second outer springs SP11 and SP12 in the circumferential direction.

The first and second inner springs SP21 and SP22 are supported by the associated spring support portions 1111, 1112, 1121, and 1121 of the drive member 11X, that is, the first and second plate members 111X and 112X, such that one first inner spring SP21 and one second inner spring SP22 are paired (act in series with each other) and such that the first and second inner springs SP21 and SP22 are arranged alternately in the circumferential direction (circumferential direction of the second intermediate member 14X). Furthermore, with the damper device 10X in the attached state, the inner spring abutment portions 111ci of the first plate member 111X are each provided between the first and second inner springs SP21 and SP22, which are disposed in the inner spring housing windows 111wi that are different from each other and which are not paired (do not act in series with each other), so as to abut against the end portions of such first and second inner springs SP21 and SP22 in the circumferential direction. Similarly, with the damper device 10X in the attached state, the inner spring abutment portions 112ci of the second plate member 112X are each also provided between the first and second inner springs SP21 and SP22, which are disposed in the inner spring housing windows 112wi that are different from each other (not paired), so as to abut against the end portions of such first and second inner springs SP21 and SP22 in the circumferential direction. In addition, the spring abutment portions 14c of the second intermediate member 14X are each provided between the first and second inner springs SP21 and SP22, which are paired with each other (act in series with each other), so as to abut against the end portions of such first and second inner springs SP21 and SP22 in the circumferential direction.

In addition, as with the outer spring abutment portions 111co and 112co of the drive member 11X, the outer spring abutment portions 16co of the driven member 16X are each provided between the first and second outer springs SP11 and SP12, which are not paired (do not act in series with each other), so as to abut against the end portions of such first and second outer springs SP11 and SP12 in the circumferential direction. Furthermore, with the damper device 10X in the attached state, as with the inner spring abutment portions 111ci and 112ci of the drive member 11, the inner spring abutment portions 16ci of the driven member 16 are each provided between the first and second inner springs SP21 and SP22, which are not paired (do not act in series with each other), so as to abut against the end portions of such first and second inner springs SP21 and SP22 in the circumferential direction. As a result, with the damper device 10X in the attached state, the driven member 16X is coupled to the drive member IX via the plurality of first outer springs SP11, the first intermediate member 12X (the annular member 121X and the coupling member 122X), and the plurality of second outer springs SP12, and coupled to the drive member 11X via the plurality of first inner springs SP21, the second intermediate member 14X, and the plurality of second inner springs SP22.

The intermediate springs SPm are supported by the associated spring support portions 1113, 1114, 1124, 1124 of the drive member 11X, that is, the first and second plate members 111X and 112X, such that the intermediate springs SPm are arranged side by side with the first outer springs SP11 and the second outer springs SP12 along the circumferential direction. With the damper device 10X in the attached state, each intermediate spring SPm is supported from both sides in the circumferential direction by the pair of second spring abutment portions 121d of the first intermediate member 12X (annular member 121X), and supported from both sides in the circumferential direction by the pair of second spring abutment portions 14d of the second intermediate member 14X. Consequently, the first intermediate member 12X and the second intermediate member 14X are coupled to each other via the plurality of intermediate springs SPm. Spring seats may be disposed between the end portions of the intermediate springs SPm and the second spring abutment portions 121d and 14d.

In the damper device 10X configured as discussed above as well, the average attachment radius ro of the first and second outer springs SP11 and SP12 corresponding to the first intermediate member 12X, which has a natural frequency that is lower than that of the second intermediate member 14X, is larger than the average attachment radius ri of the first and second inner springs SP21 and SP22. That is, the axes of the first and second outer springs SP11 and SP12 are positioned on the outer side in the radial direction of the damper device 10X with respect to the axes of the first and second inner springs SP21 and SP22. In the damper device 10X, in addition, the first and second outer springs SP11 and SP12 are disposed such that the entire first and second outer springs SP11 and SP12 are positioned on the radially outer side with respect to the first and second inner springs SP21 and SP22. Consequently, it is possible to more increase the moment of inertia $J_{21}$ of the first intermediate member 12X and to lower the rigidities of the first and second outer springs SP11 and SP12, so that the natural frequency $(f_{21})$ of the first intermediate member 12X is further lowered. In the damper device 10X, in addition, the hystereses of the first and second outer springs SP11 and SP12 on the outer peripheral side can be reduced by the weight reduction of the first and second outer springs SP11 and SP12 due to the low rigidity, and the hystereses of the first and second inner springs SP21 and SP22 on the inner peripheral side can be reduced by lowering a centrifugal force that acts on the first and second inner springs SP21 and SP22.

In the damper device 10X, further, the annular member 121X of the first intermediate member 12X, the second intermediate member 14X, and the driven member 16X are disposed between the first and second plate members 111X and 112X of the drive member 11X in the axial direction. With the damper device 10X which has such a configuration, a friction force generated between the first and second plate members 111X and 112X and the springs SP11, SP12, SP21, and SP22 because of a centrifugal force, in particular, can be reduced by elaborating on the shape of the spring abutment portions 121c and 14c of the first and second intermediate members 12X and 14X and the inner and outer spring abutment portions 16ci and 16co of the driven member 16X. As a result, it is possible to reduce the hysteresis of the entire damper device 10X. Accordingly, the vibration damping performance of the damper device 10 can be improved extremely well by bringing the antiresonance point A described above closer to the frequency of vibration (resonance) to be damped.

In addition, in the damper device 10X, as illustrated in FIG. 18, the inner and outer spring abutment portions 111ci, 112ci, 111co, and 112co of the drive member 11X, the spring abutment portions 121c and 14c of the first and second intermediate members 12X and 14X, and the inner and outer spring abutment portions 16ci and 16co of the driven member 16X extend in the radial direction of the damper device 10X. Thus, it is possible for the spring abutment portions 111ci, 112ci, 111co, 112co, 121c, 14c, 16ci, and 16co to press the associated springs SP11, SP12, SP21, and SP22 so as to be expanded and contracted appropriately along the axes. In the damper device 10X, additionally, the second spring abutment portions 121d and 14d of the first and second intermediate members 12X and 14X also extend in the radial direction of the damper device 10X. Thus, it is possible for the second spring abutment portions 121d and 14d to press the intermediate springs SPm so as to be expanded and contracted appropriately along the axis. As a result, the vibration damping performance of the damper device 10X can be further improved.

Furthermore, in the damper device 10X, as illustrated in FIG. 18, the spring abutment portions 14c of the second intermediate member 14X and the inner spring abutment portions 16ci of the driven member 16X overlap each other in the axial direction as seen in the radial direction, and the second spring abutment portions 14d of the second intermediate member 14X and the outer spring abutment portions 16co of the driven member 16 overlap each other in the axial direction as seen in the radial direction. Additionally, the annular member 121X of the first intermediate member 12X is disposed side by side in the axial direction with the second spring abutment portions 14d of the second intermediate member 14X and the outer spring abutment portions 16co of the driven member 16X. Consequently, it is possible to shorten the axial length of the damper device 10. In addition, the damper device 10X includes the coupling member 122X which is fixed to the turbine runner 5 and which is coupled to the outer peripheral portion of the annular member 121X. Consequently, it is possible to couple the first intermediate member 12X to both the first and second outer springs SP11 and SP12, which are disposed on the radially outer side, and to couple the first intermediate member 12X to the turbine runner 5 while suppressing an increase in axial length of the damper device 10.

In the damper device 10X described above, the intermediate springs SPm are disposed side by side with the first and second outer springs SP11 and SP12 along the circumferential direction of the damper device 10. However, the disclosure is not limited thereto. That is, in the damper device 10X, the intermediate springs SPm may each be disposed between the first and second outer springs SP11 and SP12 and the first and second inner springs SP21 and SP22 in the radial direction of the damper device 10X. Consequently, it is possible to increase the torsional angle (stroke) of the first and second outer springs SP11 and SP12. In this case, the intermediate springs SPm are preferably supported by at least one of the coupling member 122X of the first intermediate member 12X and the turbine runner 5, and at least one of the second plate member 112X and the turbine runner 5 is preferably provided with a plurality of second spring abutment portions so as to support each intermediate spring SPm from both sides in the circumferential direction. In addition, the second spring abutment portions 14d of the second intermediate member 14X may be formed so as to project toward the turbine runner 5 via the outer spring housing windows 112wo of the second plate member 112X.

Figure 19:
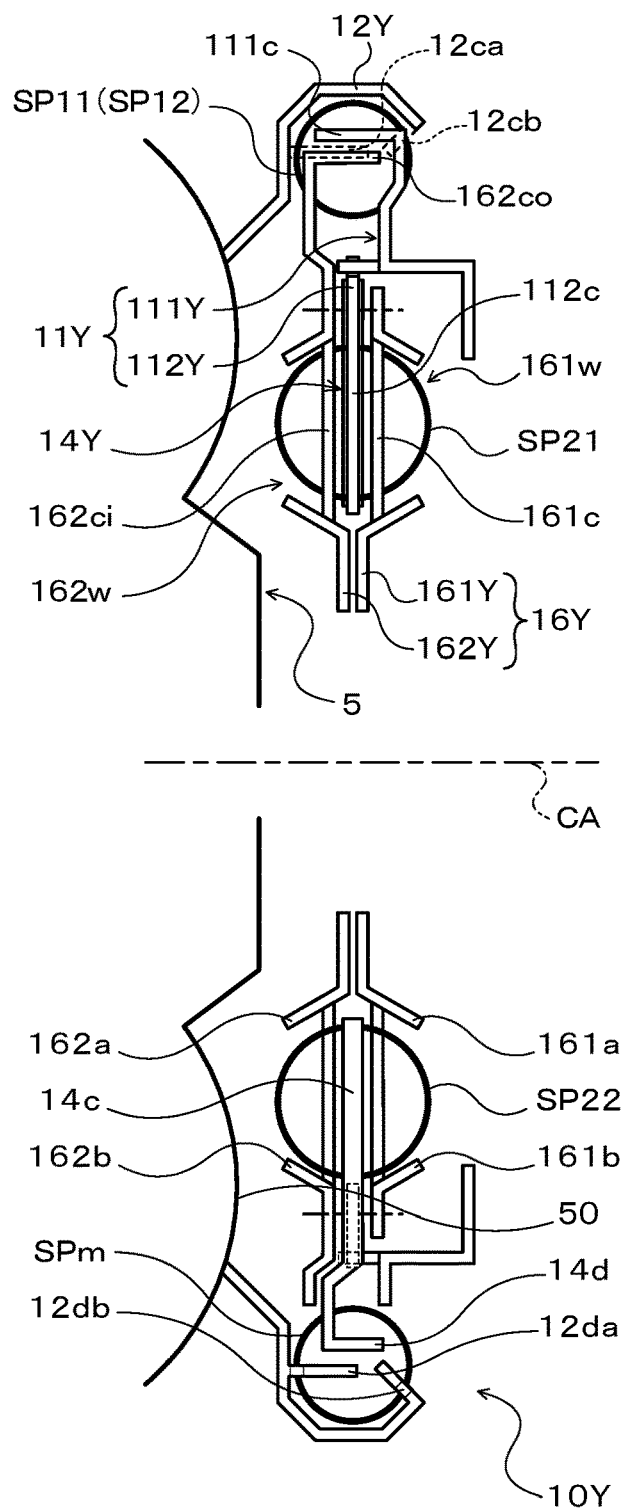
FIG. 19 is a sectional view illustrating still another damper device according to the present disclosure.

FIG. 19 is a sectional view illustrating still another damper device 10Y according to the present disclosure. Constituent elements of the damper device 10Y that are identical to the elements of the damper devices 10 and 10X discussed above are given the same numerals to omit redundant descriptions.

A drive member 11Y of the damper device 10Y illustrated in FIG. 19 includes: a first plate member 111Y (first input member) that has a structure similar to that of the first plate member 111 discussed above; and an annular second plate member (second input member) 112Y coupled so as to rotate together with the first plate member 111Y. The first plate member 111Y has spring abutment portions 111c that abut against the end portions of the first outer springs SP11. Meanwhile, the second plate member 112Y has a plurality of (e.g. three) spring housing windows and a plurality of (e.g. three) spring abutment portions (inner abutment portions) 112c. The plurality of spring abutment portions 112c are provided such that each spring abutment portion 112c is interposed between the spring housing windows which are adjacent to each other along the circumferential direction. The first and second plate members 111Y and 112Y are coupled to each other via fitting portions configured similarly to those of the first plate member 111X and the second plate member 112X discussed above.

A first intermediate member 12Y of the damper device 10Y is fixed (coupled) to the turbine runner 5, and supports the plurality of first outer springs SP11, second outer springs SP12, and intermediate springs SPm so as to be arranged side by side along the circumferential direction. In addition, the first intermediate member 12Y has: a plurality of (e.g. two at intervals of 180°) spring abutment portions 12ca disposed at intervals in the circumferential direction; and a plurality of (e.g. two at intervals of 180°) spring abutment portions 12cb disposed at intervals in the circumferential direction. The spring abutment portions 12ca each extend in the axial direction from a side portion of the first intermediate member 12Y on the turbine runner 5 side toward the lock-up clutch (rightward in FIG. 19). The spring abutment portions 14cb each extend obliquely inward from the peripheral edge portion of the first intermediate member 12Y on the lock-up clutch side so as to face a corresponding one of the spring abutment portions 14ca in the axial direction.

The first intermediate member 12Y further has: a plurality of (e.g. four) second spring abutment portions 12da that extend in the axial direction from locations between the spring abutment portions 12ca which are adjacent to each other in the circumferential direction toward the lock-up piston; and a plurality of (e.g. four) second spring abutment portions 12db that extend obliquely inward from portions of the peripheral edge portion on the lock-up piston side located between the spring abutment portions 12cb which are adjacent to each other in the circumferential direction. The plurality of second spring abutment portions 12da are formed symmetrically with respect to the axis of the first intermediate member 12Y such that two (a pair of) second spring abutment portions 12da are proximate to each other. The two second spring abutment portions 12da which are paired with each other are arranged in the circumferential direction at an interval that matches the natural length of the intermediate springs SPm, for example. Similarly, the plurality of second spring abutment portions 12db are also formed symmetrically with respect to the axis of the first intermediate member 12Y such that two (a pair of) second spring abutment portions 12db are proximate to each other. The two second spring abutment portions 12db which are paired with each other are arranged in the circumferential direction at an interval that matches the natural length of the intermediate springs SPm, for example.

Meanwhile, a second intermediate member 14Y of the damper device 10Y has a natural frequency that is higher than that of the first intermediate member 12Y and a moment of inertia that is smaller than that of the first intermediate member 12Y, and is disposed between first and second output plates 161Y and 162Y that constitute a driven member 16Y in the axial direction. The second intermediate member 14Y has: a plurality of (e.g. three) spring housing windows; a plurality of (e.g. three) spring abutment portions 14c disposed at intervals in the circumferential direction; and a plurality of (e.g. four) second spring abutment portions 14d disposed on the radially outer side with respect to the spring abutment portions 14c. The plurality of spring abutment portions 14c are provided such that each spring abutment portion 14c is interposed between the spring housing windows which are adjacent to each other along the circumferential direction. The plurality of second spring abutment portions 14d are formed symmetrically with respect to the axis of the second intermediate member 14Y such that two (a pair of) second spring abutment portions 14d are proximate to each other. The two second spring abutment portions 14d which are paired with each other are arranged in the circumferential direction at an interval that matches the natural length of the intermediate springs SPm, for example.

The driven member 16Y of the damper device 10Y includes: the first output plate (first output member) 161Y; and the annular second output plate (second output member) 162Y which is disposed in more proximity to the turbine runner 5 than the first output plate 161Y and which is coupled (fixed) to the first output plate 161Y via a plurality of rivets. The first output plate 161Y is constituted as an annular plate-like member, and has: a plurality of (e.g. three) spring housing windows 161w disposed at intervals (equal intervals) in the circumferential direction; a plurality of (e.g. three) spring support portions 161a that extend along the inner peripheral edges of the respective spring housing windows 161w; a plurality of (e.g. three) spring support portions 161b that extend along the outer peripheral edges of the respective spring housing windows 161w; and a plurality of (e.g. three) spring abutment portions 161c. The plurality of spring abutment portions 161c are provided such that each spring abutment portion 161c is interposed between the spring housing windows 161w (spring support portions 161a and 161b) which are adjacent to each other along the circumferential direction.

The second output plate 162Y of the driven member 16Y is constituted as an annular plate-like member, and has: a plurality of (e.g. three) spring housing windows 162w disposed at intervals (equal intervals) in the circumferential direction; a plurality of (e.g. three) spring support portions 162a that extend along the inner peripheral edges of the respective spring housing windows 162w; a plurality of (e.g. three) spring support portions 162b that extend along the outer peripheral edges of the respective spring housing windows 162w; a plurality of (e.g. three) inner spring abutment portions 162ci; and a plurality of (e.g. four) outer spring abutment portions 162co. The plurality of inner spring abutment portions 162ci are provided such that each inner spring abutment portion 162ci is interposed between the spring housing windows 162w (spring support portions 162a and 162b) which are adjacent to each other along the circumferential direction. The plurality of outer spring abutment portions 162co are arranged at intervals in the circumferential direction on the radially outer side with respect to the plurality of inner spring abutment portions 162ci.

The first and second outer springs SP11 and SP12 are supported by the first intermediate member 12Y such that one first outer spring SP II and one second outer spring SP12 are paired (act in series with each other), and such that the first and second outer springs SP11 and SP12 are arranged alternately along the circumferential direction of the first intermediate member 12Y. In addition, with the damper device 10 in the attached state, the spring abutment portions 111c of the first plate member 111Y of the drive member 11Y are each provided between the first and second outer springs SP11 and SP12, which are not paired (do not act in series with each other), so as to abut against the end portions of such first and second outer springs SP11 and SP12 in the circumferential direction. Furthermore, each of the spring abutment portions 12ca and each of the spring abutment portions 12cb of the first intermediate member 12Y are provided between the first and second outer springs SP11 and SP12, which are paired with each other (act in series with each other), so as to abut against the end portions of such first and second outer springs SP11 and SP12 in the circumferential direction. In addition, as with the spring abutment portions 111c of the drive member 11Y, the outer spring abutment portions 162co of the driven member 16Y are each provided between the first and second outer springs SP11 and SP12, which are not paired (do not act in series with each other), so as to abut against the end portions of such first and second outer springs SP11 and SP12 in the circumferential direction.

Meanwhile, the first and second inner springs SP21 and SP22 are supported by the associated spring support portions 161a, 161b, 162a, and 162b of the driven member 16Y, that is, the first and second output plates 161Y and 162Y, such that one first inner spring SP21 and one second inner spring SP22 are paired (act in series with each other) and such that the first and second inner springs SP21 and SP22 are arranged alternately in the circumferential direction (circumferential direction of the second intermediate member 14Y). With the damper device 10Y in the attached state, the spring abutment portions 112c of the second plate member 112Y of the drive member 11Y are each provided between the first and second plate members 111Y and 112Y in the axial direction, and between the first and second inner springs SP21 and SP22, which are not paired (do not act in series with each other), so as to abut against the end portions of such first and second inner springs SP21 and SP22 in the circumferential direction. Furthermore, the spring abutment portions 14c of the second intermediate member 14Y are each provided between the first and second plate members 111Y and 112Y in the axial direction, and between the first and second inner springs SP21 and SP22, which are paired with each other (act in series with each other), so as to abut against the end portions of such first and second inner springs SP21 and SP22 in the circumferential direction. In addition, with the damper device 10Y in the attached state, as with the spring abutment portions 112c of the drive member 11Y, each of the spring abutment portions 161c and each of the inner spring abutment portions 162ci of the driven member 16Y are provided between the first and second inner springs SP21 and SP22, which are not paired (do not act in series with each other), so as to abut against the end portions of such first and second inner springs SP21 and SP22 in the circumferential direction.

The intermediate springs SPm are supported by the first intermediate member 12Y so as to be arranged side by side with the first outer springs SP11 and the second outer springs SP12 along the circumferential direction. With the damper device 10 in the attached state, each intermediate spring SPm is supported from both sides in the circumferential direction by the pair of second spring abutment portions 12da and the pair of second spring abutment portions 12db of the first intermediate member 12Y, and supported from both sides in the circumferential direction by the pair of second spring abutment portions 14d of the second intermediate member 14Y. Consequently, the first intermediate member 12Y and the second intermediate member 14Y are coupled to each other via the plurality of intermediate springs SPm. Spring seats may be disposed between the end portions of the intermediate springs SPm and the second spring abutment portions 12da, 12db, and 14d.

In the damper device 10Y configured as discussed above as well, the average attachment radius ro of the first and second outer springs SP11 and SP12 corresponding to the first intermediate member 12Y, which has a natural frequency that is lower than that of the second intermediate member 14Y, is larger than the average attachment radius ri of the first and second inner springs SP21 and SP22. That is, the axes of the first and second outer springs SP11 and SP12 are positioned on the outer side in the radial direction of the damper device 10Y with respect to the axes of the first and second inner springs SP21 and SP22. In the damper device 10Y, in addition, the first and second outer springs SP11 and SP12 are disposed such that the entire first and second outer springs SP11 and SP12 are positioned on the radially outer side with respect to the first and second inner springs SP21 and SP22. Consequently, it is possible to more increase the moment of inertia $J_{21}$ of the first intermediate member 12Y and to lower the rigidities of the first and second outer springs SP11 and SP12, so that the natural frequency ($f_{21}$) of the first intermediate member 12Y is further lowered. In the damper device 10Y, further, the hystereses of the first and second outer springs SP11 and SP12 on the outer peripheral side can be reduced by the weight reduction of the first and second outer springs SP11 and SP12 due to the low rigidity, and the hystereses of the first and second inner springs SP21 and SP22 on the inner peripheral side can be reduced by lowering a centrifugal force that acts on the first and second inner springs SP21 and SP22. As a result, the vibration damping performance of the damper device 10Y can be improved extremely well by bringing the antiresonance point A described above closer to the frequency of vibration (resonance) to be damped.

In addition, by causing the first intermediate member 12Y to support the first and second outer springs SP11 and SP12, it is possible to reduce the relative speed between the first and second outer springs SP11 and SP12, which are deflected in accordance with the torsional angle of the first intermediate member 12Y with respect to the drive member 11Y or the driven member 16Y, and the second intermediate member 14Y. Thus, a friction force generated between the second intermediate member 14Y and the first and second outer springs SP11 and SP12 can be reduced. Thus, it is possible to further lower the hysteresis of the entire damper device 10Y.

Figure 20:
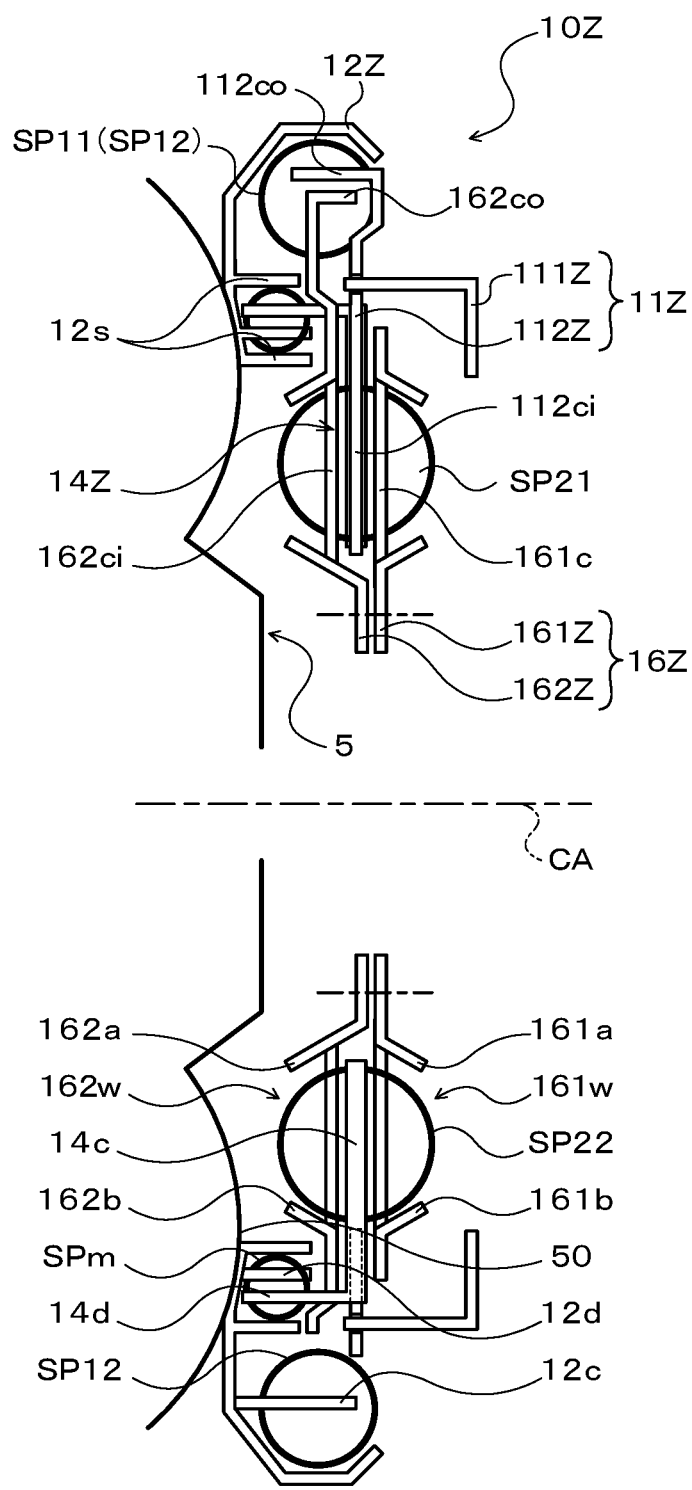
FIG. 20 is a sectional view illustrating another damper device according to the present disclosure.

FIG. 20 is a sectional view illustrating another damper device 10Z according to the present disclosure. Constituent elements of the damper device 10Z that are identical to the elements of the damper devices 10 to 10Y discussed above are given the same numerals to omit redundant descriptions.

A drive member 11Z of the damper device 10Z illustrated in FIG. 20 includes: an annular first plate member 111Z fixed to the lock-up piston of the lock-up clutch; and a second plate member 112Z coupled to the first plate member 111Z via fitting portions. The second plate member 112Z has a plurality of (e.g. three) spring housing windows, a plurality of (e.g. three) inner spring abutment portions 112ci, and a plurality of (e.g. four) outer spring abutment portions 112co. Meanwhile, a second intermediate member 14Z of the damper device 10Z has a natural frequency that is higher than that of a first intermediate member 12Z and a moment of inertia that is smaller than that of the first intermediate member 12Z. A plurality of (e.g. four) second spring abutment portions 14d extend in the axial direction from the outer peripheral portion of the second intermediate member 14Z at intervals in the circumferential direction. A driven member 16Z of the damper device 10Z is basically identical to the driven member 16Y of the damper device 10Y, and includes first and second output plates 161Z and 162Z.

The first intermediate member 12Z of the damper device 10Z has a plurality of (e.g. two at intervals of 180° in the present embodiment) spring abutment portions 12c disposed at intervals in the circumferential direction, is coupled to the turbine runner 5, and supports the plurality of first and second outer springs SP11 and SP12 so as to be arranged side by side along the circumferential direction. In addition, the first intermediate member 12Z is formed with support portions 12s so as to be positioned between the first and second outer springs SP11 and SP12 and the first and second inner springs SP21 and SP22 in the radial direction of the damper device 10Z. Furthermore, the first intermediate member 12Z has a plurality of (e.g. four) second spring abutment portions 12d that extend in the radial direction at intervals in the circumferential direction. The plurality of second spring abutment portions 12d are formed symmetrically with respect to the axis of the second intermediate member 12Z such that two (a pair of) second spring abutment portions 12d are proximate to each other. The two second spring abutment portions 12d which are paired with each other are arranged in the circumferential direction at an interval that matches the natural length of the intermediate springs SPm, for example.

The plurality of intermediate springs SPm are each supported in the radial direction (in the example of FIG. 20, from both sides in the up-down direction of the drawing) by a corresponding one of the support portions 12s of the first intermediate member 12Z. With the damper device 10Z in the attached state, in addition, each intermediate spring SPm is supported from both sides in the circumferential direction by a corresponding one of the pairs of second spring abutment portions 12d of the first intermediate member 12Z, and supported from both sides in the circumferential direction by a corresponding one of the pairs of second spring abutment portions 14d of the second intermediate member 14Z. Consequently, the first intermediate member 12Z which rotates together with the turbine runner 5 and the second intermediate member 14Z are coupled to each other via the plurality of intermediate springs SPm. The intermediate springs SPm are disposed between the first and second outer springs SP11 and SP12 and the first and second inner springs SP21 and SP22 in the radial direction of the damper device 10Z. In the damper device 10Z, in addition, the intermediate springs SPm partially overlap at least one of the first and second outer springs SP11 and SP12 and at least one of the first and second inner springs SP21 and SP22 in the axial direction as seen in the radial direction of the damper device 10Z. Spring seats may be disposed between the end portions of the intermediate springs SPm and the second spring abutment portions 12d and 14d.

In the damper device 10Z configured as discussed above as well, the average attachment radius ro of the first and second outer springs SP11 and SP12 corresponding to the first intermediate member 12Z, which has a natural frequency that is lower than that of the second intermediate member 14Z, is larger than the average attachment radius ri of the first and second inner springs SP21 and SP22. That is, the axes of the first and second outer springs SP11 and SP12 are positioned on the outer side in the radial direction of the damper device 10Z with respect to the axes of the first and second inner springs SP21 and SP22. In the damper device 10Z, in addition, the first and second outer springs SP11 and SP12 are disposed such that the entire first and second outer springs SP11 and SP12 are positioned on the radially outer side with respect to the first and second inner springs SP21 and SP22. Consequently, it is possible to increase the moment of inertia $J_{21}$ of the first intermediate member 12Z and to lower the rigidities of the first and second outer springs SP11 and SP12, so that the natural frequency ($f_{21}$) of the first intermediate member 12Z is further lowered. With the damper device 10Z, in addition, the hystereses of the first and second outer springs SP11 and SP12 on the outer peripheral side can be reduced by the weight reduction of the first and second outer springs SP11 and SP12 due to the low rigidity, and the hystereses of the first and second inner springs SP21 and SP22 on the inner peripheral side can be reduced by lowering a centrifugal force that acts on the first and second inner springs SP21 and SP22. As a result, the vibration damping performance of the damper device 10Z can be improved extremely well by bringing the antiresonance point A described above closer to the frequency of vibration (resonance) to be damped.

In addition, by causing the first intermediate member 12Z to support the first and second outer springs SP11 and SP12, it is possible to reduce the relative speed between the first and second outer springs SP11 and SP12, which are deflected in accordance with the torsional angle of the first intermediate member 12Z with respect to the drive member 11Z or the driven member 16Z, and the first intermediate member 12Z. Thus, a friction force generated between the first intermediate member 12Z and the first and second outer springs SP11 and SP12 can be reduced. Thus, it is possible to lower the hysteresis of the entire damper device 10Z. In the damper device 10Z, the intermediate springs SPm may be supported in the radial direction by the turbine runner 5.

In this case, the turbine runner 5 may be provided with a plurality of second spring abutment portions that support the intermediate springs SPm from both sides in the circumferential direction.

FIG. 21 is a sectional view illustrating still another damper device 10V according to the present disclosure. Constituent elements of the damper device 10V that are identical to the elements of the damper devices 10 to 10Z discussed above are given the same numerals to omit redundant descriptions.

The damper device 10V illustrated in FIG. 21 includes: a plurality of first springs (first elastic bodies) SP1 disposed between a drive member 11V and a first intermediate member 12V to transfer rotational torque; a plurality of second springs (second elastic bodies) SP2 disposed between the first intermediate member 12V and a driven member 16V to transfer rotational torque; a plurality of third springs (third elastic bodies) SP3 disposed between the drive member 11V and a second intermediate member 14V to transfer rotational torque; a plurality of fourth springs (fourth elastic bodies) SP4 disposed between the second intermediate member 14V and the driven member 16V to transfer rotational torque; and a plurality of intermediate springs (fifth elastic bodies) SPm disposed between the first intermediate member 12V and the second intermediate member 14V to transfer rotational torque.

In addition, in the damper device 10V, the rigidity, that is, the spring constant, of the first springs SP1 is defined as "$k_{10}$", the rigidity, that is, the spring constant, of the second springs SP2 is defined as "$k_{20}$", the rigidity, that is, the spring constant, of the third springs SP3 is defined as "$k_{30}$", and the rigidity, that is, the spring constant, of the fourth springs SP4 is defined as "$k_{40}$", and then, the spring constants $k_{10}$, $k_{20}$, $k_{30}$, and $k_{40}$ are selected such that the relations $k_{10} \neq k_{30}$ and $k_{10}/k_{30} \neq k_{20}/k_{40}$ are met. More particularly, the spring constants $k_{10}$, $k_{20}$, $k_{30}$, and $k_{40}$ meet the relations $k_{10}/k_{30} < k_{20}/k_{40}$ and $k_{10} < k_{20} < k_{40} < k_{30}$. That is, the smaller one ($k_{10}$) of the spring constants $k_{10}$ and $k_{20}$ of the first and second springs SP1 and SP2 is smaller than the smaller one ($k_{40}$) of the spring constants $k_{30}$ and $k_{40}$ of the third and fourth springs SP3 and SP4. When the rigidity, that is, the spring constant, of the intermediate springs SPm is defined as "$k_m$", further, the spring constants $k_{10}$, $k_{20}$, $k_{30}$, $k_{40}$, and $k_m$ meet the relation $k_{10} < k_m < k_{20} < k_{40} < k_{30}$.

The drive member 11V of the damper device 10V illustrated in FIG. 21 is coupled so as to rotate together with a lock-up piston of a single-plate lock-up clutch or a clutch drum of a multi-plate lock-up clutch, and has a plurality of first spring abutment portions 111c and a plurality of second spring abutment portions 112c. The outer peripheral portion of the drive member 11V is engaged with the lock-up piston or the clutch drum. In the damper device 10V, in addition, the plurality of first spring abutment portions 111c extend in the axial direction of the damper device 10V from the outer peripheral portion of the drive member 11V toward the turbine runner 5, and extend inward in the radial direction of the damper device 10V. Furthermore, the plurality of second spring abutment portions 112c extend inward in the radial direction of the damper device 10V from the outer peripheral portion of the drive member 11V. Consequently, the first and second spring abutment portions 111c and 112c are spaced away from each other in the axial direction of the damper device 10V.

The first intermediate member 12V of the damper device 10V includes: a first plate member 121V disposed in proximity to the turbine runner 5; a second plate member 122V disposed on the front cover (not illustrated) side, that is, the engine side (right side in the drawing), with respect to the first plate member 121V; and a third plate member 123V disposed on the front cover side with respect to the second plate member 122V. The first to third plate members 121V, 122V, and 123V are formed in an annular shape, and coupled to each other via a plurality of rivets.

The first plate member 121V has: a plurality of spring housing windows 121w that extend arcuately and that are disposed at intervals (at equal intervals) in the circumferential direction; a plurality of spring support portions 1211 that extend along the inner peripheral edges of the respective spring housing windows 121w and that are arranged at intervals (equal intervals) in the circumferential direction; a plurality of spring support portions 1212 that extend along the outer peripheral edges of the respective spring housing windows 121w and that are arranged at intervals (equal intervals) in the circumferential direction to face the respective spring support portions 1211 in the radial direction of the first plate member 121V; a plurality of inner spring abutment portions 121ci; an annular spring support portion 1213 formed on the radially outer side with respect to the plurality of spring support portions 1212; and a plurality of outer spring abutment portions 121co formed on the radially outer side with respect to the plurality of spring support portions 1212.

The plurality of inner spring abutment portions 121ci of the first plate member 121V are provided such that each inner spring abutment portion 121ci is interposed between the spring housing windows 121w (spring support portions 1211 and 1212) which are adjacent to each other along the circumferential direction. In addition, the annular spring support portion 1213 is formed so as to support (guide) the outer peripheral portions of the plurality of first springs SP1, the side portions (left side portions in FIG. 21) of the plurality of first springs SP1 on the turbine runner 5 side (transmission side), the inner peripheral side of such side portions, and the outer peripheral side (shoulder portions) of the front-cover-side side portions of the plurality of first springs SP1. Furthermore, the plurality of outer spring abutment portions 121co are formed at intervals in the circumferential direction so as to project into the annular spring support portion 1213.

The second plate member 122V has: a plurality of spring housing windows 122w that extend arcuately and that are disposed at intervals (at equal intervals) in the circumferential direction; a plurality of spring support portions 1221 that extend along the inner peripheral edges of the respective spring housing windows 122w and that are arranged at intervals (equal intervals) in the circumferential direction; a plurality of spring support portions 1222 that extend along the outer peripheral edges of the respective spring housing windows 122w and that are arranged at intervals (equal intervals) in the circumferential direction to face the respective spring support portions 1221 in the radial direction of the second plate member 121V; a plurality of inner spring abutment portions 122ci; and a plurality of outer spring abutment portions 122co formed on the radially outer side with respect to the plurality of spring support portions 1222. The plurality of inner spring abutment portions 122ci of the second plate member 122V are provided such that each inner spring abutment portion 122ci is interposed between the spring housing windows 122w (spring support portions 1221 and 1222) which are adjacent to each other along the circumferential direction. In addition, the plurality of outer spring abutment portions 122co are formed at intervals in the circumferential direction so as to project in the radial direction of the damper device 10V.

The third plate member 123V has an annular spring support portion 1231 and a plurality of spring abutment portions 123d. The spring support portion 1231 is formed so as to support (guide) the outer peripheral portions of the plurality of intermediate springs SPm, the side portions (left side portions in FIG. 21) of the plurality of intermediate springs SPm on the turbine runner 5 side (transmission side), and the outer peripheral side (shoulder portions) of the front-cover-side side portions of the plurality of intermediate springs SPm. The spring abutment portions 123d are formed symmetrically with respect to the axis of the third plate member 123V such that two (a pair of) spring abutment portions 123d are proximate to each other. The two spring abutment portions 123d which are paired with each other are arranged in the circumferential direction at an interval that matches the natural length of the intermediate springs SPm, for example. As illustrated in FIG. 21, the inner peripheral portion of the third plate member 123V is coupled (fixed) to the first and second plate members 121V and 122V via a plurality of rivets so as to project toward the front cover (not illustrated) (toward the second intermediate member 14V) at locations between the spring support portions 1222 and the outer spring abutment portions 122co in the radial direction.

The second intermediate member 14V of the damper device 10V includes: a first plate member 141V disposed in proximity to the first intermediate member 12V; a second plate member 142V disposed on the front cover side (not illustrated) with respect to the first plate member 141V in the axial direction of the damper device 10V; and a third plate member 143V disposed on the first intermediate member 12V side with respect to the first plate member 141V. The first to third plate members 141V, 142V, and 143V are formed in an annular shape, and coupled to each other via a plurality of rivets. As illustrated in the drawing, the first plate member 141V has a plurality of inner spring housing windows 141wi, a plurality of outer spring housing windows 141wo, a plurality of spring support portions 1411, 1412, and 1414, a plurality of inner spring abutment portions 141ci, and a plurality of outer spring abutment portions 141co.

The plurality of inner spring housing windows 141wi extend arcuately, and are disposed at intervals (equal intervals) in the circumferential direction in the inner peripheral portion of the first plate member 141V. The plurality of spring support portions 1411 extend along the inner peripheral edges of the respective inner spring housing windows 141wi, and are arranged at intervals (equal intervals) in the circumferential direction. The plurality of spring support portions 1412 extend along the outer peripheral edges of the respective inner spring housing windows 141wi, and are arranged at intervals (equal intervals) in the circumferential direction to face the respective spring support portions 1411 in the radial direction of the first plate member 141V. In addition, the inner spring abutment portions 141ci are provided such that each inner spring abutment portion 141ci is interposed between the inner spring housing windows 141wi (spring support portions 1411 and 1412) which are adjacent to each other along the circumferential direction. The plurality of outer spring housing windows 141wo extend arcuately, and are disposed at intervals in the circumferential direction in the outer peripheral portion of the first plate member 141V so as to be positioned on the radially outer side with respect to the inner spring housing windows 141wi. The plurality of spring support portions 1414 extend along the outer peripheral edges of the respective outer spring housing windows 141wo, and are arranged at intervals (equal intervals) in the circumferential direction. In addition, the outer spring abutment portions 141co are provided such that each outer spring abutment portion 141co is interposed between the outer spring housing windows 141wo (spring support portions 1414) which are adjacent to each other along the circumferential direction.

The second plate member 142V has a plurality of inner spring housing windows 142wi, a plurality of outer spring housing windows 142wo, a plurality of spring support portions 1421, 1422, 1423, and 1424, a plurality of inner spring abutment portions 142ci, and a plurality of outer spring abutment portions 142co. The plurality of inner spring housing windows 142wi extend arcuately, and are disposed at intervals (equal intervals) in the circumferential direction in the inner peripheral portion of the second plate member 142V. The plurality of spring support portions 1421 extend along the inner peripheral edges of the respective inner spring housing windows 142wi, and are arranged at intervals (equal intervals) in the circumferential direction. The plurality of spring support portions 1422 extend along the outer peripheral edges of the respective inner spring housing windows 142wi, and are arranged at intervals (equal intervals) in the circumferential direction to face the respective spring support portions 1421 in the radial direction of the second plate member 142V. In addition, the inner spring abutment portions 142ci are provided such that each inner spring abutment portion 142ci is interposed between the inner spring housing windows 142wi (spring support portions 1421 and 1422) which are adjacent to each other along the circumferential direction.

The plurality of outer spring housing windows 142wo extend arcuately, and are disposed at intervals in the circumferential direction in the outer peripheral portion of the second plate member 142V so as to be positioned on the radially outer side with respect to the inner spring housing windows 142wi. The plurality of spring support portions 1423 extend along the inner peripheral edges of the respective outer spring housing windows 142wo, and are arranged at intervals (equal intervals) in the circumferential direction. The plurality of spring support portions 1424 extend along the outer peripheral edges of the respective outer spring housing windows 142wo, and are arranged at intervals (equal intervals) in the circumferential direction to face the respective spring support portions 1423 in the radial direction of the second plate member 142V. In addition, the outer spring abutment portions 142co are provided such that each outer spring abutment portion 142co is interposed between the outer spring housing windows 142wo (spring support portions 1423 and 1424) which are adjacent to each other along the circumferential direction.

The third plate member 143V has a plurality of spring abutment portions 143d. The spring abutment portions 143d are formed symmetrically with respect to the axis of the third plate member 143V such that two (a pair of) spring abutment portions 143d are proximate to each other. The two spring abutment portions 143d which are paired with each other are arranged in the circumferential direction at an interval that matches the natural length of the intermediate springs SPm, for example. As illustrated in FIG. 21, the inner peripheral portion of the third plate member 143V is coupled (fixed) to the first and second plate members 141V and 142V via a plurality of rivets so as to project toward the first intermediate member 12V at locations between the spring support portions 1412 and the outer spring abutment portions 141co in the radial direction.

The inner peripheral portion of the driven member 16V of the damper device 10V is fixed to a damper hub (not illustrated) together with the turbine runner 5 via rivets. As illustrated in the drawing, the driven member 16V has a plurality of first spring abutment portions 161c and a plurality of second spring abutment portions 162c. In the damper device 10V, the plurality of first spring abutment portions 161c extend in the axial direction of the damper device 10V from the inner peripheral portion of the driven member 16V toward the turbine runner 5, and extend outward in the radial direction of the damper device 10V. In addition, the plurality of second spring abutment portions 162c extend outward in the radial direction of the damper device 10V from the inner peripheral portion of the driven member 16V. Consequently, the first and second spring abutment portions 161c and 162c are also spaced away from each other in the axial direction of the damper device 10V.

As illustrated in FIG. 21, the first and second plate members 121V and 122V of the first intermediate member 12V are coupled such that the spring support portions 1211 and 1221, respectively, face each other and the spring support portions 1212 and 1222, respectively, face each other. In addition, the spring support portion 1213 of the first plate member 121V of the first intermediate member 12V supports the plurality of first springs SP1 so as to be arranged at intervals in the circumferential direction. Furthermore, the spring support portions 1211 and 1212 of the first plate member 121V and the spring support portions 1221 and 1222 of the second plate member 122V support (guide) the associated second springs SP2. That is, the plurality of second springs SP2 are supported by the first and second plate members 121V and 122V so as to be arranged at intervals in the circumferential direction on the radially inner side with respect to the plurality of first springs SP1. Furthermore, the first spring abutment portions 111c of the drive member 11V are inserted from the radially outer side, and the first spring abutment portions 161c of the driven member 16V are inserted from the radially inner side, into a space between the first and second plate members 121V and 122V in the axial direction.

With the damper device 10V in the attached state, the first spring abutment portions 111c of the drive member 11V are each provided between the first springs SP1 which are adjacent to each other so as to abut against the end portions of such first springs SP1 in the circumferential direction. Meanwhile, with the damper device 10V in the attached state, the outer spring abutment portions 121co and 122co of the first intermediate member 12V each abut against the end portions, in the circumferential direction, of the first springs SP1, which are adjacent to each other. The end portions of the first springs SP1 are those that do not abut against the spring abutment portions 111c of the drive member 11V. Furthermore, with the damper device 10V in the attached state, the inner spring abutment portions 121ci and 122ci of the first intermediate member 12V are each provided between the second springs SP2 which are adjacent to each other so as to abut against the end portions of such second springs SP2 in the circumferential direction. Meanwhile, with the damper device 10V in the attached state, the first spring abutment portions 161c of the driven member 16V each abut against the end portions, in the circumferential direction, of the second springs SP2, which are adjacent to each other. The end portions of the second springs SP2 are those that do not abut against the inner spring abutment portions 121ci and 122ci of the first intermediate member 12V. Consequently, the drive member 11V and the first intermediate member 12V are coupled to each other via the plurality of first springs SP11 which act in parallel with each other, and the first intermediate member 12V and the driven member 16V are coupled to each other via the plurality of second springs SP2 which act in parallel with each other. Thus, the drive member 11V and the driven member 16V are coupled to each other via the plurality of first springs SP1, the first intermediate member 12V, and the plurality of second springs SP2.

As illustrated in FIG. 21, the first and second plate members 141V and 142V of the second intermediate member 14V are coupled such that the spring support portions 1411 to 1414 face the associated spring abutment portions 1421 to 1424. In the damper device 10V, in addition, the second intermediate member 14V is positioned on the front cover (not illustrated) side with respect to the first intermediate member 12V away from the first intermediate member 12V in the axial direction, and disposed such that the outermost peripheral portion of the second intermediate member 14V is positioned on the radially inner side with respect to the outermost peripheral portion of the first intermediate member 12V. Consequently, it is possible to make the natural frequency ($f_{21}$) of the first intermediate member 12V lower than the natural frequency ($f_{22}$) of the second intermediate member 14V by making the moment of inertia of the first intermediate member 12V larger than the moment of inertia of the second intermediate member 14V.

Furthermore, the spring support portions 1411 and 1412 of the first plate member 141V and the spring support portions 1421 and 1422 of the second plate member 142V support (guide) the associated third springs SP3. That is, the plurality of third springs SP3 are supported by the first and second plate members 141V and 142V so as to be arranged at intervals in the circumferential direction. The spring support portions 1414 of the first plate member 141V and the spring support portions 1423 and 1424 of the second plate member 142V support (guide) the associated fourth springs SP4. That is, the plurality of fourth springs SP4 are supported by the first and second plate members 141V and 142V so as to be arranged at intervals in the circumferential direction on the radially inner side with respect to the plurality of third springs SP3. The second spring abutment portions 112c of the drive member 11V are inserted from the radially outer side, and the second spring abutment portions 162c of the driven member 16V are inserted from the radially inner side, into a space between the first and second plate members 141V and 142V in the axial direction.

With the damper device 10V in the attached state, the second spring abutment portions 112c of the drive member 11V are each provided between the third springs SP3 which are adjacent to each other so as to abut against the end portions of such third springs SP3 in the circumferential direction. Meanwhile, with the damper device 10V in the attached state, the outer spring abutment portions 141co and 142co of the second intermediate member 14V each abut against the end portions, in the circumferential direction, of the third springs SP3, which are adjacent to each other. The end portions of the third springs SP3 are those that do not abut against the spring abutment portions 112c of the drive member 11V. Furthermore, with the damper device 10V in the attached state, the inner spring abutment portions 141ci and 142ci of the second intermediate member 14V are each provided between the fourth springs SP4 which are adjacent to each other so as to abut against the end portions of such fourth springs SP4 in the circumferential direction. Meanwhile, with the damper device 10V in the attached state, the second spring abutment portions 162c of the driven member 16V each abut against the end portions, in the circumferential direction, of the fourth springs SP4, which are adjacent to each other. The end portions of the fourth springs SP3 are those that do not abut against the inner spring abutment portions 141ci and 142ci of the second intermediate member 14V. Consequently, the drive member 11V and the second intermediate member 14V are coupled to each other via the plurality of third springs SP3 which act in parallel with each other, and the second intermediate member 14V and the driven member 16V are coupled to each other via the plurality of fourth springs SP4 which act in parallel with each other. Thus, the drive member 11V and the driven member 16V are coupled to each other via the plurality of third springs SP3, the second intermediate member 14V, and the plurality of fourth springs SP4.

Meanwhile, the intermediate springs SPm are supported by the spring support portion 1231 of the third plate member 123V of the first intermediate member 12V, and partially overlap the first springs SP1 and the third springs SP3 in the radial direction as seen in the axial direction at locations between the first and second springs SP1 and SP2 and the third and fourth springs SP3 and SP4 in the axial direction. Furthermore, with the damper device 10V in the attached state, the spring abutment portions 123d of each pair in the third plate member 123V included in the first intermediate member 12V abut against the respective end portions of the intermediate spring SPm in the circumferential direction. In addition, the spring abutment portions 143d of each pair in the third plate member 143V included in the second intermediate member 14V also abut against the respective end portions of the intermediate spring SPm in the circumferential direction. Consequently, with the damper device 10V in the attached state, each intermediate spring SPm is supported from both sides in the circumferential direction by the pair of spring abutment portions 123d of the first intermediate member 12V, that is, the third plate member 123V, and supported from both sides in the circumferential direction by the pair of spring abutment portions 143d of the second intermediate member 14V, that is, the third plate member 143V. Thus, the first intermediate member 12V and the second intermediate member 14V are coupled to each other via the plurality of intermediate springs SPm. Spring seats may be disposed between the end portions of the intermediate springs SPm and the spring abutment portions 123d and 143d.

In the damper device 10V discussed above, an attachment radius $r_{SP1}$ of the first springs SP1 is determined to be larger than attachment radii $r_{SP2}$, $r_{SP3}$, and $r_{SP4}$ of the second, third, and fourth springs SP2, SP3, and SP4. In addition, the attachment radius $r_{SP3}$ of the third springs SP3 is determined to be larger than the attachment radii $r_{SP2}$ and $r_{SP4}$ of the second and fourth springs SP2 and SP4. Furthermore, the attachment radius $r_{SP3}$ of the second springs SP2 is determined to be larger than the attachment radius $r_{SP4}$ of the fourth springs SP4. The average attachment radius of the first and second springs SP1 and SP2 corresponding to the first intermediate member 12V, which has a natural frequency that is lower than that of the second intermediate member 14V, is larger than the average attachment radius of the first and second springs SP3 and SP4. That is, the axis of the first springs SP1 which have the smallest spring constant (rigidity), of the first to fourth springs SP11 to SP4, is positioned on the outer side, in the radial direction of the damper device 10V, with respect to the axes of the third and fourth springs SP3 and SP4 (and the second springs SP2). In the damper device 10V, in addition, the first springs SP1 are disposed on the radially outer side of the third and fourth springs SP3 and SP4 (and the second springs SP2) so as to partially overlap the third springs SP3 in the radial direction as seen in the axial direction.

As a result, with the damper device 10V as well, it is possible to increase the moment of inertia $J_{21}$ of the first intermediate member 12V and to lower the rigidity of the first springs SP1 on the outer peripheral side, so that the natural frequency ($f_{21}$) of the first intermediate member 12V is further lowered. With the damper device 10V, in addition, the hystereses of the first and third springs SP1 and SP3 on the outer peripheral side can be reduced by the weight reduction of the first and third springs SP1 and SP3 due to the low rigidity, and the hystereses of the second and fourth springs SP2 and SP4 on the inner peripheral side can be reduced by lowering a centrifugal force that acts on the second and fourth springs SP2 and SP4. As a result, the vibration damping performance of the damper device 10V can also be improved extremely well by bringing the anti-resonance point A described above closer to the frequency of vibration (resonance) to be damped.

Furthermore, the first springs SP1 are disposed on the outer side of the second springs SP2 in the radial direction of the damper device 10V, the third and fourth springs SP3 and SP4 are disposed away from the first and second springs SP1 and SP2 in the axial direction of the damper device 10V, and the third springs SP3 are disposed on the outer side of the fourth spring SP4 in the radial direction. Consequently, it is possible to enhance the degree of freedom in setting of the first to fourth springs SP1 to SP4 such as the spring constant (rigidity), the number of the first to fourth springs SP1 to SP4 to be disposed, and the torsional angle (stroke). In the damper device 10V, in addition, the axis of the first springs SP1 and the axis of the second springs SP2 are included in a first plane that is orthogonal to the center axis CA. In addition, the axis of the third springs SP3 and the axis of the fourth springs SP4 are included in a second plane that is orthogonal to the center axis CA and that is located away from the first plane described above in the axial direction of the damper device 10V. Consequently, it is possible to suppress an increase in axial length of the damper device 10V. Furthermore, the degree of freedom in setting of the intermediate springs SPm such as the rigidity, the number of the intermediate springs SPm to be disposed, and the torsional angle (stroke) by disposing the intermediate springs SPm between the first and second springs SP1 and SP2 and the third and fourth springs SP3 and SP4 in the axial direction. The axes of the first and second springs SP1 and SP2 may not be included in the first plane described above which is orthogonal to the center axis CA. The axes of the third and fourth springs SP3 and SP4 may not be included in the second plane described above which is orthogonal to the center axis CA. In the damper device 10V, further, the turbine runner 5 may be coupled to the first intermediate member 12V, for example.

FIG. 22 is a sectional view illustrating another damper device 10W according to the present disclosure. Constituent elements of the damper device 10W that are identical to the elements of the damper devices 10 to 10V discussed above are given the same numerals to omit redundant descriptions.

A drive member 11W of the damper device 10W illustrated in FIG. 22 is coupled so as to rotate together with a lock-up piston of a single-plate lock-up clutch or a clutch drum of a multi-plate lock-up clutch, and includes a first plate member 111W and a second plate member 112W formed in an annular shape. The first plate member 111W has a plurality of spring abutment portions 111c formed at intervals in the circumferential direction so as to extend in the radial direction of the damper device 10W. The outer peripheral portion of the first plate member 111W is engaged with the lock-up piston or the clutch drum. The second plate member 112W has a plurality of spring abutment portions 112c formed at intervals in the circumferential direction so as to extend in the radial direction of the damper device 10W, and is coupled so as to rotate together with the first plate member 111W. When the first and second plate members 111W and 112W are coupled to each other, the plurality of spring abutment portions 111c and the plurality of spring abutment portions 112c are spaced away from each other in the axial direction and the radial direction of the damper device 10W.

The first intermediate member 12W of the damper device 10W includes: a first plate member 121W disposed in proximity to the turbine runner (not illustrated); a second plate member 122W disposed on the front cover (not illustrated) side, that is, the engine side (right side in the drawing), with respect to the first plate member 121W; and a third plate member 123W disposed on the front cover side with respect to the second plate member 122W. The first to third plate members 121W, 122W, and 123W are formed in an annular shape, and coupled to each other via a plurality of rivets.

The first plate member 121W has a plurality of inner spring housing windows 121wi, a plurality of outer spring housing windows 121wo, a plurality of spring support portions 1211, 1212, 1213, and 1214, a plurality of inner spring abutment portions 121ci, and a plurality of outer spring abutment portions 121co. The plurality of inner spring housing windows 121wi extend arcuately, and are disposed at intervals (equal intervals) in the circumferential direction in the inner peripheral portion of the first plate member 121W. The plurality of spring support portions 1211 extend along the inner peripheral edges of the respective inner spring housing windows 121wi, and are arranged at intervals (equal intervals) in the circumferential direction. The plurality of spring support portions 1212 extend along the outer peripheral edges of the respective inner spring housing windows 121wi, and are arranged at intervals (equal intervals) in the circumferential direction to face the respective spring support portions 1211 in the radial direction of the first plate member 121W. In addition, the inner spring abutment portions 121ci are provided such that each inner spring abutment portion 121ci is interposed between the inner spring housing windows 121wi (spring support portions 1211 and 1212) which are adjacent to each other along the circumferential direction.

The plurality of outer spring housing windows 121wo extend arcuately, and are disposed at intervals in the circumferential direction in the outer peripheral portion of the first plate member 121W so as to be positioned on the radially outer side with respect to the inner spring housing windows 121wi. The plurality of spring support portions 1213 extend along the inner peripheral edges of the respective outer spring housing windows 121wo, and are arranged at intervals (equal intervals) in the circumferential direction. The plurality of spring support portions 1214 extend along the outer peripheral edges of the respective outer spring housing windows 121wo, and are arranged at intervals (equal intervals) in the circumferential direction to face the respective spring support portions 1213 in the radial direction of the first plate member 121W. Furthermore, the outer spring abutment portions 121co are provided such that each outer spring abutment portion 121co is interposed between the outer spring housing windows 121wo (spring support portions 1213 and 1214) which are adjacent to each other along the circumferential direction.

The second plate member 122W has a plurality of inner spring housing windows 122wi, a plurality of outer spring housing windows 122wo, a plurality of spring support portions 1221, 1222, 1223, and 1224, a plurality of inner spring abutment portions 122ci, and a plurality of outer spring abutment portions 122co. The plurality of inner spring housing windows 122wi extend arcuately, and are disposed at intervals (equal intervals) in the circumferential direction in the inner peripheral portion of the second plate member 122W. The plurality of spring support portions 1221 extend along the inner peripheral edges of the respective inner spring housing windows 122wi, and are arranged at intervals (equal intervals) in the circumferential direction. The plurality of spring support portions 1222 extend along the outer peripheral edges of the respective inner spring housing windows 122wi, and are arranged at intervals (equal intervals) in the circumferential direction to face the respective spring support portions 1221 in the radial direction of the second plate member 122W. In addition, the inner spring abutment portions 122ci are provided such that each inner spring abutment portion 122ci is interposed between the inner spring housing windows 122wi (spring support portions 1221 and 1222) which are adjacent to each other along the circumferential direction.

The plurality of outer spring housing windows 122wo extend arcuately, and are disposed at intervals in the circumferential direction in the outer peripheral portion of the second plate member 122W so as to be positioned on the radially outer side with respect to the inner spring housing windows 122wi. The plurality of spring support portions 1223 extend along the inner peripheral edges of the respective outer spring housing windows 122wo, and are arranged at intervals (equal intervals) in the circumferential direction. The plurality of spring support portions 1224 extend along the outer peripheral edges of the respective outer spring housing windows 122wo, and are arranged at intervals (equal intervals) in the circumferential direction to face the respective spring support portions 1223 in the radial direction of the second plate member 122W. In addition, the outer spring abutment portions 122co are provided such that each outer spring abutment portion 122co is interposed between the outer spring housing windows 122wo (spring support portions 1223 and 1224) which are adjacent to each other along the circumferential direction.

The third plate member 123W has a plurality of spring abutment portions 123d that extend in the axial direction of the damper device 10W. The spring abutment portions 123d are formed symmetrically with respect to the axis of the third plate member 123W such that two (a pair of) spring abutment portions 123d are proximate to each other. The two spring abutment portions 123d which are paired with each other are arranged in the circumferential direction at an interval that matches the natural length of the intermediate springs SPm, for example. As illustrated in FIG. 22, the end portion of the third plate member 123W on the opposite side of the plurality of spring abutment portions 123d is coupled (fixed) to the first and second plate members 121W and 122W via a plurality of rivets on the radially outer side of the spring support portions 1224. Consequently, the plurality of spring abutment portions 123d project toward the front cover (rightward in the drawing).

A second intermediate member 14W of the damper device 10W has an annular spring support portion 14b, a plurality of inner spring abutment portions 14c, and a plurality of outer spring abutment portions 14d formed on the radially outer side with respect to the inner spring abutment portions 14c. The spring support portion 14b is formed so as to support (guide) the outer peripheral portions of the plurality of intermediate springs SPm, the side portions (right side portions in FIG. 22) of the plurality of intermediate springs SPm on the front cover side, and the outer peripheral side (shoulder portions) of the turbine-runner-side side portions of the plurality of intermediate springs SPm. The plurality of inner spring abutment portions 14c are formed at intervals in the circumferential direction so as to project radially inward from the inner peripheral portion of the spring support portion 14b. The outer spring abutment portions 14d are formed symmetrically with respect to the axis of the second intermediate member 14W such that two (a pair of) outer spring abutment portions 14d are proximate to each other. The two outer spring abutment portions 14d which are paired with each other are arranged in the circumferential direction at an interval that matches the natural length of the intermediate springs SPm, for example.

A driven member 16W of the damper device 10W includes a first plate member 161W, a second plate member 162W, and a third plate member 163W formed in an annular shape. The first plate member 161W has a plurality of spring abutment portions 161c formed at intervals in the circumferential direction so as to extend radially outward from the inner peripheral portion. The inner peripheral portion of the first plate member 111W is fixed to the turbine hub (not illustrated) via a plurality of rivets. The second plate member 162W has: a plurality of spring housing windows 162w disposed at intervals (equal intervals) in the circumferential direction; a plurality of spring support portions 1621 that extend along the inner peripheral edges of the respective spring housing windows 162w; a plurality of spring support portions 1622 that extend along the outer peripheral edges of the respective spring housing windows 162w; and a plurality of spring abutment portions 162c. The plurality of spring abutment portions 162c are provided such that each spring abutment portion 162c is interposed between the spring housing windows 162w (spring support portions 1621 and 1622) which are adjacent to each other along the circumferential direction. The second plate member 162W is coupled so as to rotate together with the first plate member 161W. When the first and second plate members 161W and 162W are coupled to each other, the plurality of spring abutment portions 161c and the plurality of spring abutment portions 162c are spaced away from each other in the axial direction and the radial direction of the damper device 10W.

The third plate member 163W has: a plurality of (e.g. three) spring housing windows 163w disposed at intervals (equal intervals) in the circumferential direction; a plurality of spring support portions 1631 that extend along the inner peripheral edges of the respective spring housing windows 163w; a plurality of spring support portions 1632 that extend along the outer peripheral edges of the respective spring housing windows 163w; and a plurality of spring abutment portions 163c. The plurality of spring abutment portions 163c are provided such that each spring abutment portion 163c is interposed between the spring housing windows 163w (spring support portions 1631 and 1632) which are adjacent to each other along the circumferential direction. As illustrated in FIG. 22, the third plate member 163W is coupled (fixed) to the second plate member 162W via a plurality of rivets such that the spring support portions 1631 and 1632 face the associated spring support portions 1621 and 1622 of the second plate member 162W.

As illustrated in FIG. 22, the first and second plate members 121W and 122W of the first intermediate member 12W are coupled such that the associated spring support portions 1211 to 1214 and spring support portions 1221 to 1224 face each other. In addition, the spring support portions 1213 and 1214 of the first plate member 121W and the spring support portions 1223 and 1224 of the second plate member 122W support (guide) the associated first springs SP1. Furthermore, the spring support portions 1211 and 1212 of the first plate member 121W and the spring support portions 1221 and 1222 of the second plate member 122W support (guide) the associated second springs SP2. Consequently, the plurality of first springs SP1 are supported by the first and second plate members 121W and 122W so as to be arranged at intervals in the circumferential direction on the outer peripheral side of the damper device 10W. In addition, the plurality of second springs SP2 are supported by the first and second plate members 121W and 122W so as to be arranged at intervals in the circumferential direction on the radially inner side with respect to the plurality of first springs SP1. Furthermore, the first plate member 111W of the drive member 11W is disposed between the outer spring abutment portions 121co and 122co of the first and second plate members 121W and 122W in the axial direction. In addition, the first plate member 161W of the driven member 16W is disposed between the inner spring abutment portions 121ci and 122ci of the first and second plate members 121W and 122W in the axial direction.

With the damper device 10W in the attached state, the spring abutment portions 111c of the first plate member 111W of the drive member 11W are each provided between the first springs SP1 which are adjacent to each other so as to abut against the end portions of such first springs SP1 in the circumferential direction. Meanwhile, with the damper device 10W in the attached state, the outer spring abutment portions 121co and 122co of the first intermediate member 12W each abut against the end portions, in the circumferential direction, of the first springs SP1, which are adjacent to each other. The end portions of the first springs SP1 are those that do not abut against the spring abutment portions 111c of the drive member 11W. Furthermore, with the damper device 10W in the attached state, the inner spring abutment portions 121ci and 122ci of the first intermediate member 12W are each provided between the second springs SP2 which are adjacent to each other so as to abut against the end portions of such second springs SP2 in the circumferential direction. Meanwhile, with the damper device 10W in the attached state, the spring abutment portions 161c of the first plate member 161W of the driven member 16W each abut against the end portions, in the circumferential direction, of the second springs SP2, which are adjacent to each other The end portions of the second springs SP2 are those that do not abut against the inner spring abutment portions 121ci and 122ci of the first intermediate member 12W. Consequently, the drive member 11W and the first intermediate member 12W are coupled to each other via the plurality of first springs SP1 which act in parallel with each other, and the first intermediate member 12W and the driven member 16W are coupled to each other via the plurality of second springs SP2 which act in parallel with each other. Thus, the drive member 11W and the driven member 16W are coupled to each other via the plurality of first springs SP1, the first intermediate member 12W, and the plurality of second springs SP2.

As illustrated in FIG. 22, the spring abutment portions 112c of the second plate member 112W of the drive member 11W and the inner spring abutment portions 14c of the second intermediate member 14W are disposed between the second and third plate members 162W and 13W of the driven member 16 in the axial direction. In addition, the third and fourth springs SP3 and SP4 are supported by the associated spring support portions 1621, 1622, 1631, and 1632 of the driven member 16W, that is, the first and second plate members 162W and 163W, such that one third spring SP3 and one fourth spring SP4 are paired (act in series with each other) and such that the third and fourth springs SP3 and SP4 are arranged alternately in the circumferential direction (circumferential direction of the second intermediate member 14W). Furthermore, with the damper device 10W in the attached state, the spring abutment portions 112c of the second plate member 112W of the drive member 11W are each provided between the third and fourth springs SP3 and SP4, which are not paired (do not act in series with each other), so as to abut against the end portions of such third and fourth springs SP3 and SP4 in the circumferential direction. In addition, the inner spring abutment portions 14c of the second intermediate member 14W are provided between the first and second plate members 111W and 112W in the axial direction, and are each provided between the third and fourth springs SP3 and SP4, which are paired with each other (act in series with each other), so as to abut against the end portions of such third and fourth springs SP3 and SP4 in the circumferential direction. Furthermore, with the damper device 10W in the attached state, as with the spring abutment portions 112c of the drive member 11W, the spring abutment portions 162c and 163c of the driven member 16W are each provided between the third and fourth springs SP3 and SP4, which are not paired (do not act in series with each other), so as to abut against the end portions of such third and fourth springs SP3 and SP4 in the circumferential direction. Consequently, the drive member 11W and the driven member 16W are coupled to each other via the plurality of third springs SP3, the second intermediate member 14W, and the plurality of fourth springs SP4.

Meanwhile, the intermediate springs SPm are supported by the spring support portion 14b of the second intermediate member 14W, overlap the third and fourth springs SP3 and SP4 in the axial direction as seen in the radial direction on the radially outer side of the third and fourth springs SP3 and SP4, and partially overlap the first springs SP1 in the radial direction as seen in the axial direction. Furthermore, with the damper device 10W in the attached state, the spring abutment portions 123d of each pair in the third plate member 123W included in the first intermediate member 12W abut against the respective end portions of the intermediate spring SPm in the circumferential direction. In addition, the outer spring abutment portions 14d of each pair in the second intermediate member 14W also abut against the respective end portions of the intermediate spring SPm in the circumferential direction. Consequently, with the damper device 10W in the attached state, each intermediate spring SPm is supported from both sides in the circumferential direction by the pair of spring abutment portions 123d of the first intermediate member 12W, that is, the third plate member 123W, and supported from both sides in the circumferential direction by the pair of outer spring abutment portions 14d of the second intermediate member 14W. Thus, the first intermediate member 12W and the second intermediate member 14W are coupled to each other via the plurality of intermediate springs SPm. Spring seats may be disposed between the end portions of the intermediate springs SPm and the spring abutment portions 123d and 14d.

In the damper device 10W discussed above, the moment of inertia of the first intermediate member 12W is determined to be larger than the moment of inertia of the second intermediate member 14W so that the natural frequency ($f_{21}$) of the first intermediate member 12W is lower than the natural frequency ($f_{22}$) of the second intermediate member 14W. In addition, the attachment radius $r_{SP1}$ of the first springs SP1 is determined to be larger than the attachment radii $r_{SP2}$, $r_{SP3}$, and $r_{SP4}$ of the second, third, and fourth springs SP2, SP3, and SP4, and the attachment radii $r_{SP3}$ and $r_{SP4}$ of the third and fourth springs SP3 and SP4 are determined to be the same as each other and larger than the attachment radius $r_{SP2}$, $r_{SP4}$ of the second springs SP2. In the damper device 10W, the average attachment radius of the first and second springs SP1 and SP2 corresponding to the first intermediate member 12W, which has a natural frequency that is lower than that of the second intermediate member 14W, is determined to be equal to or more than the average attachment radius of the first and second springs SP3 and SP4. Consequently, the axis of the first springs SP1 which have the smallest spring constant (rigidity), of the first to fourth springs SP1 to SP4, is positioned on the outer side, in the radial direction of the damper device 10W, with respect to the axes of the third and fourth springs SP3 and SP4 (and the second springs SP2). In the damper device 10W, in addition, the first springs SP1 are disposed on the radially outer side of the third and fourth springs SP3 and SP4 (and the second springs SP2) so as to partially overlap the third and fourth springs SP3 and SP4 in the radial direction as seen in the axial direction.

As a result, with the damper device 10W as well, it is possible to increase the moment of inertia $J_{21}$ of the first intermediate member 12W and to lower the rigidity of the first springs SP1 on the outer peripheral side, so that the natural frequency ($f_{21}$) of the first intermediate member 12W is further lowered. In the damper device 10W, in addition, the hysteresis of the first springs SP1 on the outer peripheral side can be reduced by the weight reduction of the first springs SP1 due to the low rigidity, and the hysteresis of the second springs SP2 on the inner peripheral side can be reduced by lowering a centrifugal force that acts on the second springs SP2. As a result, the vibration damping performance of the damper device 10W can also be improved extremely well by bringing the antiresonance point A described above closer to the frequency of vibration (resonance) to be damped.

Furthermore, the first springs SP1 are disposed on the outer side of the second springs SP2 in the radial direction of the damper device 10W, the third and fourth springs SP3 and SP4 are disposed away from the first and second springs SP1 and SP2 in the axial direction of the damper device 10W, and the third and fourth springs SP3 are disposed on the same circumference. Consequently, it is possible to enhance the degree of freedom in setting of the first and second springs SP1 and SP2, in particular, such as the spring constant (rigidity), the number of the first and second springs SP1 and SP2 to be disposed, and the torsional angle (stroke). In the damper device 10W, in addition, the axis of the first springs SP1 and the axis of the second springs SP2 are included in a first plane that is orthogonal to the center axis CA. In addition, the axis of the third springs SP3 and the axis of the fourth springs SP4 are included in a second plane that is orthogonal to the center axis CA and that is located away from the first plane described above in the axial direction of the damper device 10W. Consequently, it is possible to suppress an increase in axial length of the damper device 10W. Furthermore, by disposing the intermediate springs SPm as discussed above, the degree of freedom in setting of the intermediate springs SPm such as the rigidity, the number of the intermediate springs SPm to be disposed, and the torsional angle (stroke) can be enhanced.

In the damper device 10W, the first springs SP1 and the third springs SP3 may be replaced with each other, and the second springs SP2 and the fourth springs SP4 may be replaced with each other. That is, the first and second springs SP1 and SP2 may be disposed on the same circumference, and the third and fourth springs SP3 and SP4 may be disposed on different circumferences. In addition, the axes of the first and second springs SP1 and SP2 may not be included in the first plane described above which is orthogonal to the center axis CA. The axes of the third and fourth springs SP3 and SP4 may not be included in the second plane described above which is orthogonal to the center axis CA. In the damper device 10W, further, a turbine runner (not illustrated) may be coupled to the first intermediate member 12W, for example.

As has been described above, the present disclosure provides a damper device (10, 10V, 10X, 10Y, 10Z) that has an input element (11, 11V, 11W, 11X, 11Y, 11Z) to which torque from an engine (EG) is transferred and an output element (16, 16V, 16W, 16X, 16Y, 16Z), including: a first intermediate element (12, 12V, 12W, 12X, 12Y, 12Z); a second intermediate element (14, 14V, 14W, 14X, 14Y, 14Z); a first elastic body (SP11, SP1) that transfers torque between the input element (11, 11V, 11W, 11X, 11Y, 11Z) and the first intermediate element (12, 12V, 12W, 12X, 12Y, 12Z); a second elastic body (SP12, SP2) that transfers torque between the first intermediate element (12, 12V, 12W, 12X, 12Y, 12Z) and the output element (16, 16V, 16W, 16X, 16Y, 16Z); a third elastic body (SP21, SP3) that transfers torque between the input element (11, 11V, 11W, 11X, 11Y, 11Z) and the second intermediate element (14, 14V, 14W, 14X, 14Y, 14Z); a fourth elastic body (SP22, SP4) that transfers torque between the second intermediate element (14, 14V, 14W, 14X, 14Y, 14Z) and the output element (16, 16V, 16W, 16X, 16Y, 16Z); and a fifth elastic body (SPm) that transfers torque between the first intermediate element (12, 12V, 12W, 12X, 12Y, 12Z) and the second intermediate element (14, 14V, 14W, 14X, 14Y, 14Z). In the damper device, a natural frequency ($f_{21}$) of the first intermediate element (12, 12V, 12W, 12X, 12Y, 12Z) at a time when torque is transferred from the input element to the output element via all of the first to fifth elastic bodies is lower than a natural frequency ($f_{22}$) of the second intermediate element (14, 14V, 14W, 14X, 14Y, 14Z) at a time when torque is transferred from the input element to the output element via all of the first to fifth elastic bodies, and at least one of the first and second elastic bodies (SP11, SP1, SP12, SP2) is disposed on a radially outer side of the third and fourth elastic bodies (SP21, SP3, SP22, SP4).

In the damper device according to the present disclosure, two natural frequencies can be set for the entire device when deflection of all of the first to fifth elastic bodies is allowed. The studies and the analyses conducted by the inventors revealed that the natural frequency of the damper device which included the first to fifth elastic bodies became lower as the rigidity of the fifth elastic body was lowered, and that variations in equivalent rigidity of the damper device with respect to variations in rigidity of the fifth elastic body were significantly small compared to variations in equivalent rigidity of the damper device with respect to variations in rigidities of the first to fourth elastic bodies. Thus, with the damper device according to the present disclosure, by adjusting the rigidity of the fifth elastic body, it is possible to set the two natural frequencies of the entire damper device easily and appropriately while keeping the equivalent rigidity of the device appropriate and suppressing an increase in weights (moments of inertia) of the first and second intermediate elements. Furthermore, the natural frequency of the first intermediate element can be further reduced by further increasing the moment of inertia of the first intermediate element by disposing at least one of the first and second elastic bodies corresponding to the first intermediate element, which has a natural frequency that is lower than that of the second intermediate element, on the radially outer side of the third and fourth elastic bodies. As a result, the vibration damping performance of the damper device according to the present disclosure can be improved well.

More particularly, in the damper device according to the present disclosure, a first torque transfer path is formed by the first intermediate element and the first and second elastic bodies, and a second torque transfer path is formed by the second intermediate element and the third and fourth elastic bodies, between the input element and the output element. In addition, the damper device according to the present disclosure includes the fifth elastic body in addition to the first to fourth elastic bodies, and torque is transferred between the first intermediate element and the second intermediate element by the fifth elastic body. In such a damper device, two natural frequencies can be set for the entire device when deflection of all of the first to fifth elastic bodies is allowed. In the case where two natural frequencies are set for the entire device in this way, once resonance at the lower one of the two natural frequencies is generated in accordance with the frequency of vibration transferred to the input element, the phase of vibration transferred from the second elastic body to the output element and the phase of vibration transferred from the fourth elastic body to the output element are shifted from each other. Therefore, as the rotational speed of the input element is increased after resonance at the lower one of the two natural frequencies is generated, one of vibration transferred from the second elastic body to the output element and vibration transferred from the fourth elastic body to the output element cancels out at least a part of the other of vibration transferred from the second elastic body to the output element and vibration transferred from the fourth elastic body to the output element. It is possible to set the antiresonance point at which the vibration amplitude of the output element becomes zero in theory as the phase of vibration transferred from the second elastic body to the output element and the phase of vibration transferred from the fourth elastic body to the output element is shifted by 180 degrees from each other so that the vibrations cancel out each other.

In addition, the studies and the analyses conducted by the inventors revealed that the natural frequency on the low-rotation side (low-frequency side) and the frequency of the antiresonance point became lower as the rigidity of the fifth elastic body was lowered, and that the difference between the natural frequency on the low-rotation side and the frequency of the antiresonance point became larger as the rigidity of the fifth elastic body was increased. Thus, with the damper device according to the present disclosure, by adjusting the rigidity of the fifth elastic body, the natural frequency on the low-rotation side and the frequency of the antiresonance point can be set appropriately while keeping the equivalent rigidity appropriate in accordance with the maximum torque input to the input element and suppressing an increase in weights (moments of inertia) of the first and second intermediate elements. That is, by reducing the natural frequency on the low-rotation side and the frequency of the antiresonance point by adjusting the rigidity of the fifth elastic body, it is possible to set the start point of a rotational speed band (frequency band) in which one of vibration transferred from the second elastic body to the output element and vibration transferred from the fourth elastic body to the output element is used to cancel out at least a part of the other to the lower-rotation side, and to set the rotational speed (frequency) at which the phase of vibration transferred from the second elastic body to the output element and the phase of vibration transferred from the fourth elastic body to the output element are shifted by 180 degrees from each other to the low-rotation side. Additionally, by increasing the difference between the natural frequency on the lower-rotation side and the frequency of the antiresonance point by adjusting the rigidity of the fifth elastic body, the rotational speed band in which one of vibration transferred from the second elastic body to the output element and vibration transferred from the fourth elastic body to the output element is used to cancel out at least a part of the other can also be widened.

Furthermore, it is possible to reduce the natural frequency of the first intermediate element by increasing the moment of inertia of the first intermediate element and lowering the rigidity of at least one of the first and second elastic bodies by disposing at least one of the first and second elastic bodies corresponding to the first intermediate element, which has a natural frequency that is lower than that of the second intermediate element, on the radially outer side of the third and fourth elastic bodies corresponding to the second intermediate element. In the damper device according to the present disclosure, in addition, elastic bodies that have a low rigidity and a relatively light weight are disposed on the outer peripheral side of the damper device, and elastic bodies that have a high rigidity and a relatively heavy weight are disposed on t the center axis side of the damper device. Consequently, it is possible to further reduce the hysteresis of the entire damper device by reducing a friction force generated between the first to fourth elastic bodies and the associated rotary elements because of a centrifugal force. As a result, the vibration damping performance of the damper device according to the present disclosure can be improved well by bringing the frequency of the antiresonance point described above closer to the frequency of vibration (resonance) to be damped by the damper device. It should be noted, however, that resonance of one of the first and second intermediate elements that has the lower natural frequency may be virtual and not generated in a rotational speed range in which the damper device is used.

The first intermediate element (12, 12V, 12W, 12X, 12Y, 12Z) may have an abutment portion (121c, 121co, 122c, 122co, 12ca, 12cb, 12c) that abuts against an end portion of the first elastic body (SP11, SP1) in a circumferential direction and an abutment portion (121c, 121ci, 122c, 122ci, 12ca, 12cb, 12c) that abuts against an end portion of the second elastic body (SP12, SP2) in the circumferential direction; and the second intermediate element (14, 14V, 14W, 14X, 14Y, 14Z) may have an abutment portion (14c, 141co, 142co) that abuts against an end portion of the third elastic body (SP21, SP3) and an abutment portion (14c, 141ci, 142ci) that abuts against an end portion of the fourth elastic body (SP22, SP4).

An axis of at least one of the first and second elastic bodies (SP11, SP1, SP12, SP2) may be positioned on the radially outer side with respect to axes of the third and fourth elastic bodies (SP21, SP3, SP22, SP4). In this case, at least one of the first and second elastic bodies may be disposed so as to be entirely positioned on the radially outer side with respect to the third and fourth elastic bodies, and may be disposed so as to partially overlap the third and fourth elastic bodies in the radial direction as seen in the axial direction.

The first intermediate element (12, 12V, 12W, 12X, 12Y, 12Z) may support an outer peripheral portion of at least one of the first and second elastic bodies (SP11, SP1, SP12, SP2); and the outer peripheral portion of the at least one of the first and second elastic bodies (SP11, SP1, SP12, SP2) may be positioned on the radially outer side with respect to outer peripheral portions of the third and fourth elastic bodies (SP21, SP3, SP22, SP4). In this case as well, at least one of the first and second elastic bodies may be disposed so as to be entirely positioned on the radially outer side of the third and fourth elastic bodies, and may be disposed so as to partially overlap the third and fourth elastic bodies in the radial direction as seen in the axial direction.

The first and second intermediate elements may have an annular portion. Consequently, it is possible to easily increase the moments of inertia of the first and second intermediate elements.

The first and second elastic bodies (SP11, SP12) may be disposed side by side along a circumferential direction. Consequently, it is possible to make the damper device compact in the radial direction.

The third and fourth elastic bodies (SP21, SP22) may be disposed side by side along a circumferential direction. Consequently, it is possible to make the damper device compact in the radial direction.

The first elastic body (SP1) may be disposed on the radially outer side of the second elastic body (SP2), the third and fourth elastic bodies (SP3, SP4) may be disposed away from the first and second elastic bodies (SP1, SP2) in an axial direction of the damper device (10V), and the third elastic body (SP3) may be disposed on the radially outer side of the fourth elastic body (SP4). Consequently, it is possible to enhance the degree of freedom in setting of the first to fourth elastic bodies such as the rigidity, the number of the first to fourth elastic bodies to be disposed, and the torsional angle (stroke).

The fifth elastic body (SPm) may be disposed side by side with the first and second elastic bodies (SP11, SP12) along a circumferential direction.

The fifth elastic body (SPm) may be disposed between the first and second elastic bodies (SP11, SP12) and the third and fourth elastic bodies (SP21, SP22) in a radial direction. Consequently, it is possible to secure the torsional angle (stroke) of the first to fifth elastic bodies well. In this case, the fifth elastic body may be disposed so as to at least partially overlap the first and second elastic bodies and the third and fourth elastic bodies in the axial direction of the damper device as seen in the radial direction of the damper device.

The fifth elastic body (SPm) may be disposed between the first and second elastic bodies (SP1, SP2) and the third and fourth elastic bodies (SP3, SP4) in the axial direction. Consequently, it is possible to enhance the degree of freedom in setting of the fifth elastic body such as the rigidity, the number of the fifth elastic bodies to be disposed, and the torsional angle (stroke).

The input element (11, 11V, 11W, 11X, 11Y, 11Z) may have an abutment portion (111c, 111co, 112co) that abuts against the first elastic body (SP11, SP1) in a circumferential direction and an abutment portion (112c, 113c, 111ci, 112ci) that abuts against the third elastic body (SP21, SP1) in the circumferential direction; the output element (16, 16V, 16W, 16X, 16Y, 16Z) may have an abutment portion (16co, 161c, 161co, 162co) that abuts against the second elastic body (SP12, SP2) in the circumferential direction and an abutment portion (16ci, 161c, 161ci, 162c, 162c, 162ci) that abuts against the fourth elastic body (SP22, SP4) in the circumferential direction; the first intermediate element (12, 12V, 12W, 12X, 12Y, 12Z) may have an abutment portion (121c, 121co, 122c, 122co, 12ca, 12cb, 12c) that abuts against the first elastic body (SP11, SP1) in the circumferential direction, an abutment portion (121c, 121ci, 122c,

122ci, 12ca, 12cb, 12c) that abuts against the second elastic body (SP12, SP2) in the circumferential direction, an abutment portion (122d, 121d, 12da, 12db, 12d, 123d) that abuts against a first end portion of the fifth elastic body (SPm), and an abutment portion (122d, 121d, 12da, 12db, 12d, 123d) that abuts against a second end portion of the fifth elastic body (SPm); and the second intermediate element (14, 14V, 14W, 14X, 14Y, 14Z) may have an abutment portion (14c, 141co, 142co) that abuts against the third elastic body (SP21, SP3) in the circumferential direction, an abutment portion (14c, 141ci, 142ci) that abuts against the fourth elastic body (SP22, SP4) in the circumferential direction, an abutment portion (14d, 143d) that abuts against the first end portion of the fifth elastic body (SPm), and an abutment portion (14d, 143d) that abuts against the second end portion of the fifth elastic body (SPm).

A lower one of a rigidity of the first elastic body (SP11, SP1) and a rigidity of the second elastic body (SP12, SP2) may be lower than a lower one of a rigidity of the third elastic body (SP21, SP3) and a rigidity of the fourth elastic body (SP22, SP4), and one of the first and second elastic bodies (SP11, SP12, SP1) with the lower rigidity may be disposed on the radially outer side of the third and fourth elastic bodies (SP21, SP3, SP22, SP4). Consequently, it is possible to further reduce the natural frequency of the first intermediate element, and to further reduce the hysteresis of the entire damper device.

Rigidities of the first and second elastic bodies (SP11, SP12) may be lower than rigidities of the third and fourth elastic bodies (SP21, SP22), and the first and second elastic bodies (SP11, SP12) may be disposed on the radially outer side of the third and fourth elastic bodies (SP21, SP22).

A moment of inertia ($J_{21}$) of the first intermediate element (12, 12V, 12W, 12X, 12Y, 12Z) may be larger than a moment of inertia ($J_{22}$) of the second intermediate element (14, 14V, 14W, 14X, 14Y, 14Z). Consequently, it is possible to further lower the vibration level around the antiresonance point by further reducing the natural frequency of the first intermediate element.

The first intermediate element (12, 12V, 12W, 12X, 12Y, 12Z) may be coupled so as to rotate together with a turbine runner (5) of a fluid transmission apparatus. Consequently, the substantial moment of inertia of the first intermediate element (the total moment of inertia) can be further increased. Thus, it is possible to further reduce the natural frequency of the first intermediate element.

Torque from the engine (EG) may be transferred to the input element (11, 11V, 11W, 11X, 11Y, 11Z) via a lock-up clutch (8); and a lock-up rotational speed (Nlup) of the lock-up clutch (8) may be higher than a rotational speed corresponding to the natural frequency ($f_{21}$) of the first intermediate element (12, 12V, 12W, 12X, 12Y, 12Z) at the time when torque is transferred from the input element (11, 11V, 11W, 11X, 11Y, 11Z) to the output element (16, 16V, 16W, 16X, 16Y, 16Z) via all of the first to fifth elastic bodies (SP11, SP1, SP12, SP2, SP21, SP3, SP22, SP4, SPm), and lower than a rotational speed corresponding to the natural frequency ($f_{22}$) of the second intermediate element (14, 14V, 14W, 14X, 14Y, 14Z). In this way, with the rotational speed corresponding to the natural frequency of the first intermediate element included in the non-lock-up region of the lock-up clutch, one of vibration transferred from the second elastic body to the output element and vibration transferred from the fourth elastic body to the output element can be used to cancel out at least a part of the other since the time when lock-up is established by the lock-up clutch.

The damper device (10, 10V, 10W, 10X, 10Y, 10Z) may be configured such that deflection of the first to fifth elastic bodies (SP1, SP1, SP12, SP2, SP21, SP3, SP22, SP4, SPm) is not restricted until torque transferred to the input element (11, 11V, 11W, 11X, 11Y, 11Z) becomes equal to or more than a threshold (T1) determined in advance. Consequently, it is possible to improve the vibration damping performance of the damper device well when torque transferred to the input element is relatively small and the rotational speed of the input element is low.

The output element (16, 16V, 16W, 16X, 16Y, 16Z) may be functionally (directly or indirectly) coupled to an input shaft (IS) of a transmission (TM).

The attachment radius ($r_{SP11}$, $r_{SP1}$) of the first elastic body (SP11, SP1) may be the distance from the center axis (CA) of the damper device to the axis of the first elastic body (SP11, SP1); the attachment radius ($r_{SP12}$, $r_{SP2}$) of the second elastic body (SP12, SP2) may be the distance from the center axis (CA) to the axis of the second elastic body (SP12, SP2); the attachment radius ($r_{SP21}$, $r_{SP3}$) of the third elastic body (SP21, SP3) may be the distance from the center axis (CA) to the axis of the third elastic body (SP21, SP3); the attachment radius ($r_{SP2}$, $r_{SP4}$) of the fourth elastic body (SP22, SP4) may be the distance from the center axis (CA) to the axis of the fourth elastic body (SP22, SP4); the average attachment radius (ri) of the first elastic body (SP11, SP1) and the second elastic body (SP12, SP2) may be the average of the attachment radii ($r_{SP11}$, $r_{SP1}$, $r_{SP12}$, $r_{SP2}$) of the first and second elastic bodies (SP11, SP1, SP12, SP2); and the average attachment radius (ro) of the third elastic body and the fourth elastic body (SP21, SP3, SP22, SP4) may be the average of the attachment radii ($r_{SP21}$, $r_{SP3}$, $r_{SP22}$, $r_{SP4}$) of the third and fourth elastic bodies (SP21, SP3, SP22, SP4).

The attachment radius ($r_{SP11}$, $r_{SP1}$, $r_{SP12}$, $r_{SP2}$) of at least one of the first and second elastic bodies (SP11, SP1, SP12, SP2) may be larger than the attachment radius ($r_{SP21}$, $r_{SP3}$, $r_{SP22}$, $r_{SP4}$) of at least one of the third and fourth elastic bodies (SP21, SP3, SP22, SP4). The attachment radii ($r_{SP11}$, $r_{SP12}$) of both the first and second elastic bodies (SP11, SP12) may be larger than the attachment radii ($r_{SP21}$, $r_{SP22}$) of both the third and fourth elastic bodies (SP21, SP22).

The rigidities $k_{11}$, $k_{12}$, $k_{21}$, and $k_{22}$ of the first to fourth elastic bodies (SP11, SP12, SP21, SP22) may be selected so as to meet $k_{11} < k_{12} \le k_{22} \le k_{21}$. In the damper device configured in this way, when deflection of all of the first to fifth elastic bodies is allowed, torque is transferred between the input element and the output element via a third torque transfer path that includes the third elastic body, the second intermediate element, the fifth elastic body, the first intermediate element, and the second elastic body, in addition to the first and second torque transfer paths described above. Consequently, it is possible to further lower the rigidity of the first elastic body by decreasing torque distribution to the first elastic body. Additionally, by selecting the rigidities $k_{11}$, $k_{12}$, $k_{21}$, and $k_{22}$ so as to meet $k_{11} < k_{12} < k_{22} < k_{21}$, not only the rigidity $k_{11}$ of the first elastic body can be further lowered, but also the rigidity $k_{12}$ of the second elastic body can be lowered. Thus, it is possible to further reduce a friction force, that is, a hysteresis, generated between the first and second elastic bodies and the rotary elements by the weight reduction of the first and second elastic bodies due to the low rigidity, and to immediately complete phase inversion of vibration transferred from the second or fourth elastic body to the output element due to resonance of the first intermediate element by further reducing the natural frequency of the first intermediate element. As a result, the vibration damping performance of the damper device can be improved well by favorably reducing a shift to the high-frequency side due to the hysteresis in frequency in which the phase of vibration transferred from the second elastic body to the output element is shifted by 180 degrees with respect to the phase of vibration transferred from the fourth elastic body to the output element.

When the rigidity of the fifth elastic body (SPm) is defined as "$k_m$", the rigidities kit, $k_{12}$, $k_{21}$, $k_{22}$, and $k_m$ of the first to fifth elastic bodies may be selected so as to meet $k_{11} < k_m < k_{12} < k_{22} \leq k_{21}$. Consequently, it is possible to improve the vibration damping performance of the damper device extremely well by appropriately transferring torque from the second intermediate element to the first intermediate element via the fifth elastic body.

The rigidity ($k_m$) of the fifth elastic body (SPm) may be higher than the rigidities ($k_{11}$, $k_{12}$, $k_{21}$, and $k_{22}$) of the first to fourth elastic bodies (SP11, SP12, SP21, SP22). That is, the difference between the natural frequency on the low-rotation side and the frequency of the antiresonance point is larger as the rigidity of the fifth elastic body is higher as discussed above. Thus, by making the rigidity of the fifth elastic body higher than the rigidities of the first to fourth elastic bodies, it is possible to further widen the rotational speed band in which one of vibration transferred from the second elastic body to the output element and vibration transferred from the fourth elastic body to the output element is used to cancel out at least a part of the other, that is, a range in which the vibration level of the output element may be lowered well, by increasing the difference between the natural frequency of the first intermediate element and the frequency of the antiresonance point.

The rigidity ($k_m$) of the fifth elastic body (SPm) may be lower than the rigidities ($k_{11}$, $k_{12}$, $k_{21}$, and $k_{22}$) of the first to fourth elastic bodies (SP11, SP12, SP21, SP22). That is, the natural frequency on the low-rotation side (low-frequency side) and the frequency of the antiresonance point are lower as the rigidity of the fifth elastic body is lower as discussed above. Thus, by making the rigidity of the fifth elastic body lower than the rigidities of the first to fourth elastic bodies, it is possible to set the start point of a rotational speed band (frequency band) in which one of vibration transferred from the second elastic body to the output element and vibration transferred from the fourth elastic body to the output element is used to cancel out at least a part of the other on the lower-rotation side by reducing the natural frequency of the first intermediate element and the frequency of the antiresonance point, and to set the rotational speed (frequency) at which the phase of vibration transferred from the second elastic body to the output element and the phase of vibration transferred from the fourth elastic body to the output element are shifted by 180 degrees from each other to the low-rotation side.

The input element (11) may include a first input member (111) that has a first abutment portion (111c) that abuts against an end portion of the first elastic body (SP11), a second input member (112) that has a second abutment portion (112c) that abuts against an end portion of the third elastic body (SP21) on the radially inner side with respect to the first abutment portion (111c), and a third input member (113) that has a third abutment portion (113c) that abuts against the end portion of the third elastic body (SP21) and that is coupled so as to be arranged side by side with the second input member (112) in the axial direction of the damper device; the first intermediate element (12) may include an elastic body support member (121) that is rotatably supported by the input element (11, 111) to support the first and second elastic bodies (SP11, SP12) so as to be arranged alternately along the circumferential direction and that has an abutment portion (121c) provided between the first and second elastic bodies (SP11, SP12) which are adjacent to each other to abut against the end portions of such first and second elastic bodies (SP11, SP12), and a coupling member (122) that is coupled so as to rotate together with a turbine runner (5) of a fluid transmission apparatus and that has an abutment portion (122c) provided between the first and second elastic bodies (SP11, SP12) which are adjacent to each other to abut against the end portions of such first and second elastic bodies (SP11, SP12); the second intermediate element (14) may be disposed on the opposite side of the third input member (113) from the output element (16) in the axial direction, and have an abutment portion (14c) provided between the third and fourth elastic bodies (SP21, SP22), which are adjacent to each other, to abut against end portions of such third and fourth elastic bodies (SP21, SP22); and the output element (16) may be disposed between the second and third input members (112, 113) in the axial direction, and have an outer abutment portion (16co) that abuts against an end portion of the second elastic body (SP12) and an inner abutment portion (16ci) that abuts against an end portion of the fourth elastic body (SP22).

In this way, by causing the elastic body support member (first intermediate element) to support the first and second elastic bodies, it is possible to reduce the relative speed between the first and second elastic bodies, which are deflected in accordance with the torsional angle of the elastic body support member with respect to the input element or the output element, and the elastic body support member. Thus, a friction force generated between the elastic body support member and the first and second elastic bodies can be reduced. Thus, it is possible to lower the hysteresis of the entire damper device. By using the coupling member which is fixed to the turbine runner and which has an abutment portion provided between the first and second elastic bodies, which are adjacent to each other, to abut against the end portions of such first and second elastic bodies, it is possible to couple the first intermediate element to both the first elastic body and the second elastic body, which are disposed on the radially outer side, and to couple the first intermediate element to the turbine runner while suppressing an increase in axial length of the damper device. Furthermore, by causing both the abutment portion of the elastic body support member and the abutment portion of the coupling member to abut against the end portions of the first and second elastic bodies, it is possible to smoothly expand and contract the first and second elastic bodies.

The input element (11X) may include a first input member (111X) that has an outer abutment portion (111co) that abuts against an end portion of the first elastic body (SP11) and an inner abutment portion (111ci) that abuts against an end portion of the third elastic body (SP21) on the radially inner side with respect to the outer abutment portion (111co), and a second input member (112b) that has an outer abutment portion (112co) that abuts against the end portion of the first elastic body (SP11) and an inner abutment portion (112ci) that abuts against the end portion of the third elastic body (SP21) on the radially inner side with respect to the outer abutment portion (112co) and that is coupled so as to be arranged side by side with the first input member (111X) in the axial direction of the damper device (10X); the first intermediate element (12X) may include an annular member (121X) that is disposed between the first and second input members (111X, 112X) in the axial direction and that has an abutment portion (121*c*) provided between the first and second elastic bodies (SP11, SP12), which are adjacent to each other, to abut against end portions of such first and second elastic bodies (SP11, SP12); the second intermediate element (14X) may be disposed between the first and second input members (111X, 112X) in the axial direction, and have an abutment portion (14*c*) provided between the third and fourth elastic bodies (SP21, SP22), which are adjacent to each other, to abut against end portions of such third and fourth elastic bodies (SP21, SP22); and the output element (16X) may be disposed between the first and second input members (111X, 112X) in the axial direction, and have an outer abutment portion (16*co*) that abuts against the end portion of the second elastic body (SP12) and an inner abutment portion (16*ci*) that abuts against an end portion of the fourth elastic body (SP22).

In this way, in the case where the first and second intermediate elements and the output element are disposed between the first and second input members, a friction force generated between the first and second input members and the first to fourth elastic bodies because of a centrifugal force, in particular, can be reduced by elaborating on the shape of the abutment portions of the first and second intermediate elements and the outer and inner abutment portions of the output element. Thus, it is possible to lower the hysteresis of the entire damper device well. In this case, additionally, the outer and inner abutment portions of the input element and the output element and the abutment portions of the first and second intermediate elements can be formed so as to extend in the radial direction of the damper device. Thus, it is possible for the abutment portions to press the associated end portions of the elastic bodies such that the elastic bodies are appropriately expanded and contracted along the axes, which improves the vibration damping performance of the damper device.

The first intermediate element (12X) may include a coupling member (122X) fixed so as to rotate together with a turbine runner (5) of a fluid transmission apparatus and coupled to the outer peripheral portion of the annular member (121X); the fifth elastic body (SPm) may be disposed side by side with the first and second elastic bodies (SP11, SP12) along the circumferential direction; the annular member (121X) of the first intermediate element (12X) may have a plurality of second abutment portions (121*d*) that abut against a first end portion or a second end portion of the fifth elastic body (SPm); the second intermediate element (14X) may have a plurality of second abutment portions (14*d*) that abut against the first end portion or the second end portion of the fifth elastic body (SPm); the abutment portion (14*c*) of the second intermediate element (14X) and the inner abutment portion (16*co*) of the output element (16X) may overlap each other in the axial direction as seen in the radial direction of the damper device (10X); and the second abutment portions (14*d*) of the second intermediate element (14X) and the outer abutment portion (16*co*) of the output element (16X) may overlap each other in the axial direction as seen in the radial direction of the damper device (10X), and be arranged side by side with the annular member (121X) of the first intermediate element (12X) in the axial direction.

In this way, by using the coupling member which is fixed to the turbine runner and which is coupled to the outer peripheral portion of the annular member, it is possible to couple the first intermediate element to both the first elastic body and the second elastic body, which are disposed on the radially outer side, and to couple the first intermediate element to the turbine runner while suppressing an increase in axial length of the damper device. Furthermore, it is possible to further shorten the axial length of the damper device by causing the abutment portion and the second abutment portions of the second intermediate element and the inner abutment portion or the outer abutment portion of the output element to overlap each other in the axial direction, and disposing the annular member of the first intermediate element side by side with the second abutment portions of the second intermediate element and the outer abutment portion of the output element in the axial direction. In this case, in addition, the second abutment portions of the first and second intermediate elements can be formed so as to extend in the radial direction of the damper device. Thus, it is possible for the second abutment portions to press the end portions of the fifth elastic body such that the fifth elastic body is appropriately expanded and contracted along the axis, which improves the vibration damping performance of the damper device.

The output element (16Y, 16Z) may include a first output member (161Y, 161Z) that has an abutment portion (161*c*) that abuts against an end portion of the third elastic body (SP21), and a second output member (162Y, 162Z) that has an outer abutment portion (162*co*) that abuts against an end portion of the first elastic body (SP11) and an inner abutment portion (162*ci*) that abuts against the end portion of the third elastic body (SP21) on the radially inner side with respect to the outer abutment portion (162*co*) and that is coupled so as to be arranged side by side with the first output member (161Y, 161Z) in the axial direction of the damper device (10Y, 10Z); the input element (11Y, 11Z) may include an outer abutment portion (111*c*, 112*co*) that abuts against the end portion of the first elastic body (SP11), and an inner abutment portion (112*c*, 112*ci*) that abuts against the end portion of the third elastic body (SP21) on the radially inner side with respect to the outer abutment portion (111*c*, 112*co*) and between the first and second output members (161Y, 161Z, 162Y, 162Z) in the axial direction; the first intermediate element (12Y, 12Z) may be coupled so as to rotate together with the turbine runner (5) of the fluid transmission apparatus to support the first and second elastic bodies (SP11, SP21) so as to be arranged alternately along the circumferential direction, and have an abutment portion (12*ca*, 12*cb*, 12*c*) provided between the first and second elastic bodies (SP11, SP21), which are adjacent to each other, to abut against end portions of such first and second elastic bodies (SP11, SP21); and the second intermediate element (14Y, 14Z) may be disposed between the first and second output members (161Y, 161Z, 162Y, 162Z) in the axial direction, and have an abutment portion (14*c*) provided between the third and fourth elastic bodies (SP21, SP22), which are adjacent to each other, to abut against end portions of such third and fourth elastic bodies (SP21, SP22).

In this way, by causing the first intermediate element to support the first and second elastic bodies, the relative speed between the first and second elastic bodies, which are deflected in accordance with the torsional angle of the first intermediate element with respect to the input element or the output element, and the first intermediate element can be reduced. Thus, a friction force generated between the first intermediate element and the first and second elastic bodies can be reduced. Thus, it is possible to lower the hysteresis of the entire damper device.

The fifth elastic body (SPm) may be supported by the second intermediate element (14Y) so as to be arranged side by side with the first and second elastic bodies (SP11, SP12) along the circumferential direction; the first intermediate element (12Y) may have a plurality of second abutment portions (12*da*, 12*db*) that abut against a first end portion or a second end portion of the fifth elastic body (SPm); and the second intermediate element (14Y) may have a plurality of second abutment portions (14*d*) that abut against the first end portion or the second end portion of the fifth elastic body (SPm).

The fifth elastic body (SPm) may be disposed between the first and second elastic bodies (SP11, SP12) and the third and fourth elastic bodies (SP21, SP22) in the radial direction of the damper device (10Z); at least one of the first intermediate element (12Z) and the turbine runner (5) may have a plurality of abutment portions (12*d*) that abut against a first end portion or a second end portion of the fifth elastic body (SPm); and the second intermediate element (14Y) may have a plurality of second abutment portions (14*d*) that abut against the first end portion or the second end portion of the fifth elastic body (SPm).

The disclosure according to the present disclosure is not limited to the embodiment described above in any way, and it is a matter of course that the disclosure may be modified in various ways without departing from the range of the extension of the present disclosure. Furthermore, the embodiment described above is merely a specific form of the disclosure described in the "SUMMARY" section, and does not limit the elements of the disclosure described in the "SUMMARY" section.

INDUSTRIAL APPLICABILITY

The disclosure according to the present disclosure can be utilized in the field of manufacture of damper devices or the like.

The invention claimed is:

1. A damper device comprising:
an input element to which torque from an engine is transferred;
an output element;
a first intermediate element;
a second intermediate element;
a first elastic body that transfers torque between the input element and the first intermediate element;
a second elastic body that transfers torque between the first intermediate element and the output element;
a third elastic body that transfers torque between the input element and the second intermediate element;
a fourth elastic body that transfers torque between the second intermediate element and the output element; and
a fifth elastic body that transfers torque between the first intermediate element and the second intermediate element, wherein:
a natural frequency of the first intermediate element at a time when torque is transferred from the input element to the output element via all of the first to fifth elastic bodies is lower than a natural frequency of the second intermediate element at the time when torque is transferred from the input element to the output element via all of the first to fifth elastic bodies; and
at least one of the first and second elastic bodies is disposed on a radially outer side of the third and fourth elastic bodies.

2. The damper device according to claim 1, wherein:
the first intermediate element has an abutment portion that abuts against an end portion of the first elastic body in a circumferential direction and an abutment portion that abuts against an end portion of the second elastic body in the circumferential direction; and
the second intermediate element has an abutment portion that abuts against an end portion of the third elastic body in the circumferential direction and an abutment portion that abuts against an end portion of the fourth elastic body in the circumferential direction.

3. The damper device according to claim 2, wherein an axis of at least one of the first and second elastic bodies is positioned on the radially outer side with respect to axes of the third and fourth elastic bodies.

4. The damper device according to claim 1, wherein an axis of at least one of the first and second elastic bodies is positioned on the radially outer side with respect to axes of the third and fourth elastic bodies.

5. The damper device according to claim 1, wherein:
the first intermediate element supports an outer peripheral portion of at least one of the first and second elastic bodies; and
the outer peripheral portion of the at least one of the first and second elastic bodies is positioned on the radially outer side with respect to outer peripheral portions of the third and fourth elastic bodies.

6. The damper device according to claim 1, wherein the first and second intermediate elements have an annular portion.

7. The damper device according to claim 1, wherein the first and second elastic bodies are disposed side by side along a circumferential direction.

8. The damper device according to claim 1, wherein the third and fourth elastic bodies are disposed side by side along a circumferential direction.

9. The damper device according to claim 1, wherein the first elastic body is disposed on the radially outer side of the second elastic body, the third and fourth elastic bodies are disposed away from the first and second elastic bodies in an axial direction, and the third elastic body is disposed on the radially outer side of the fourth elastic body.

10. The damper device according to claim 1, wherein the fifth elastic body is disposed side by side with the first and second elastic bodies along a circumferential direction.

11. The damper device according to claim 1, wherein the fifth elastic body is disposed between the first and second elastic bodies and the third and fourth elastic bodies in a radial direction.

12. The damper device according to claim 9, wherein the fifth elastic body is disposed between the first and second elastic bodies and the third and fourth elastic bodies in the axial direction.

13. The damper device according to claim 1, wherein:
the input element has an abutment portion that abuts against an end portion of the first elastic body in a circumferential direction and an abutment portion that abuts against an end portion of the third elastic body in the circumferential direction;
the output element has an abutment portion that abuts against an end portion of the second elastic body in the circumferential direction and an abutment portion that abuts against an end portion of the fourth elastic body in the circumferential direction;
the first intermediate element has an abutment portion that abuts against an end portion of the first elastic body in the circumferential direction, an abutment portion that abuts against an end portion of the second elastic body in the circumferential direction, an abutment portion that abuts against a first end portion of the fifth elastic body, and an abutment portion that abuts against a second end portion of the fifth elastic body; and the second intermediate element has an abutment portion that abuts against an end portion of the third elastic body in the circumferential direction, an abutment portion that abuts against an end portion of the fourth elastic body in the circumferential direction, an abutment portion that abuts against the first end portion of the fifth elastic body, and an abutment portion that abuts against the second end portion of the fifth elastic body.

14. The damper device according to claim 1, wherein a lower one of a rigidity of the first elastic body and a rigidity of the second elastic body is lower than a lower one of a rigidity of the third elastic body and a rigidity of the fourth elastic body, and one of the first and second elastic bodies with the lower rigidity is disposed on the radially outer side of the third and fourth elastic bodies.

15. The damper device according to claim 1, wherein rigidities of the first and second elastic bodies are lower than rigidities of the third and fourth elastic bodies, and the first and second elastic bodies are disposed on the radially outer side of the third and fourth elastic bodies.

16. The damper device according to claim 1, wherein a moment of inertia of the first intermediate element is larger than a moment of inertia of the second intermediate element.

17. The damper device according to claim 1, wherein the first intermediate element is coupled so as to rotate together with a turbine runner of a fluid transmission apparatus.

18. The damper device according to claim 1, wherein:
torque from the engine is transferred to the input element via a lock-up clutch; and
a lock-up rotational speed of the lock-up clutch is higher than a rotational speed corresponding to the natural frequency of the first intermediate element at the time when torque is transferred from the input element to the output element via all of the first to fifth elastic bodies, and lower than a rotational speed corresponding to the natural frequency of the second intermediate element.

19. The damper device according to claim 1, wherein deflection of the first to fifth elastic bodies is allowed until torque transferred to the input element becomes equal to or more than a threshold determined in advance.

20. The damper device according to claim 1, wherein the output element is functionally coupled to an input shaft of a transmission.

* * * * *